(12) United States Patent
Rodriguez et al.

(10) Patent No.: US 10,546,183 B2
(45) Date of Patent: Jan. 28, 2020

(54) LIVENESS DETECTION

(71) Applicant: Yoti Holding Limited, London (GB)

(72) Inventors: Francisco Angel Garcia Rodriguez, Gaudix (ES); Benjamin Robert Tremoulheac, Orleans (FR); Symeon Nikitidis, London (GB); Thomas Bastiani, London (GB); Miguel Jimenez, London (GB)

(73) Assignee: Yoti Holding Limited, London (GB)

( * ) Notice: Subject to any disclaimer, the term of this patent is extended or adjusted under 35 U.S.C. 154(b) by 0 days.

(21) Appl. No.: 15/893,472

(22) Filed: Feb. 9, 2018

(65) Prior Publication Data

US 2018/0239955 A1 Aug. 23, 2018

Related U.S. Application Data

(63) Continuation of application No. PCT/EP2016/069079, filed on Aug. 10, 2016, which
(Continued)

(30) Foreign Application Priority Data

Jul. 15, 2016 (GB) .................................. 1612300.2

(51) Int. Cl.
*G06K 9/00* (2006.01)
*G06F 21/32* (2013.01)
*G06T 7/73* (2017.01)

(52) U.S. Cl.
CPC ......... *G06K 9/00281* (2013.01); *G06F 21/32* (2013.01); *G06K 9/00288* (2013.01);
(Continued)

(58) Field of Classification Search
CPC ............. G06K 9/00281; G06K 9/0061; G06K 9/00906; G06K 9/00335; G06K 9/00288;
(Continued)

(56) References Cited

U.S. PATENT DOCUMENTS 5,954,583 A 9/1999 Green
7,027,617 B1 4/2006 Frischholz
(Continued)

FOREIGN PATENT DOCUMENTS

CN 101114909 A 1/2008
EP 0970435 A2 1/2000
(Continued)

OTHER PUBLICATIONS

U.S. Appl. No. 15/706,461, Liveness Detection, filed Sep. 15, 2017.
(Continued)

*Primary Examiner* — Samir A Ahmed
(74) *Attorney, Agent, or Firm* — Knobbe, Martens, Olson & Bear, LLP

(57) ABSTRACT

A liveness detection system comprises a controller, a video input, a feature recognition module, and a liveness detection module. The controller is configured to control an output device to provide randomized outputs to an entity over an interval of time. The video input is configured to receive a moving image of the entity captured by a camera over the interval of time. The feature recognition module is configured to process the moving image to detect at least one human feature of the entity. The liveness detection module is configured to compare with the randomized outputs a behaviour exhibited by the detected human feature over the interval of time to determine whether the behaviour is an expected reaction to the randomized outputs, thereby determining whether the entity is a living being.

9 Claims, 33 Drawing Sheets

Related U.S. Application Data is a continuation-in-part of application No. 14/822,804, filed on Aug. 10, 2015, now abandoned, and a continuation-in-part of application No. 14/822,803, filed on Aug. 10, 2015, now Pat. No. 9,794,260.

(52) U.S. Cl.
CPC ............ *G06K 9/00335* (2013.01); *G06T 7/73* (2017.01); *G06T 2207/10016* (2013.01); *G06T 2207/30201* (2013.01)

(58) Field of Classification Search
CPC . G06F 21/32; G06T 7/73; G06T 2207/10016; G06T 2207/30201
See application file for complete search history.

(56) References Cited

U.S. PATENT DOCUMENTS

| | | | |
|---|---|---|---|
| 8,542,879 B1* | 9/2013 | Nechyba | G06K 9/00228 382/103 |
| 8,649,573 B1* | 2/2014 | Darbari | G06K 9/00751 382/118 |
| 8,837,835 B1 | 9/2014 | Samwel et al. | |
| 8,856,541 B1 | 10/2014 | Chaudhury et al. | |
| 9,075,975 B2 | 7/2015 | Bud | |
| 9,147,117 B1 | 9/2015 | Madhu et al. | |
| 9,202,105 B1 | 12/2015 | Wang et al. | |
| 9,264,419 B1 | 2/2016 | Johansson et al. | |
| 9,294,475 B2 | 3/2016 | Hoyos | |
| 9,355,314 B2 | 5/2016 | Yang | |
| 9,367,677 B1 | 6/2016 | Adhami et al. | |
| 9,794,260 B2 | 10/2017 | Loughlin-McHugh et al. | |
| 2002/0172419 A1 | 11/2002 | Lin et al. | |
| 2005/0270386 A1 | 12/2005 | Saitoh et al. | |
| 2006/0279726 A1 | 12/2006 | Galambos | |
| 2006/0288234 A1 | 12/2006 | Azar et al. | |
| 2009/0092294 A1 | 4/2009 | Uchida | |
| 2009/0138405 A1 | 5/2009 | Blessing | |
| 2011/0242304 A1 | 10/2011 | Ichige | |
| 2012/0075452 A1 | 3/2012 | Ferren | |
| 2013/0219480 A1* | 8/2013 | Bud | G06F 21/32 726/7 |
| 2013/0336547 A1 | 12/2013 | Komogortsev | |
| 2014/0016837 A1 | 1/2014 | Nechyba et al. | |
| 2014/0075548 A1 | 3/2014 | Sampathkumaran et al. | |
| 2014/0191948 A1* | 7/2014 | Kim | G06F 3/0483 345/156 |
| 2014/0307929 A1 | 10/2014 | Nechyba et al. | |
| 2014/0337930 A1 | 11/2014 | Hoyos et al. | |
| 2015/0026797 A1 | 1/2015 | Cao | |
| 2015/0095996 A1 | 4/2015 | Tang | |
| 2015/0264567 A1 | 9/2015 | Sensharma | |
| 2016/0055323 A1 | 2/2016 | Stuntebeck et al. | |
| 2016/0071111 A1 | 3/2016 | Wang et al. | |
| 2016/0140390 A1 | 5/2016 | Ghosh et al. | |
| 2016/0241531 A1 | 8/2016 | Loughlin-McHugh et al. | |
| 2016/0241532 A1 | 8/2016 | Loughlin-McHugh et al. | |
| 2016/0309329 A1 | 10/2016 | Chen et al. | |
| 2016/0323249 A1 | 11/2016 | Duncker et al. | |
| 2016/0335483 A1 | 11/2016 | Pfursich et al. | |
| 2017/0046583 A1 | 2/2017 | Rodriguez et al. | |
| 2017/0048244 A1 | 2/2017 | Loughlin-McHugh et al. | |
| 2017/0227995 A1 | 8/2017 | Lee et al. | |
| 2018/0083973 A1 | 3/2018 | Paraskevas et al. | |
| 2018/0181737 A1* | 6/2018 | Tussy | G06K 9/00288 |
| 2018/0239955 A1 | 8/2018 | Rodriguez et al. | |

FOREIGN PATENT DOCUMENTS

| | | |
|---|---|---|
| EP | 1104143 A2 | 5/2001 |
| EP | 2560123 A1 | 2/2013 |
| EP | 2680191 A2 | 1/2014 |
| EP | 2993619 A1 | 3/2016 |
| GB | 2501362 A | 10/2013 |
| GB | 2465782 A | 4/2019 |
| JP | 2006-040151 A | 2/2006 |
| JP | 2006-235718 A | 9/2006 |
| KR | 2009-0018440 A | 2/2009 |
| KR | 2010-0103221 A | 9/2010 |
| WO | WO 98/043216 | 10/1998 |
| WO | WO 2016/127008 A1 | 8/2016 |
| WO | WO 2018/097651 A1 | 5/2018 |

OTHER PUBLICATIONS

Gragnaniello et al., "An Investigation of Local Descriptors for Biometric Spoofing Detection," *IEEE Transactions on Information Forensics and Security*, vol. 10, No. 4, Apr. 2015, pp. 849-863.

Komulainen, "Software-based Countermeasures to 2D Facial Spoofing Attacks," University of Oulu Graduate School; University of Oulu, Faculty of Information Technology and Electrical Engineering, Department of Computer Science and Engineering; Infotech Oulu *Acta Univ. OuL C 537*, Aug. 2015, in 92 pages.

Wang et al., "Face Liveness Detection Using 3D Structure Recovered from a Single Camera," 2013 International Conference on Biometrics (ICB), Jun. 4-7, 2013, in 6 pages.

International Search Report dated Nov. 4, 2016 in corresponding International Application No. PCT/EP2016/069084, filed Aug. 10, 2016.

International Search Report dated Nov. 11, 2016 in corresponding International Application No. PCT/EP2016/069079, filed Aug. 10, 2016.

Search Report dated Jul. 19, 2013 in GB Patent Application No. 1303067.1, granted as GB 2501362 A, Oct. 23, 2013.

C. Xie et al, "Walking recognition method for physical activity system of child based on wearable accelerometer," 2017 IEEE International Conference on Robotics and Biomimetics (ROBIO), Dec. 5-8, 2017, IEEE, pp. 2439-2443.

I. Papavasileiou et al, "Gait-based continuous authentication using multimodal learning," 2017 IEEE/ACM International Conference on Connected Health: Applications, Systems and Engineering Technologies (CHASE), Jul. 17-19, 2017, IEEE, pp. 290-291.

International Search Report dated Feb. 2, 2019 in corresponding International Application No. PCT/EP2018/086265, filed Dec. 20, 2018.

KT Nguyen et al., "Gait recognition with multiregion size convolutional neural network for authentication with wearable sensors," Springer, Nov. 2017, pp. 197-212, vol. 10646.

M. Centeno et al, "Smartphone continuous authentication using deep learning autoencoders," 15th Annual Conference on Privacy. Security and Trust (PST), Aug. 28-30, 2017, IEEE 2017, pp. 147-155.

M. Gadaleta and M. Rossi, "IDNet: Smartphone-based gait recognition with convolutional neural networks", Pattern Recognition, Feb. 2018, pp. 25-37, vol. 74.

\* cited by examiner

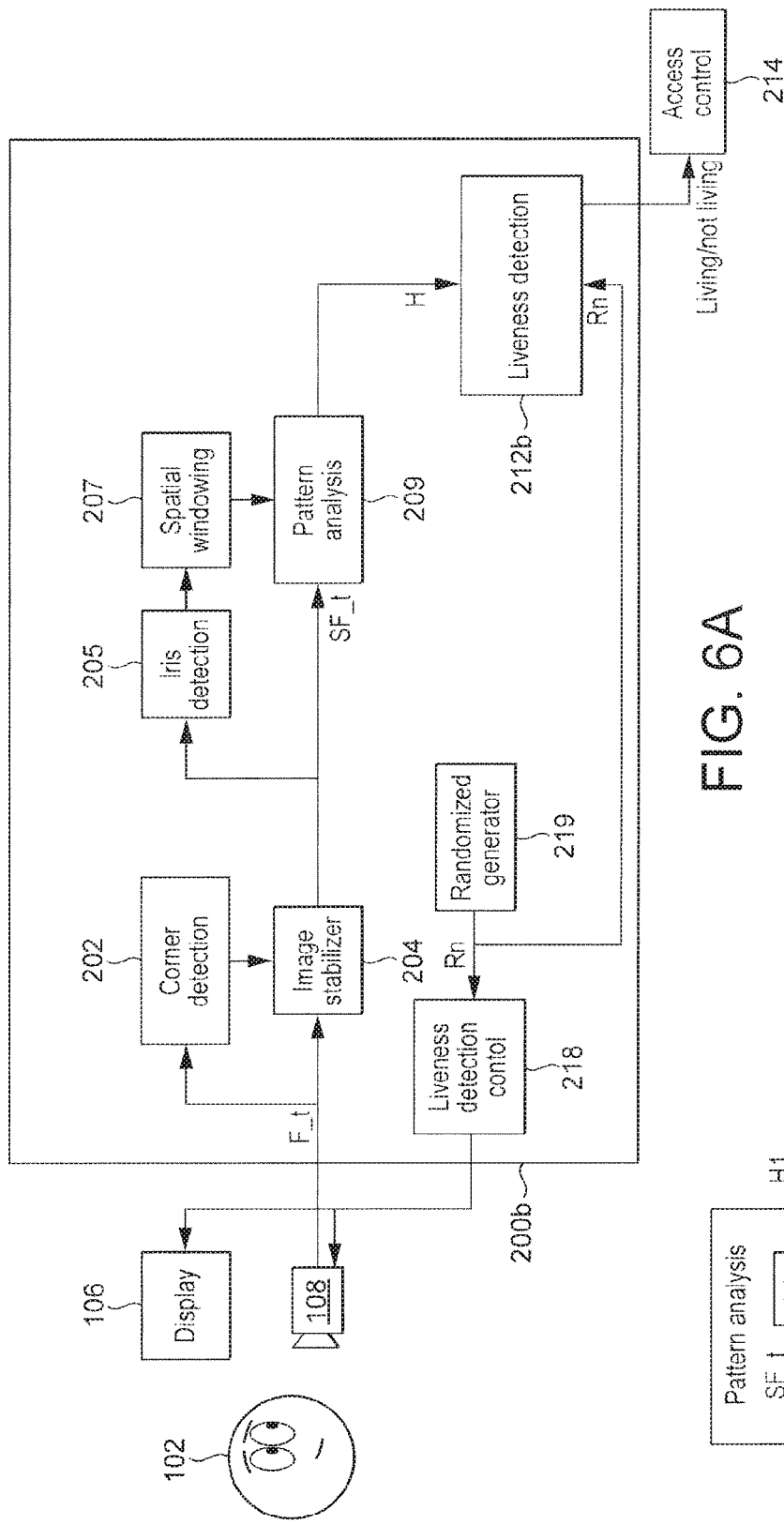

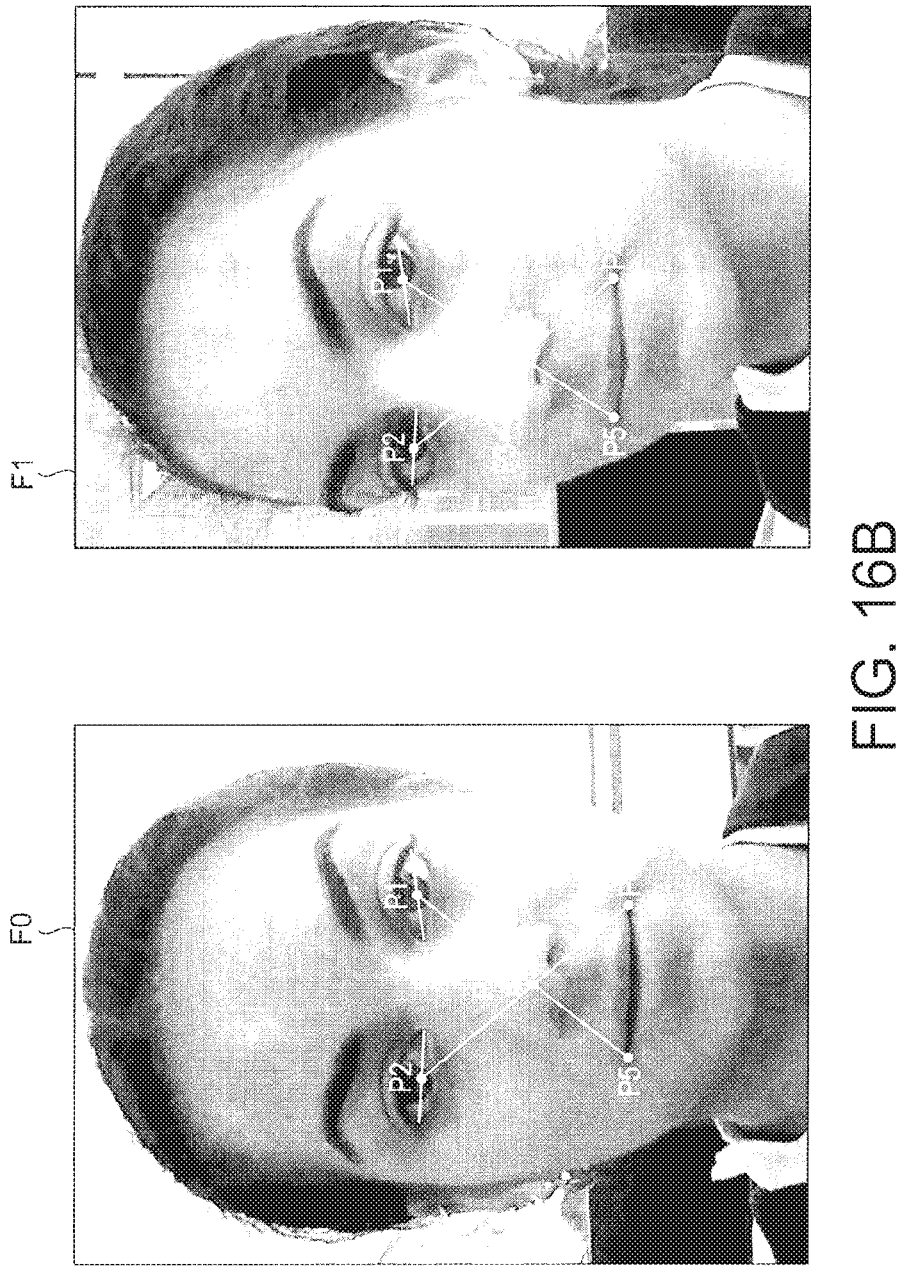

LIVENESS DETECTION

TECHNICAL FIELD

The present invention is in the field of liveness detection, and has particular applications in the context of network security to prevent spoofing attacks based on entities masquerading as humans.

BACKGROUND

In the context of network security, a spoofing attack refers to a technique whereby an unauthorized human or software entity masquerades as an authorized entity, thereby gaining an illegitimate advantage.

A particular example is an unauthorized entity masquerading as a particular user so as to gain improper access to the user's personal information held in a notionally secure data store, launch an attack on a notionally secure system by masquerading a system administrator, or gain some other form of access to a notionally secure system which they can then exploit to their benefit.

"Liveness detection" refers to techniques of detecting whether an entity, which may exhibit what are ostensibly human characteristics, is actually a real, living being or is a non-living entity masquerading as such.

One example of liveness detection is the well-known CAPTCHA test; or to give it its full name "Completely Automated Public Turing test to tell Computers and Humans Apart". The test is based on a challenge-response paradigm. In the broadest sense, a system presents an entity with a test that is designed to be trivial for a human but difficult for robot software. A typical implementation is requiring an entity to interpret a word or phrase embodied in an image or audio file. This is an easy task for a human to interpret, but it is a harder task for robot software to interpret the word/image as it is in a non-text format. Variations of this technique include distorting the word or phrase, with the intention of making it even less susceptible to interpretation by software.

Another example of liveness detection is in the context of a system that is notionally secured based on biometrics (e.g. facial, fingerprint, or voice verification). Such a system may require a user wishing to gain access to the system to present one of their biometric identifiers i.e. distinguishing human features (e.g. their face, fingerprint, or voice) to the system using a biometric sensor (e.g. camera; fingerprint sensor; microphone). The presented biometric identifier is compared with biometric data of users who are authorized to access the system, and access is granted to the presenting user only if the biometric identifier matches the biometric data of one of the authorized users.

Such systems can be spoofed by presenting fake biometric samples to the biometric sensor, such as pre-captured or synthesized image/speech data, physical photographs, or even physical, three dimensional models of human features, such as accurate face or finger models. In this context, a robust liveness detection technique needs to be able to reliably distinguish between a real biometric identifier, i.e. captured directly from a living being who wishes to access the system, and a fake biometric identifier, i.e. that has been pre-captured or synthesised.

To date, research into more advanced liveness detection based on biometric data have mostly focussed on machine learning techniques. Machine learning techniques tend to be relatively expensive to implement (in terms of processing resources), and require some form of offline and/or online model training.

SUMMARY

The inventors of the present invention have recognized that physiological responses to randomized outputs (such as randomized visual or audible outputs), as exhibited by visible human features (such as the eyes or mouth), provide an excellent basis for liveness detection, as such reactions are very difficult for non-living entities to replicate accurately.

According to a first aspect of the present invention, a liveness detection system comprises a controller, a video input, a feature recognition module, and a liveness detection module. The controller is configured to control an output device to provide randomized outputs to an entity over an interval of time. The video input is configured to receive a moving image of the entity captured by a camera over the interval of time. The feature recognition module is configured to process the moving image to detect at least one human feature of the entity. The liveness detection module is configured to compare with the randomized outputs a behaviour exhibited by the detected human feature over the interval of time to determine whether the behaviour is an expected reaction to the randomized outputs, thereby determining whether the entity is a living being.

In embodiments, the human feature that the feature recognition module is configured to detect may be an eye of the entity.

For example, providing the randomized outputs may comprise controlling the output device to emit at least one light pulse having a randomized timing within the moving image, and the expected reaction may be an expected pupillary response to the at least one light pulses. E.g. providing the randomized outputs may comprise controlling the output device to emit at least two randomly light pulse having a randomized separation in time from one another, and the expected reaction may be an expected pupillary response to the at least two light pulses.

The output device may be a camera flash or a display.

The liveness detection system may comprise a velocity measurement module configured to compare frames of the moving image to one another so as to generate a velocity distribution of the eye, the velocity distribution representing the rate of change of the diameter of the pupil at different times, said comparison comprising comparing the velocity distribution with the expected response. For example, said comparison by the liveness detection module may comprise comparing the velocity distribution with a probability distribution, wherein the probability distribution represents the expected pupillary response.

Alternatively or in addition, said comparison by the liveness detection module may comprise: determining a first time, wherein the first time corresponds to a local maximum of the velocity distribution; determining a second time, wherein the second time corresponds to a local minimum of the velocity distribution, the local minimum occurring immediately before or immediately after the local maximum; and determining a difference between the first and second times and comparing the difference to a threshold.

For example, respective differences may be determined between the first time and two second times, one corresponding to the local minimum immediately before the local maximum and one corresponding to the local minimum occurring immediately after the local maximum, and each may be compared to a respective threshold.

The entity may be determined to be a living being only if each of the two differences is below its respective threshold, and the velocity distribution matches the probability distribution.

The output device may be a display.

Providing the randomized outputs may comprise controlling the display to display a display element at a random location of the display, and the expected reaction may be an expected movement of the eye.

The liveness detection system may comprise: a spatial windowing module configured to identify, for each of a plurality of frames of the moving image, an iris area, the iris area corresponding to the iris of the eye in the frame; and an analysis module configured to, for each of a plurality of regions of the iris area, generate a histogram of pixel values within that region for use in tracking movements of the eye, the liveness detection module being configured to perform said comparison by comparing the histograms with the expected movement.

For example, the liveness detection module may be configured to perform said comparison by comparing the histograms with a probability density function representing the expected movement.

Alternatively or in addition, the liveness detection system may comprise: a spatial windowing module configured, for each of a plurality of frames of the moving image, to divide at least a portion of that frame into a plurality of blocks, each block formed one or more respective sub-blocks, each sub-block formed of one or more respective pixels; and an analysis module configured to assign to each block a respective block value based on its one or more respective sub-blocks, the liveness detection module being configured to perform said comparison by comparing the block values with the expected movement.

For example, each sub-block may be formed of a multiple pixels, and/or each block may be formed of multiple sub-blocks.

The analysis module may be configured to assign to each sub-block a binary value by detecting whether or not at least a predetermined proportion of its respective pixels have intensities below an intensity threshold, the block value of each block being assigned by combining the binary values assigned to its respective sub-blocks.

The pixel intensities may be determined by converting the plurality of frames from a colour format into a grayscale format.

Alternatively or in addition, providing the randomized outputs may further comprise accessing user-created data, held a first memory local to the output device, which defines a restricted subset of locations on the display, the random location being selected at random from the restricted subset, wherein the system is also configured to compare the behaviour exhibited by the eye with a version of the user-created data held in a second memory remote from the output device. For example, the user-created data may define a two-dimensional curve, the restricted subset being the set of points on the curve.

The first memory and the output device may be integrated in a user device.

Where the human feature is an eye, the behaviour that is compared with the randomized outputs may be at least one of: changes in the size of the pupil of the eye over time; changes in an iris pattern of the eye over time; and eye movements exhibited the eye.

Alternatively or in addition, providing the randomized outputs may comprise controlling the output device to output at least one randomly selected word; the human feature that the feature recognition module is configured to detect may be a mouth of the entity, and the expected response is the user speaking the word, the movements of the mouth being compared to the random word using a lip reading algorithm.

For example, in embodiments the lip reading algorithm may be applied by:
  identifying a set of reference points on the mouth;
  determining a sequence of separation measures for the set of mouth reference points corresponding to different times in the moving image; and
  comparing the determined sequence with an expected sequence for the at least one displayed word.

Each of the separation measures may be a vector of distances between different pairs of the mouth reference points.

The determined sequence may be compared with the expected sequence to assign determine a plurality of correlation scores, each for a different component of the vector.

The correlation scores may be combined to generate an overall score, for use in determining whether to grant access to a remote computer system.

The determined sequence and the expected sequence may be sequences of visemes selected from a predetermined set of visemes.

The determined sequence of visemes may be determined by mapping ranges of the vector to visemes in the predetermined set.

The set of mouth reference points may comprise points on the upper lip, points on the lower lip and two points on either side of the mouth.

The points on the upper and lower lips may be equal in number.

The mouth reference points may be substantially as shown in FIG. 15E.

Each of the vectors in the sequence may be substantially as defined in table 2.

Dynamic time warping may be applied to the sequence of changes to effect said comparison.

The mouth movements may be compared to the random word based on the International Phonetic Alphabet.

The liveness detection module may be configured to verify that the user has spoken the word using data of an audio signal captured simultaneously with the moving image.

Providing the randomized outputs comprises controlling the output device to output at least one word at a randomly selected time; wherein the human feature that the feature recognition module is configured to detect may be a mouth of the entity, and the expected response may be the user speaking the word at the randomly selected time.

For example, the randomly selected word may be outputted at the randomly selected time, and the user may be determined to be a living being only if he speaks the randomly selected word at the randomly selected time.

A sequence of randomly selected words may be outputted at a sequence of randomly selected times.

A determined sequence of lip movement inactivity may be correlated with the sequence of randomly selected words.

A determined sequence of lip movement inactivity may be correlated with a randomized time sequence of words displayed on a display.

In any of the above examples, the liveness detection system may comprise an access module configured to grant the entity access to a remote computer system only if they are determined to be a living being.

The liveness detection module may be configured to output at least one of: a confidence value which conveys a probability that the entity is a living being, and a binary classification of the entity as either living or non-living.

According to a second aspect of the present invention, a computer-implemented liveness detection method comprises: controlling an output device to provide randomized outputs to an entity over an interval of time; receiving a moving image of the entity captured by a camera over the interval of time; processing the moving image to detect at least one human feature of the entity; and comparing with the randomized outputs a behaviour exhibited by the detected human feature over the interval of time to determine whether the behaviour is an expected reaction to the randomized outputs, thereby determining whether the entity is a living being.

According to a third aspect of the present invention, a computer-implemented liveness detection method comprises implementing, by a liveness detection system, the following steps. A first set of one or more parameters of a first liveness test is selected at random. The first parameter set is transmitted to a user device available to an entity, thereby causing the user device to perform the first liveness test according to the first parameter set. Results of the first liveness test performed at the user device according to the first parameter set are received from the user device. Results of a second liveness test pertaining to the entity are received. The liveness detection system determines whether the entity is a living being using the results of the liveness tests, the results of the first liveness test being so used by comparing them with the first parameter set.

The second liveness test may also be based on a random parameter(s), but that is not necessarily the case. For example, the second liveness test may be based on verifying relative movement between the entity and the device (e.g. relative movement of different facial landmarks, or relative movement between the entity and a background region), or based on specular reflection of an image in the entity's eye, as described in further detail below.

In embodiments, the method may comprise implementing, by the liveness detection system, steps of: selecting at random a second set of one or more parameters of the second liveness test; and transmitting the second parameter set to the or another user device available to the entity, thereby causing that user device to perform the second liveness test according to the second parameter set, wherein the results of the second liveness test performed at that user device according to the second parameter set are received from that user device and used in the determining step by comparing them with the second parameter set.

The results of at least one of tests that are received at the liveness detection system may have been generated by capturing a moving image of the entity.

For example, the results of the at least one test as received at the liveness detection system comprise information that has been extracted from the moving image. Alternatively, the results of that test that are received at the liveness detection may comprise the moving image, and the method may further comprise processing, by the liveness detection system, the moving image to extract information from the moving image. In either case, the extracted information may be used in the determining step and describe at least one of:

changes in the pupil size of at least one eye of the entity over time;

changes in an iris pattern of at least one eye of the entity over time;

eye movements exhibited by at least one eye of the entity; or lip movements exhibited by lips of the entity.

One of the tests may be performed by emitting at least one light pulse at a randomized timing that is defined by the parameter set of that test; wherein the results of that test convey changes over time in the pupil size and/or in an iris pattern of at least one eye of the entity, and those results are compared with that parameter set to determine whether the changes in the pupil size and/or the iris pattern match the randomized timing.

Alternatively or in addition, one of the tests may be performed by displaying at least one display element at a randomized display location that is defined by the parameter set of that test; wherein the results of that test convey a response of the entity to the at least one display element as displayed in that test, and those results are compared with that parameter set to determine whether the response to the display element matches the at least one randomized display location.

Alternatively or in addition, one of the tests may be performed by displaying a randomly selected display element that is defined by the parameter set of that test; wherein the results of that test convey a response of the entity to the randomly selected display element, and those results are compared with that parameter set to determine whether the response of the entity matches the at least one randomly selected display element.

The second test may be performed by the user device or another user device monitoring movements of that user device using at least one sensor of that user device.

The method may comprise, by the liveness detection system: transmitting to the entity, from a source address of the liveness detection system, an identifier of at least one destination address (e.g. at least one URI) of the liveness detection system different than the source address; and determining whether the results of at least one of the tests were transmitted to the at least one destination address.

The at least one destination address may be randomly selected by the liveness detection system.

The method may comprise comprising granting the entity access to a remote computer system only if it is determined that it is a living being and the results of the at least one of the test were been transmitted by to the at least one destination address.

The method may comprise, by the liveness detection system: transmitting to the entity, from the source address of the liveness detection system, a first and a second identifier of a first and a second destination address of the liveness detection system respectively, the first and second destination addresses being different from the source address and from each other; determining whether the results of the second test were received at the first destination address; and determining whether the results of the first test were received at the second destination address.

For example the liveness detection system may comprise: liveness control server logic; first liveness processing server logic for processing the results of the first liveness test, the first liveness processing server logic having a plurality of addresses including the first destination address, and second liveness processing logic for processing the results of the second liveness test, the second liveness processing logic having a plurality of addresses including the first destination address The results of the second test may be received at the first liveness processing server, the results of the first liveness test may be received at the second liveness processing server, and the method may comprise:

the first liveness processing server providing the results of the second liveness test to the liveness control server;

the second liveness processing server providing the results of the first liveness test to the liveness control server; and the liveness control server providing the results of the first test to the first liveness processing server and the results of the second test to the second liveness processing server only if: the results of the second test were received at the first destination address of the first liveness processing server, and the results of the first test were received at the second destination address of the second liveness processing server.

For example, the results of the first and second tests may be received in a first message and a second message respectively, each message comprising a signature expected to have been generated, for each message, from both parameter sets; the liveness control server may compare both signatures with the first and second parameter sets and provide the results of the first test to the first liveness processing server and the results of the second test to the second liveness processing server only if: the second message was received at the first destination address of the first liveness processing server, the first message was received at the second destination address of the second liveness processing server, and both signatures match the parameter sets.

The method may comprise detecting when a timeout condition occurs, the timeout condition caused by an unacceptable delay in receiving the results relative to a timing of the transmitting step, wherein the entity is refused access to a remote computer system in response to the timeout condition occurring.

The method may comprise granting the entity access to a remote computer system only if the entity is determined to be a living being.

The first and second tests may be performed at the same time as one another.

The method may comprise granting the entity access to a remote computer system only if the entity is determined to be a living being.

According to a fourth aspect of the present invention, a liveness detection system comprises: a set of one or more processing units, the set configured to perform operations of: selecting at random a first set of one or more parameters of a first liveness test; transmitting, to a user device available to an entity, the first parameter set, thereby causing the user device to perform the first liveness test according to the first parameter set; receiving from the user device results of the first liveness test performed at the user device according to the first parameter set; receiving results of a second liveness test pertaining to the entity; and determining whether the entity is a living being using the results of the liveness tests, the results of the first liveness test being so used by comparing them with the first parameter set.

According to a fifth aspect of the present invention, a computer-implemented liveness detection method is implemented by a liveness detection system. The liveness detection system comprises computer storage storing a shared secret known only to the liveness detection system and one or more authorized user devices. The method comprises implementing by the liveness detection system the following steps. A set of one or more parameters of a liveness test is selected at random which, when combined with the shared secret, define expected outputs that should be provided in the liveness test. The parameter set is transmitted to a user device, thereby causing the user device to perform the liveness test according to the parameter set, whereby the user device can only provide the expected outputs therein if it also has access to its own version of the shared secret. Results of the liveness test performed at the user device according to the first parameter set are received from the user device. The parameter set and the shared secret stored at the liveness detection system are used at the liveness detection system to determine the expected outputs. The results of the liveness test are compared with the determined expected outputs to determine whether the behaviour of an entity that was subject to the liveness test performed at the user device is an expected reaction to the expected outputs, thereby determining from the entity's behaviour both whether the entity is a living being and whether the user device is one of the authorized user device(s).

In embodiments, the shared secret may define a restricted subset of a set of available display locations, wherein the parameter set defines one or more available display locations selected at random from the restricted subset, and wherein the expected outputs are provided by displaying one or more display elements at the one or more randomly selected available display locations on a display of the user device.

The behaviour may be eye movements exhibited by at least one eye of the entity during the displaying of the one or more display elements at the user device and conveyed by the received results, the expected reaction being an expected movement of the eye, whereby it is determined both whether the entity is a living being and whether the user device is one of the authorized user device(s) from the entity's eye movements.

The shared secret may for example define an elliptical curve.

According to a sixth aspect of the present invention, a liveness detection system comprises: computer storage storing a shared secret known only to the liveness detection system and one or more authorized user devices; and a set of one or more processing units, the set configured to perform operations of: selecting at random a set of one or more parameters of a liveness test which, when combined with the shared secret, define expected outputs that should be provided in the liveness test; transmitting the parameter set to a user device, thereby causing the user device to perform the liveness test according to the parameter set, whereby the user device can only provide the expected outputs therein if it also has access to its own version of the shared secret; receiving from the user device results of the liveness test performed at the user device according to the first parameter set; using the parameter set and the shared secret stored at the liveness detection system to determine the expected outputs; and comparing the results of the liveness test with the determined expected outputs to determine whether the behaviour of an entity that was subject to the liveness test performed at the user device is an expected reaction to the expected outputs, thereby determining from the entity's behaviour both whether the entity is a living being and whether the user device is one of the authorized user device(s).

A seventh aspect of the present invention is directed to a computer implemented method of regulating access to a computer system, the method comprising:

receiving from a user device a request for access to the computer system;

receiving a moving image of a user captured with an image capture device of the user device, the moving image being captured as the user and the image capture device exhibit motion relative to each other;

processing the moving image to identify at least one forward reference feature and at least one rearward reference feature therein;

determining a parallax exhibited in the moving image by the at least one forward reference feature relative to the at least one rearward reference so feature;

determining whether to grant the request for access using the determined parallax.

In embodiments, the parallax may be determined by determining a change in separation between the forward and reward reference features in the moving image.

The forward and reward reference features may be, respectively, forward and rearward facial points of a face identified in the moving image.

The forward reference point may be a point on the nose, and the reward reference point may be defined relative to the mouth and/or at least one eye identified in the moving image.

The reward reference point may be determined as the intersection between two lines, each between a different eye and the opposite side of the mouth.

The method may comprise comprising determining a first and a second displacement vector between the forward and reward references points for a first and a second frame of the moving image respectively, the separation being a determined difference between those displacement vectors.

The request may be granted only if the difference between the first and second displacement vectors exceeds a threshold.

The method may further comprise: determining first and second scale factors for the first and second frames respectively based on a separation between two further reference points on the face in the first and second frame respectively, the two further reference points having fixed locations on the face; wherein the first and second displacement vectors are scaled by the first and second scale factors respectively.

The method may further comprise: determining first and second rotation angles for the first and second frames based on a relative orientation of two further reference points on the face in the first and second frames respectively, the two further reference points having fixed locations on the face; wherein the first and second displacement vectors are rotated by the first and second rotation angles respectively.

The two further reference points may be points on the left and right eye respectively.

The method may comprise selecting the first and second frames from frames of the moving image, by comparing each of the frames with a facial model to determine an orientation (pose) of the face in that frame, and determining that the difference between the orientation of the face in the first and second frames exceeds a threshold.

The method may further comprise determining a speed measure for the face in the moving image, and the request may be granted only if the speed measure does not exceed a speed threshold at any time in the moving image.

The method may further comprise: receiving sensor data generated by a motion sensor coupled to the image capture device whilst capturing the moving image, wherein the request is granted only if the sensor data indicates the parallax has been caused by rotation of the image capture device.

The method may comprise determining a pose of the user by comparing the face in the moving image with a facial model, and comparing changes in the determined pose with sensor data captured by an inertial sensor coupled to the camera.

As an alternative to the facial points, the forward reference feature may be at least part of the user visible in the image, and the rearward reference future may be a background region.

An eighth aspect of the present invention is directed to a computer implemented method of regulating access to a computer system, the method comprising:

receiving from a user device a request for access to the computer system;

receiving a moving image of a user's face captured with an image capture device of the user device, the moving image being captured as the user's face and the image capture device exhibit motion relative to each other;

processing the moving image to identify at least one forward reference point on the user's face and at least one rearward reference point on the user's face;

detecting a movement of the forward reference point relative to the reward reference point in the moving image; and determining whether to grant the request for access based on the detected movement.

In embodiments of the eight aspect, and of those features set out as in relation to seventh aspect may be implemented, wherein all references to parallax in the context of the seventh aspect apply equally to the detected movement of the eighth aspect.

A ninth aspect of the present invention is directed to a computer implemented method of regulating access to a computer system, the method comprising:

receiving from a user device a request for access to the computer system;

receiving a moving image of a user's face captured with an image capture device of the user device;

receiving sensor data captured simultaneously with the moving image by an inertial sensor of the user device;

processing the moving image to determine a pose of the user's face in the moving image;

comparing changes in the determined pose during the moving image with the sensor data; and granting the request for access only if the changes in the pose correspond to motion of the user device.

The pose may be determined by comparing the moving image with a 3D facial model.

A tenth aspect of the present invention is directed to a computer-implemented liveness detection method, the method comprising the following steps:

controlling a display of a user device to display an image to an entity;

receiving an image of the entity captured at the user device during the displaying of the image on the display;

processing the captured image to detect an eye of the entity; and determining whether a specular reflection of the displayed image is present in the eye in the captured image, thereby determining whether the eye is real.

An eleventh aspect of the present invention liveness detection system configured to implement any of the methods disclosed herein.

A twelfth aspect of the present invention is directed to a method of so controlling the operation of a user device according to a determined language setting, the method comprising the following steps:

using a data capture device of the user device to capture data from a real-world identity document of a user;

processing the captured identity document data so as to determine a language setting for the user device; and controlling the user device to output words to the user according to the determined language setting.

The language can be applied to a liveness detection test, for example to select words in a user's native language. However, the twelfth aspect is not limited to this and the language setting can be applied generally in any context, for example applied to an application executed on a user's mobile device in any context.

In embodiments, the captured data may comprise nationality data and/or issuing authority data.

The processing step may be performed by the user device, or at a remote computer system.

A set of candidate language settings may be determined by said processing, and the method may comprise receiving from the user a selection of one of the language settings from the set.

The method may comprise selecting one of a plurality of dictionaries according to the determined language setting, and selecting the words at random from the selected dictionary.

The method may comprise capturing a moving image of the user as the words are outputted at the user device, and comparing the user's lip movements in the moving image with the randomly selected words to determine whether they match.

A thirteenth aspect of the present invention is directed to a computer implemented method of regulating access to a computer system, the method comprising:

receiving from a user device a request for access to the computer system;

receiving a moving image of a user's skin captured with an image capture device of the user device;

applying to the moving image a heartbeat detection algorithm for detecting skin-colour changes indicative of a heartbeat; and refusing the request for access unless the heartbeat detection algorithm detects a series of skin-colour changes in the moving image indicative of a heartbeat.

In embodiments, the heartbeat detection algorithm may determine a time series of colour values for at least one location on the user's skin, and determined whether the time series exhibits variations indicative of a heartbeat.

The heartbeat detection algorithm may determine multiple time series of colour values, each for a different location on the user's skin.

The heartbeat detection algorithm may use the multiple time series to determine a spectrum of skin colour change frequencies exhibited by the user's skin.

The heartbeat detection algorithm may identify a dominant frequency in the spectrum, select one or more of the time series based on a power of the dominant frequency therein, and process the selected time series to determine whether they indicate a heartbeat.

The method may comprise analysing the determined spectrum and rejecting the request if the analysis classifies the spectrum as fraudulent.

The analysis may be based on electronically stored parameters learned from a set of training spectra.

The time series for each location may be determined by averaging multiple pixel values at that location.

The heartbeat detection algorithm may be applied to green pixel values of the moving image only.

Alternatively the method may comprise comprising generating a set of combined pixel values by combining red, green and blue pixel values of the moving image, wherein the heartbeat detection algorithm is applied to the combined pixel values.

The method may comprise applying at least one of the following processes to the moving image:

filtering based an expected human heartbeat frequency;

detrending; or smoothing;

wherein the heartbeat detection algorithm is applied to the processed image.

The moving image may be a moving image of the user's face.

The method may comprise applying facial recognition to the moving image to identify a skin region of the user's face, to which the heartbeat detection algorithm is applied.

The method may comprise applying motion reduction to the moving image, wherein the heartbeat detection algorithm is applied to the motion-reduced image.

Applying the motion reduction may comprise applying image stabilization to frames of the moving image.

Alternatively or in addition, applying the motion reduction comprises selecting a subset of frames of the moving image exhibiting reduced motion.

A fourteenth aspect of the present invention is directed to a computer system comprising:

an access module configured to receive from a user device a request for access to the computer system; and a liveness detection module configured to receive a moving image of a user's skin captured with an image capture device of the user device, and apply to the moving image a heartbeat detection algorithm for detecting skin-colour changes indicative of a heartbeat; and wherein the access module is configured to refuse the request for access unless the heartbeat detection algorithm detects a series of skin-colour changes in the moving image indicative of a heartbeat.

A fifteenth aspect of the present invention is directed to a computer system configured to implement any of the methods or systems disclosed herein.

Any of the features of any one of the above aspects or any embodiment thereof may be implemented in embodiments of any of the other aspects. Any of the method disclosed herein may be implemented by logic (e.g. software modules) of a corresponding system. Similarly any of the system functionality disclosed herein may be implemented as steps of a corresponding method.

According to another aspect of the present invention, a computer program product comprises code stored on a computer-readable storage medium and configured when executed to implement any of the method steps or system functionality disclosed herein.

BRIEF DESCRIPTION OF THE DRAWINGS

To aid understanding of the present invention, and to show how the same may be carried into effect, reference is made by way of example to the following figures, in which:

FIGS. 6A and 6B show various functional modules of a liveness detection system in a second embodiment of the present invention;

FIGS. 16A and 16B show examples of facial landmarks for use in a first example of liveness detection process based on relative motion between a user and a user device;

DETAILED DESCRIPTION OF PREFERRED EMBODIMENTS

The preferred embodiments of the present invention that are described below are implemented based on a comparison of biometric data with probability density functions that have been generated from closed-form equations—no machine learning is required.

Figure 1:
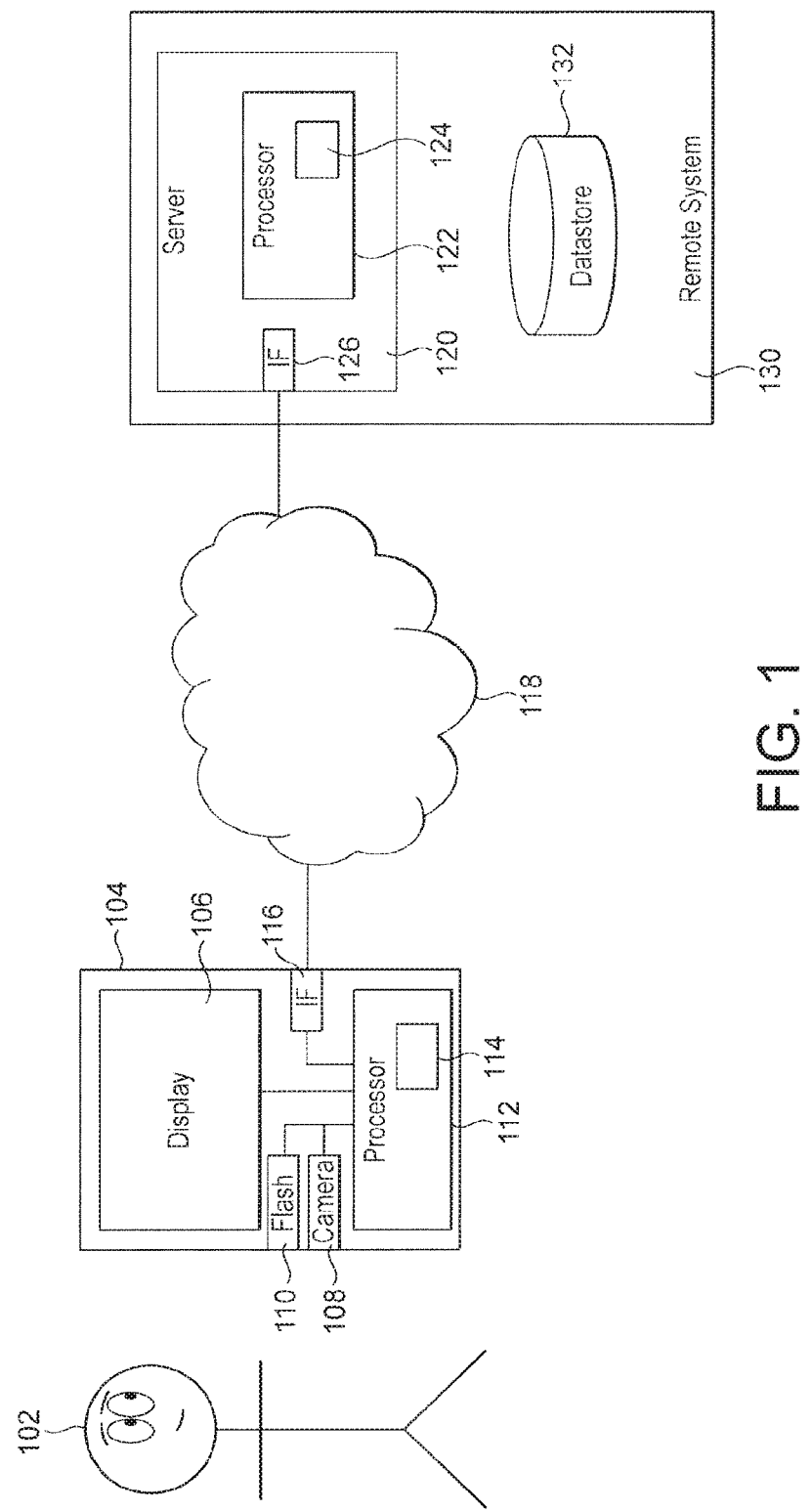
FIG. 1 shows a block diagram of a computer system.

FIG. 1 shows a block diagram of a computer system, which comprises a user device 104 available to a user 2; a computer network 118; and a remote computer system 130 i.e. remote from the user device 104. The user device 104 and remote system 130 are both connected to the network 118, so that data can be transmitted and received between the user device 104 and the remote system 130.

The user device 104 is a computer device which can take a number of forms, such as a mobile device (smartphone, tablet etc.), laptop or desktop computer etc.

The user device 104 comprises a display 106; a camera 108 and camera flash 110; a network interface 116; and a processor 112, formed of one or more processing units (e.g. CPUs), to which each of the aforementioned components of the user device 104 is connected. The processor 112 is configured to execute code, which include a liveness detection application ("app") 114. When executed on the processor 112, the liveness detection app 114 can control the display 106, camera 108 and flash 108, and can transmit and receive data to and from the network 118 via the network interface 116.

The camera 108 is capable of capturing a moving image i.e. video formed of a temporal sequence of frames to be played out in quick succession so as to replicate continuous movement, that is outputted as a video signal from the camera 108. Each frame is formed of a 2-dimensional array of pixels (i.e. image samples). For example, each pixel may comprise a three-dimensional vector defining the chrominance and luminance of that pixel in the frame.

The camera 108 is located so that the user 102 can easily capture a moving image of their face with the camera 108. For example, the camera 108 may be a front-facing camera integrated in a smartphone, tablet or laptop computer screen, or an external webcam mounted on a laptop or desktop display screen.

The flash 110 is controllable to emit relatively high intensity light. Its primary function is to provide a quick burst of illumination to illuminate a scene as the camera 108 captures an image of the scene, though some modern user devices such as smartphones and tablets also provide for other uses of the camera flash 110 e.g. to provide continuous illumination in a torch mode.

The display 106 outputs information to the user 102 in visual form, and may for example be a display screen. In some user devices, the display screen may incorporate a touch screen so that it also functions as an input device for receiving inputs from the user 102.

The remote system 130 comprises at least one processor 122 and network interface 126 via which the processor 122 of the remote system is connected to the network 118. The processor 122 and network interface 126 constitute a server 120. The processor is configured to execute control code 124 ("back-end software"), which cooperates with the liveness detection app 114 on the user device 104 to grant the user device 104 access to the remote system 130, provided certain criteria are met. For example, access to the remote system 130 using the user device 104 may be conditional on the user 102 successfully completing a validation process.

The remote system 130 may for example comprise a secure data store 132, which holds (say) the user's personal data. In order to keep the user's data secure, the back-end software 124 makes retrieval of the user's personal data from the database 132 using the user device 104 conditional on successful validation of the user 102.

Embodiments of the present invention can be implemented as part of the validation process to provide a validation process that includes a liveness detection element. That is, access to the remote system 130 may be conditional on the user 102 passing a liveness detection test to demonstrate that they are indeed a living being. The validation process can also comprise other elements, e.g. based on one or more credentials, such as a username and password, so that the user 102 is required not only to demonstrate that they what they say they are (i.e. a living being) but also that they are who they say they are (e.g. a particular individual)—note hover that it is the former that is the focus of the present disclosure, and the liveness detection techniques can be implemented separately and independently from any identity check or without considering identity at all.

Figure 2A:
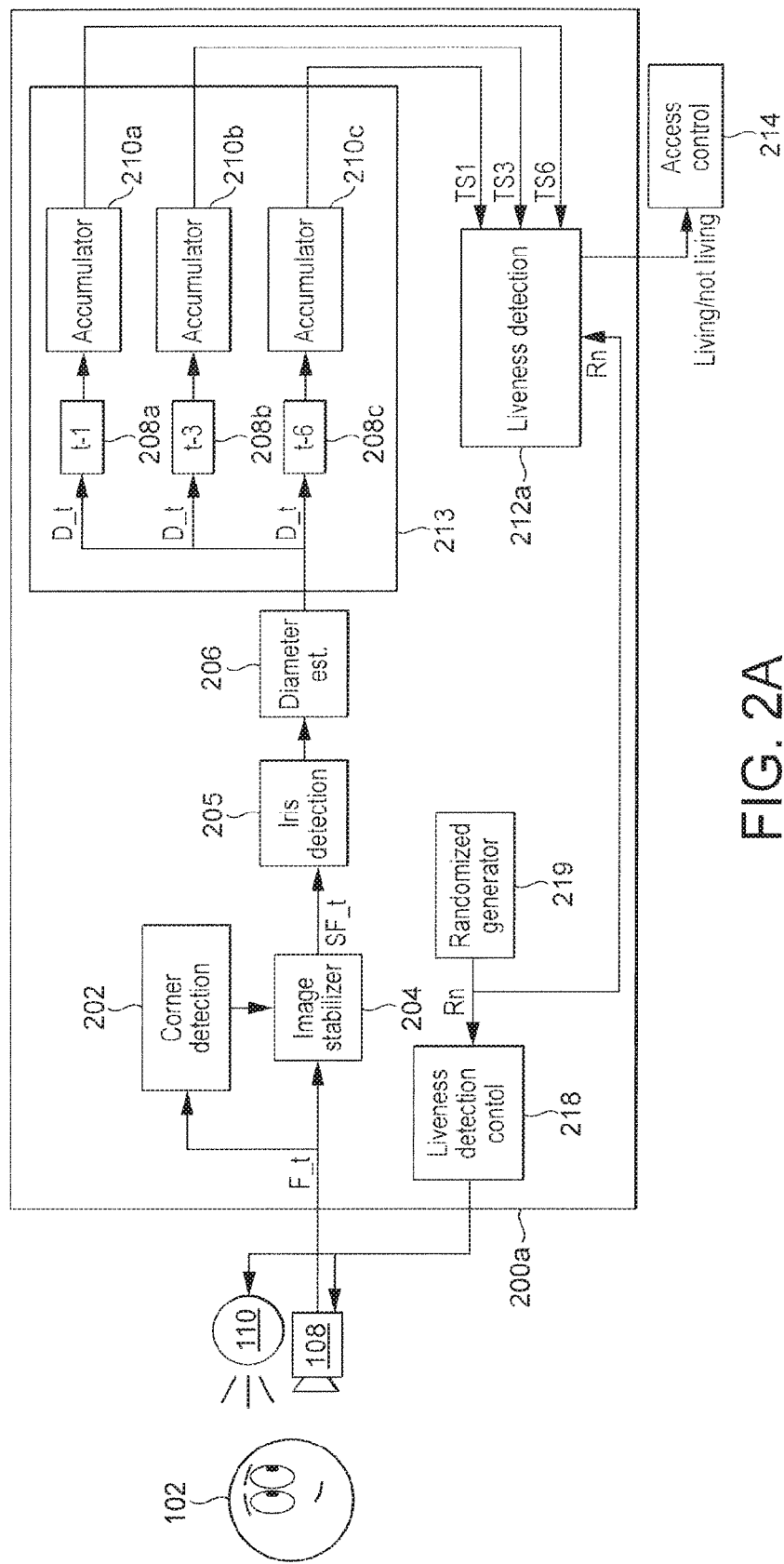
FIGS. 2A, 2B and 2C show various functional modules of a liveness detection system in a first embodiment of the present invention.

FIG. 2A shows a liveness detection system 200a in a first embodiment of the present invention. The liveness detection system 200a comprises the following functional modules: a liveness detection controller 218 connected to control the camera 108 and flash 110 (or alternatively the display 106); an image stabilizer 204 having an input connected to receive a video signal from the camera 204; a corner detector 202 having an input connected to receive the video signal and an output connected to the image stabilizer 204; an iris detector 205 having an input connected to receive a stabilized version of the image signal from the image stabilizer 204; a diameter estimator 206 having an input connected to an output of the iris detector 206 and an output; first second and third time differential modules 208a, 208b, 208c, each having a respective input connected to the output of the diameter estimation module 206; first, second and third accumulators 210a, 210b, 210c having respective inputs connected to the outputs of the first, second and third time differential modules 208a, 208b, 208c respectively; a first liveness detection module 212a having first, second and third inputs connected to outputs of the first, second and third accumulators 210a, 210b, 210c respectively; and a randomized generator 219 which generates randomized (e.g. random or pseudo-random) data Rn, and outputs the randomized data Rn to both the liveness detection controller 218 and the liveness detection module 212a. The modules 208a, . . . , 210c constitute a velocity measurement module 213.

Figure 2B:
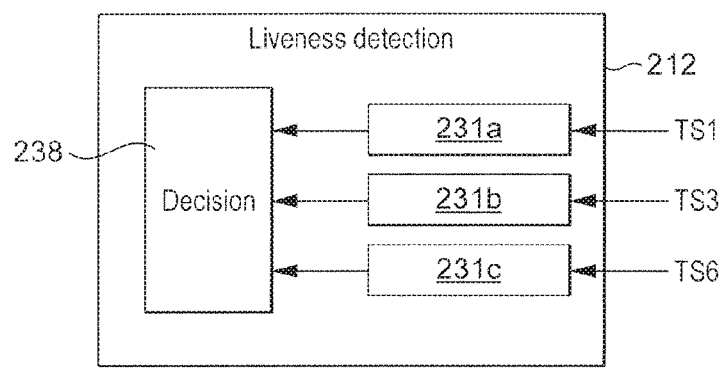

FIG. 2B shows additional details of the liveness detection module 212a. The liveness detection module 212a comprises first second and third comparison modules 231a, 231b, 231c having inputs connected to the outputs of the first, second and third accumulators 210a, 210b, 210c respectively; and a decision module connected to receive inputs from each of the comparison modules 231a, 231b, 231c.

Figure 2C:
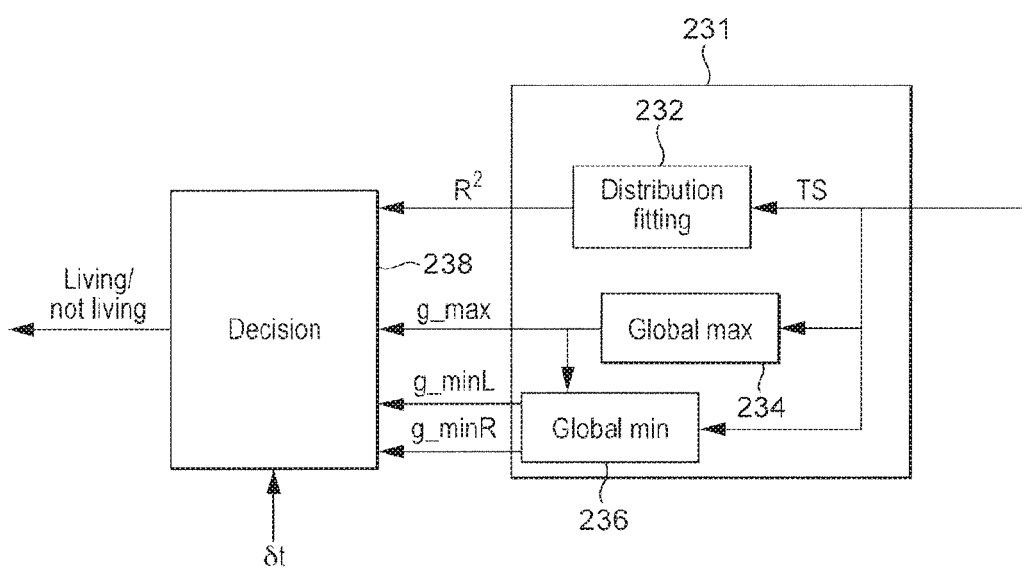

FIG. 2C shows how each of the comparison modules 231a, 231b, 231c (for which the general reference sign 231 is used) comprises a distribution fitting module 232, a global maximum estimation module 234, and a global minimum estimation module 236. The decision module has inputs connected to outputs of the modules 232, 234, 236, and an additional input connected to receive the randomized data Rn.

The randomized data Rn is in the form of one or more randomly generated parameters of the liveness detection process of the first embodiment, referred to as a pupil dilation ("PD") parameter set in the context of this embodiment.

The functional modules of the liveness detection system 200a are software modules, representing functionality implemented by executing the liveness detection app 114 on the user device 104, or by executing the back-end software 124 on the server 120, or a combination of both. That is, the liveness detection system 200a may be localized at a single computer device, or distributed across multiple computer devices.

The liveness detection system outputs a binary classification of the user 102, classifying the user 102 as either living or non-living, which is generated by the liveness detection module 212a based on an analysis of a moving image of the user's face captured by the camera 108.

Figure 2D:
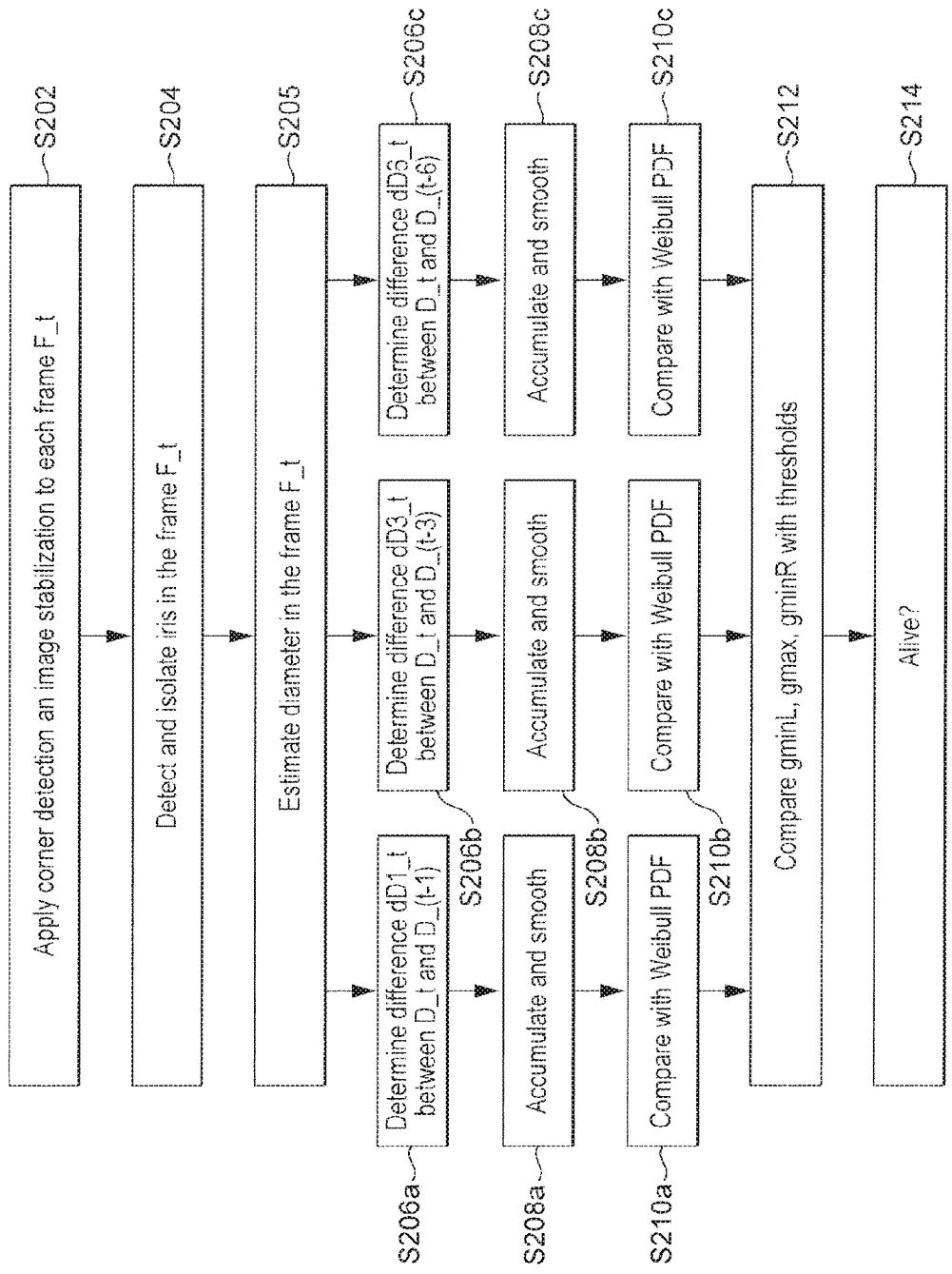
FIG. 2D shows a flow chart for a liveness detection method in the first embodiment.

The liveness detection system 200a of the first embodiment implements a technique for anti-spoofing based on pupillary light reflex. The technique will now be described with reference to FIG. 2D, which is a flow chart for the method.

Before commencing the technique, the liveness detection app 114 outputs an instruction to the user 102 that they should look at the camera 108, so that their face is within the camera's field of view. For example, the app 114 may display a preview of the video captured by the camera, with instructions as to how the user should correctly position their face within the camera's field of view.

In a liveness test performed according to Rn, the liveness detection controller 218 controls the camera 108 and camera flash 110 (or the brightness level of the display 106) of the user device 102 to perform the following operations. The camera flash 110 (or display 106) emits random light modulated pulses with a frequency of more than 0.33 Hz (~1 pulse every 3 seconds). The camera 108 stars recording video frames the moment that the flash 110 (or display 106) starts emitting the light pulses.

Each video frame comprises a high-resolution image of at least one of the user's eyes (right or left).

The recording continues for about three seconds in total, so as to capture a three second moving image of the user's face i.e. three seconds worth of video frames (typically between about 60 and 90 video frames for a conventional smartphone or tabled).

The light pulses are modulated based on the PD parameter set Rn, as generated by the randomized generator 219, in the following manner. At least two light pulses are emitted within the three second window—one at the start of the interval when recording commences, and at least one more whilst the recording is in progress. The two light pulses are separated in time by a randomly chosen time interval δt that is defined by the PD parameter set Rn. In some implementations, three or four (or more) light pulses may be used, all having random temporal separations relative to one another.

The intensity of each of the later light pulse(s) is greater than that of the light pulse(s) preceding it. If light pulses of the same intensity were used each time, the pupillary response would diminish with each pulse due to the eye becoming accustomed to the light level of the pulses. Increasing the intensity of each pulse ensures a measurable physiological reaction by the pupil to each light pulse.

Every video frame that is recorded is timestamped i.e. associated with a time value defining when it was captured relative to the other frames. This enables the in the behaviour and position of the user's iris for each desired time interval. The notation F_t is used to represent a video frame having timestamp t hereinbelow and in the figures.

The following steps are then performed for each video frame F_t, for one of the user's eyes (or for each eye separately).

Figure 3:
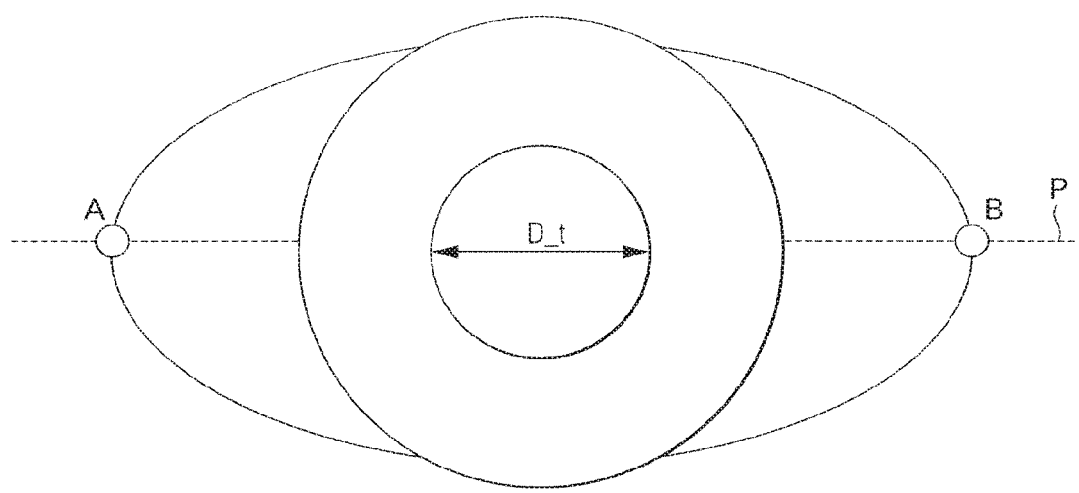
FIG. 3 illustrates some of the principles of eye corner detection for an image stabilization technique.

At step S202, corner detection techniques are used to detect two reference points of the eye in the frame F_t—shown in FIG. 3 and labelled "A" and "B"—corresponding to the corners of the eye. Image stabilization is used to place the points A and B on a reference plane P common to all frames i.e. a rotational transformation is applied to the frame F_t, as necessary, so that the points A and B in all of the stabilized (i.e. rotated) versions of the video frames lie in the same reference plane P. In this example, the plane P is the horizontal place in the coordinate system of the frames, meaning that the points A and B are vertically aligned in all of the stabilized versions of the frames. This enables the movements and the size of the pupil to be isolated, as it removes the effects caused by any rotation of the user's head during the capturing of the video.

The notation SF_t is used to represent the stabilized version of the frame F_t.

At step S204 the iris is detected and isolated in the stabilized video frame SF_t, using machine learning and blob detection techniques. The application of such techniques to iris detection are known in the art.

The diameter of the iris remains substantially constant—any changes in the diameter of the iris in the video can be assumed to be caused by movement of the user's head. These could be accounted for e.g. by applying a scaling transformation to the video frames to keep the iris diameter constant in the stabilized frames, though in practice this may be unnecessary as the iris diameter will remain substantially constant in the video provided the user keeps their head still during the recording.

By contrast, the diameter of the pupil changes in response to the light pulses—this is a physiological response to the light pulses, and is used at the basis for liveness detection in this first embodiment.

At step S205, the diameter "D_t" of the pupil in the frame SF_t s estimated in pixels.

Figure 5A:
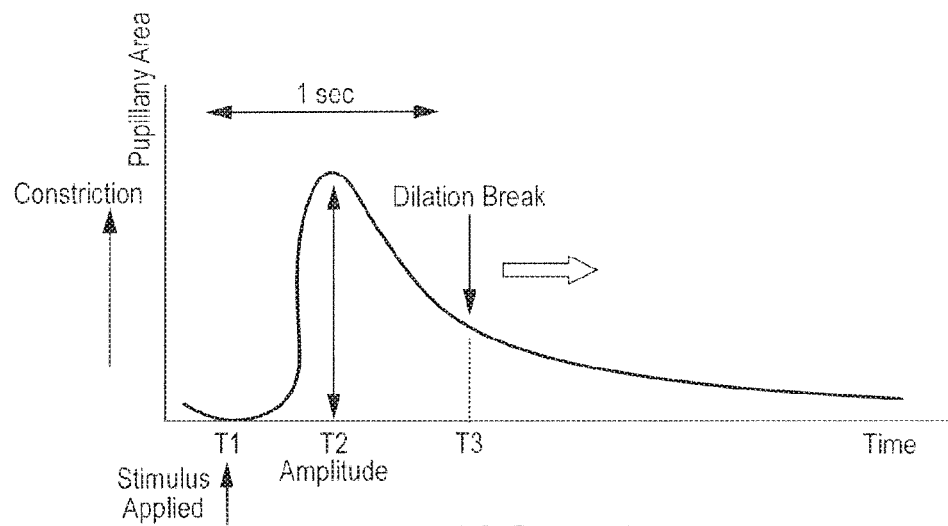
FIGS. 5A-5C is a graph showing how the pupillary area of an eye responds to a light pulse stimulus.

FIG. 5A shows a graph illustrating how the diameter of the pupillary area is expected to change over time in response to a light pulse stimulus at time T1. The graph tracks the change of the pupillary area of the eye after a light stimulus of medium/high intensity is applied to the eye.

Immediately following the stimulus the pupil is rapidly contracted (i.e. its diameter decreases) in response until reaching a maximum contraction (minimum diameter) at time T2, after which it gradually dilates (i.e. its diameter increases) back towards its original contraction. At time T3, approximately 1 second after the stimulus time T1 there is a noticeable genuflection in the response curve i.e. a relatively sudden decrease in the rate of pupil dilation. This is called the "dilation break".

Figure 5B:
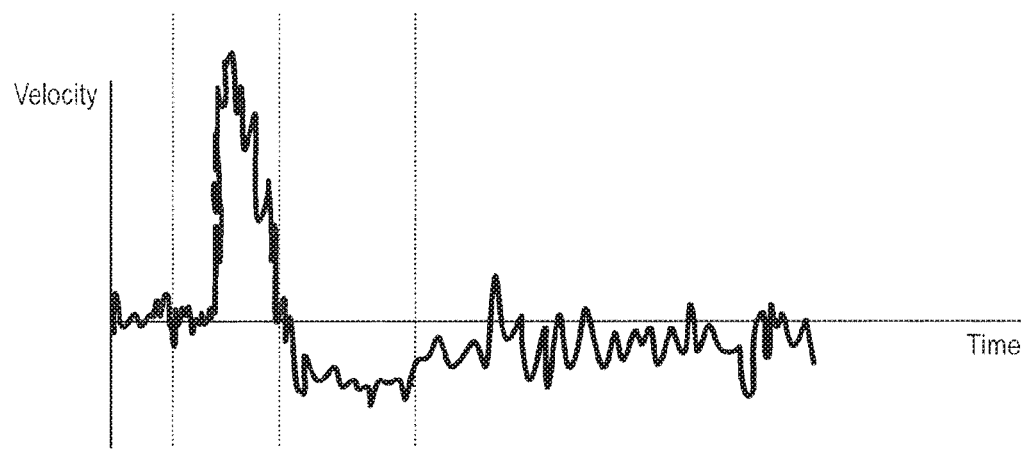

FIG. 5B shows the rate of change in the pupil diameter over the same time interval i.e. the velocity of contraction (positive velocity) or dilation (negative velocity). The pupil diameter exhibits rapid, essentially random fluctuations. Nevertheless, the velocity response has an overall structure over larger time scales that is still evident.

Figure 5C:
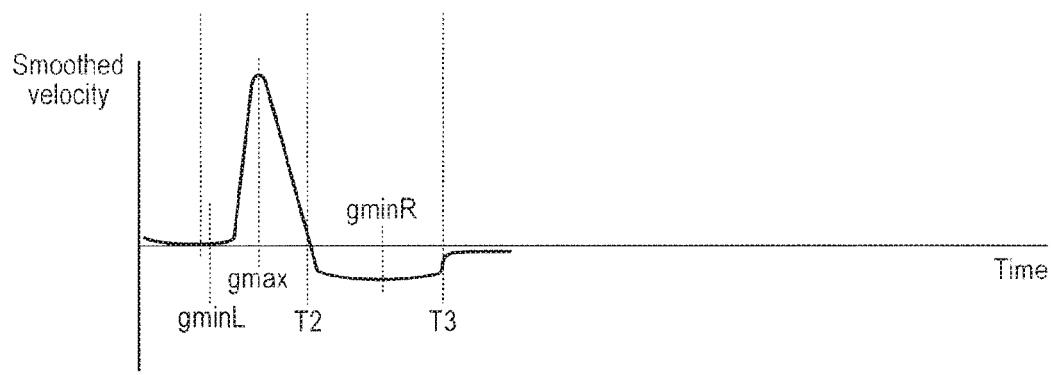

FIG. 5C shows a smoothed version of the velocity curve of FIG. 2C, in which the rapid fluctuations have been averaged out by taking a windowed average of the velocity curve with a window large enough to eliminate the fluctuations but small enough to preserve the overall structure.

As can be seen in FIG. 5C, at time T2 the velocity is zero. Between T1 and T2, the velocity reaches its local peak value (i.e. local maximum) at a time g_max. The smoothed velocity curve has local minima immediately to the left and right of time g_max, at times g_maxL and g_maxR respectively. These are immediate in the sense of being closest in time i.e. such that that there are no other local minima between g_max and g_minL or between g_max and g_minR.

The time g_minL is near to the time T1 that the stimulus is applied. The time g_minR is after the time T2 (at which the pupil stops contracting and starts dilating) but before T3 (the dilation break, at which the pupil dilation slows suddenly). That is, g_minR occurs in the well-defined temporal range between T2 and T3.

The physiological response by a real, human pupil to the stimulus is such that g_max, g_minL and g_minR are expected to satisfy a certain relationship—specifically that g_max-g_minL is no more than a first known value Δt1 and g_minR-g_max is no more than a second known value Δt2. The second interval Δt2 is of the order of a second, whereas the first interval Δt1 is at least an order of magnitude lower.

At the times g_max, g_minL and g_minR, the acceleration of the pupil is zero.

Figure 5D:
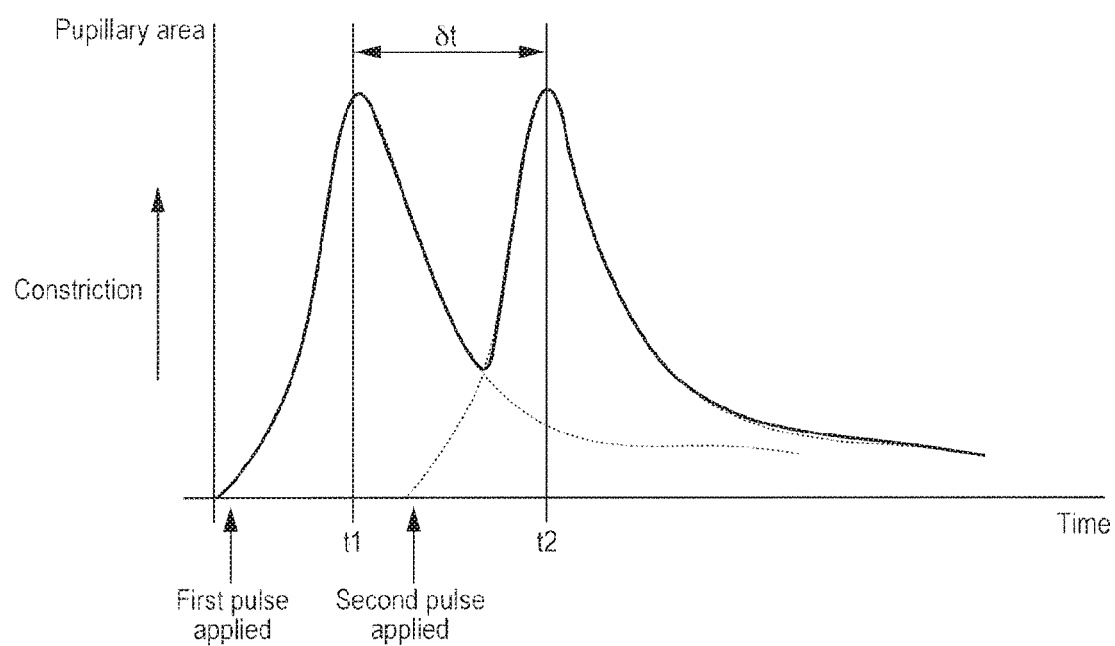
FIG. 5D is a graph showing how the pupillary area response to two light pulses in relatively quick succession.

As mentioned above, at least two light pulses, having a random temporal separation, are emitted whilst the video is recorded. FIG. 5D shows the pupillary response to the two light pulses separated in time by an interval δt. In response to the first pulse, the pupillary area traces the response curve of FIG. 5A, until the second pulse is applied causing the eye to retrace the response curve of FIG. 5A a second time. The intensity of the second pulse is greater than that of the first pulse by an amount such that the second pulse causes substantially the same level of contraction as the first pulse. That is, the curve of FIG. 5D corresponds to two instances of the curve of FIG. 5A, separated in time by δt.

FIGS. 5A-5D are provided simply to aid illustration—as will be appreciated, they are highly schematic and not to scale. Velocity curves computed from measurements of real human eyes may exhibit more complex structures, but are nevertheless expected to satisfy the aforementioned relationship.

A differential dD of the pupil diameter D_t is estimated on different time intervals by:

Comparing the pupil diameter D_t at time t with the iris diameter D_(t-1) at time t-1 (S208a), to compute a difference "dD1_t" between D_t and D_(t-1)—e.g. dD1=D2-D_(t-1) (S206a);

Comparing the pupil diameter D_t at time t vs iris diameter D_(t-3) at time t-3, to compute a difference between "dD3_t" and D_(t-3) (S206b);

Comparing the pupil diameter D_t at time t vs iris diameter D_(t-6) at time t-6, to compute a difference "dD6_t" between D_t and D_(t-6) (S206c).

Figure 4:
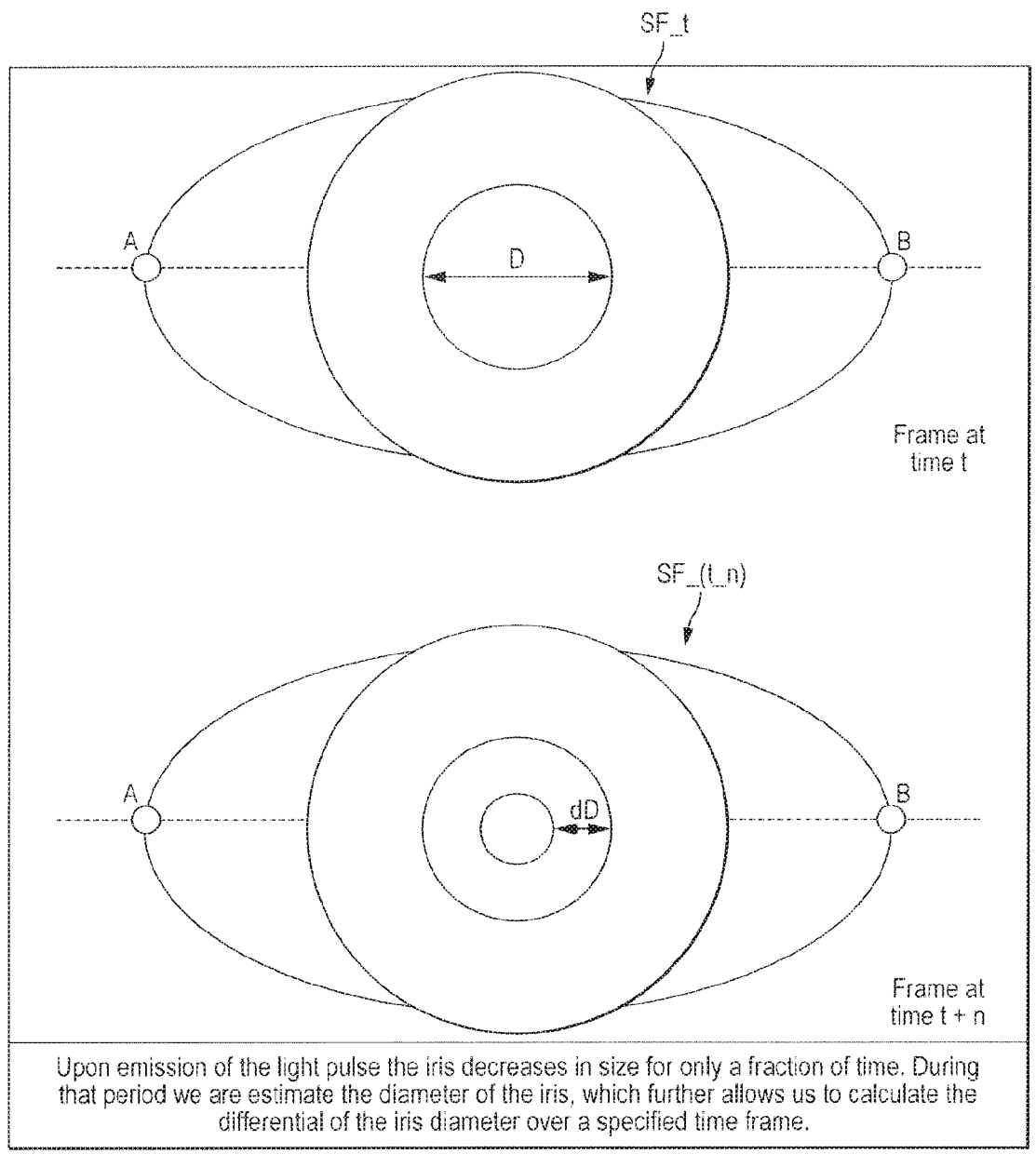
FIG. 4 demonstrates a pupil's response to a light pulse stimulus during a liveness detection process.

FIG. 4 illustrates an example of a differential dD between time t and time t+n (n=1, 3 or 6).

At steps S208a, S208b, S208c respectively, each of the diameter differentials dD_t is accumulated over time to form a respective velocity distribution in the form of a time series of differential values:

$$( \ldots, dD\_T, dD\_(T+1), dD\_(T+2), \ldots )$$

to which a moving average is applied in order to smooth it. The smoothed version of each time series is denoted TS1, TS3 and TS6 respectively, below and in the figures, and describes the rate at which the size of the pupil is changing at different points in time (i.e. the pupil's velocity).

The liveness detection module 212a analyzes each time series TS1, TS3, TS6 in order to identify if it is fit closely to a Weibull probability density function (PDF), sometimes referred to as a Frechet PDF. The analysis is performed by computing fit measure for the time series.

The Weibull PDF represents the expected pupillary response to the two light pulses as illustrated in FIG. 5D, and has predetermined coefficients, set to match the expected behaviour of human eyes in response to the two light pulses, as illustrated in FIGS. 5A-5D. The behaviour of human eyes is sufficiently predictable across the human population, that most human pupils will exhibit a physiological response to each light pulse that fits the Weibull PDF to within a certain margin of error. No machine learning techniques are needed to set the parameters—the Weibull PDF for a given δt can be computed efficiently (i.e. using minimal processing resources) based on closed-form equations for a given value of δt.

An example of a suitable fit measure is a weighted sum of squared errors $R^2$, defined as:

$$R^2 = \sum_{o \in TS} \frac{(o - e_o)^2}{\sigma^2}$$

where o is an element of the smoothed time series TS (the summation being over all elements in TS), $e_o$ is the value of o predicted by the PDF, and $\sigma^2$ is the variance of the time series TS. Three $R^2$ metrics are computed separately—one for each smoothed time series TS1, TS3, TS6.

For each of the at least two light pulses, a local maximum g_max of each time series is computed as:

g_max=arg_max_t(dD_t)

That is, g_max is the time t at which the rate of contraction in response to the applicable light pulse is greatest (see FIG. 5C, and the accompanying text above). The times g_minL and g_minR immediately before and after g_max are also computed for each light pulse and for each time series TS1, TS3, TS6.

To determine whether the user is a living being or not, the decision module 238 performs the following operations for each time series TS1, TS3, TS6.

The weighted errors measure $R^2$ of that time series is compared with a threshold.

For each light pulse, a time difference g_max–g_minL between g_minL and g_max is computed, and compared to a first time threshold dtthreshold1. A time difference g_minL–g_max between g_max and g_minR is also computed and compared to dtthreshold2. The first and second time thresholds dtthreshold1, dtthreshold2 are set to match the expected time differences Δt1 and Δt1 respectively (see text above accompanying FIG. 6C).

The separation in time between the two response curves is measured for each time series, for example by measuring the separation in time between the times of peak contraction at which dD_t=0.e. corresponding to times t1 and t2 in FIG. 5D. For each additional light pulse used in excess of two, an equivalent temporal separation is measured and compared to the known (random) separation of that light pulse from one of the other light pulses.

If and only if:
$R^2$ is below the threshold (indicating a good fit of the time series TS to the Weibull graph for each time series;
both of the time differences are within their respective time thresholds dtthreshold1, dtthreshold2 for each time series and each time pulse; and
The measured separation between times t1 and t2 matches the random time interval δt i.e. t2−t1=δt to within a predetermined margin of error for each time series (and for each δt in the case of three or more light pulses)
then the decision module 256 concludes that the user 104 is alive. That is, if and only if all of these criteria are fulfilled does the liveness detection system 200a conclude that the user 104 is a living being. In the event that an entity masquerading as a living being assumes the role user 104, such as a photograph or detailed model of the user 102, it will not exhibit the necessary pupil response to satisfy these criteria, so the system will correctly identify it as non-living.

Whilst the above uses a Weibull PDF, more generally, any suitable extreme value theory probability distribution function can be used in place of the Weibull PDF to model the expected response of the human pupil of FIG. 5A and thereby achieve the same effect.

The random separation δt between the two light pulses is of the order of one second, corresponding to low frequency modulations. To provide additional robustness, randomized high frequency modulations of the light pulse can also be introduced. In this case, the high frequency modulations are compared with reflections from the eye and a match between the reflections and the high-frequency modulations is also required for the entity to be identified as living.

The technique of the first embodiment can also be implemented using a single light pulse, at a random time relative to the start of the video. The pupillary response in the video is compared with the random timing to check whether it matches.

A liveness detection technique which uses modulated illumination is disclosed in published UK patent application GB2501362. GB2501362 relates to an authentication process, in which a code is sent from a server to a user-device equipped with a source of illumination and a camera capable of capturing video imagery of an online user. The user device modulates the source of illumination in accordance with the code, and at the same time captures video imagery of the user.

In GB2501362, the pattern of illumination on the user's face is extracted and analyzed to deduce the code used to control it. The extracted, code is then compared to the transmitted code. However, GB2501362 fails to recognize the possibility of using an expected physiological, human response to randomized light pulses illumination as a basis for liveness detection.

FIG. 6B shows a block diagram of a liveness detection system 200b in a second embodiment. The system 200b implements a technique for anti-spoofing based on tracking the iris movement by presenting elements at random positions of the screen.

In the second embodiment, in a liveness test performed according to Rn, the liveness detection controller controls the display 106 and the camera 108 of the user device. In the second embodiment, the liveness detection controller uses randomized data Rn generated by the randomized generator 219 to display randomized display elements at randomized locations on the display 106 in a liveness detection test. The randomized data Rn is in the form of one or more parameters that define the display locations, referred to as an eye tracking ("ET") parameter set in the context of the second embodiment.

The corner detector 202, image stabilizer 204 and iris detector 205 are connected as in the first embodiment, and perform the same operations. The system 200b comprises the following functional modules, in addition: a spatial windowing module 207 having an input connected to an output of the iris detection module 205; and a patent analysis module 209 having a first input connected to an output of the spatial windowing module 207 and a second input connected to receive the stabilized video frames from the image stabilizer 204; and a second liveness detection module 212b.

FIG. 6B shows additional details of the pattern analysis and liveness detection modules 207, 212b. The pattern analysis module comprises a plurality of histogram determination modules h1, . . . ,h9 (nine in this example), each of which is connected to receive the current stabilized video frame SF_t and has a respective output connected to a respective first input the liveness detection module 212b.

Returning to FIG. 6A, the liveness detection module 212b has a second input connected to receive the randomized data Rn, and outputs a binary classification of an entity subject to the test (the user 102 in this example) as living or non-living, as in the first embodiment.

The liveness detection technique implemented by the system 200b of the second embodiment will now be described with reference to FIG. 6C, which is a flow chart for the method. The method is based on tracking the iris movement by presenting elements at random positions of the screen.

A device displays a 'following element' on its screen that moves to the predetermined positions (randomly assigned) that correspond to a block of a square grid of predefined size. These positions are not set by the user and are intended to guide the user to track their eye movement. The user is requested to track the random movements with their eyes. During the whole process the device is recording the eye movements of the user.

The steps of the technique are the following:

At step S602, the liveness detection controller 218 controls the display 106 of the user device 104 to display a display element on its screen which moves between random display locations, defined by the randomized data Rn.

Figure 7A:
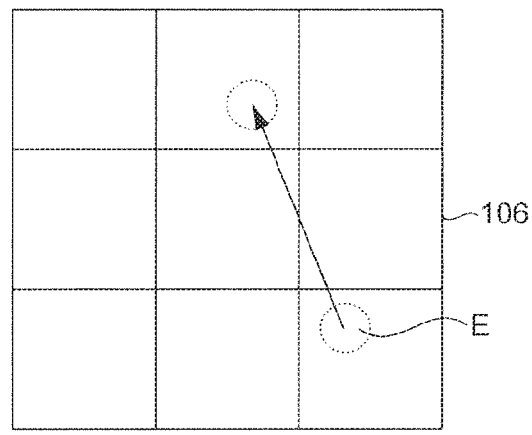
FIG. 7A illustrates a display element exhibition randomized motion.
Figure 7B:
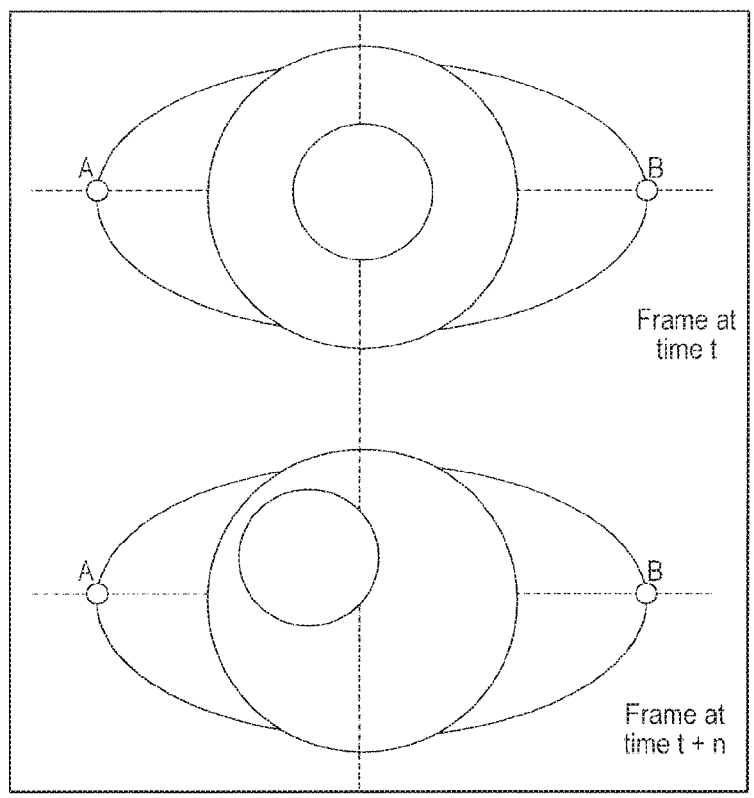
FIG. 7B illustrates movements of an eye when tracking a visible element.

This is illustrated in FIG. 7A, which shows a display element moving from a randomly chosen location in the bottom block ("9") of the grid to the top middle block ("2") of the grid. The possible display locations correspond to the blocks (equivalently referred to herein as "regions" or "sectors") of a 3×3 grid defined in relation to the display 106, which are predetermined by the system 200b (e.g. at the user device 104) but not by the user 102. The user 102 is requested to track the random movements with his eyes. A high-resolution moving image of the user's face is captured by the camera 108 as the user follows the moving display element (S604).

Every video frame that is recorded is timestamped in order to know precisely the behaviour and position of the iris for each time interval, exactly as in the method of the first embodiment.

The following operations are performed for each frame F_t of the moving image, for at least one of the user's eyes (or for each eye separately).

At step S606, corner detection and image stabilization algorithms are applied to the frame F_t in order to place the points A and B on the same plane P so that the movements and the size of the iris can be isolated. Step S606 corresponds exactly to step S202 of FIG. 2C, and the description applies equally in this instance. The iris in the frame F_t is detected using machine learning and blob detection techniques (S608, corresponding exactly to step S204 of FIG. 2).

As the display element E moves across the display, the eye follows it causing discernible motion of the pupil relative to the plane P. This is illustrated in FIG. 7C (note the eye movement illustrated in FIG. 7C does not correspond to the display element movement shown in FIG. 7A).

Figure 8:
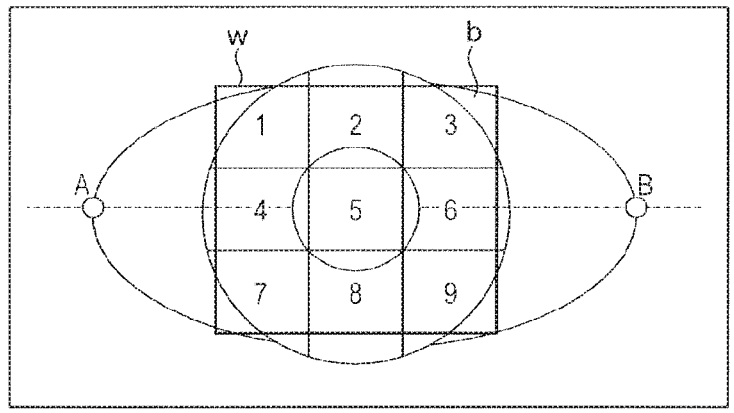
FIGS. 8 and 9 illustrate some of the principles of an eye tracking technique.

At step S610, a window region around the iris ("iris window") is identified by the spatial windowing module 207, based on the iris detection of step S608. The window W is shown in FIG. 8. The isolated iris window is divided into a region of 3×3 blocks, labelled "1" through "9" in FIG. 8, corresponding to the 3×3 blocks of the grid defined in relation to the display. That is, the window W is divided into N blocks, where N=9 in this example.

Figure 10A:
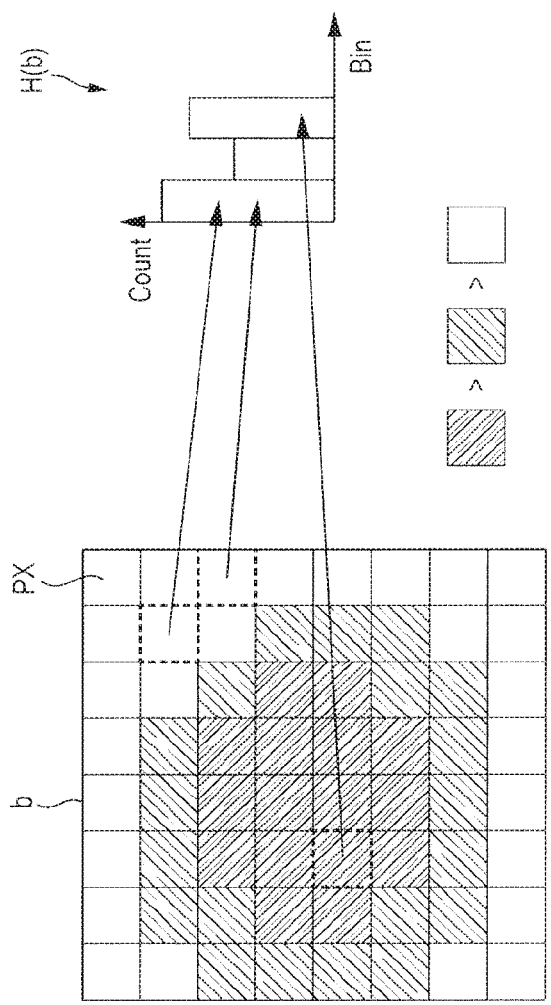
FIGS. 10A and 10B illustrates a process by which histograms describing movements of an eye can be generated.

At step S612, for each block, a respective histogram is generated based pixel values. FIG. 10A illustrates the technique used to generate the respective histogram. FIG. 10A shows an exemplary block b formed of an array of pixels. Each of the pixels can take one of three values, represented by different shading (note this is an extremely simplified example presented to aid understanding).

A histogram H(b) is for the block b is generated. The histogram H(b) has a bin for each possible pixel value (so three bins in this extremely simplified example), and that bin defines the number of pixels in the block b having that value (i.e. the count for that bin).

In reality, there may be thousands of different pixel values though in some cases the range may be reduced using suitable quantization i.e. so that each bin of the histogram corresponds to a range of multiple pixel values—in the preferred technique described below, extreme quantization is applied whereby each pixel is quantized to one of two values representing light and dark.

Figure 10B:
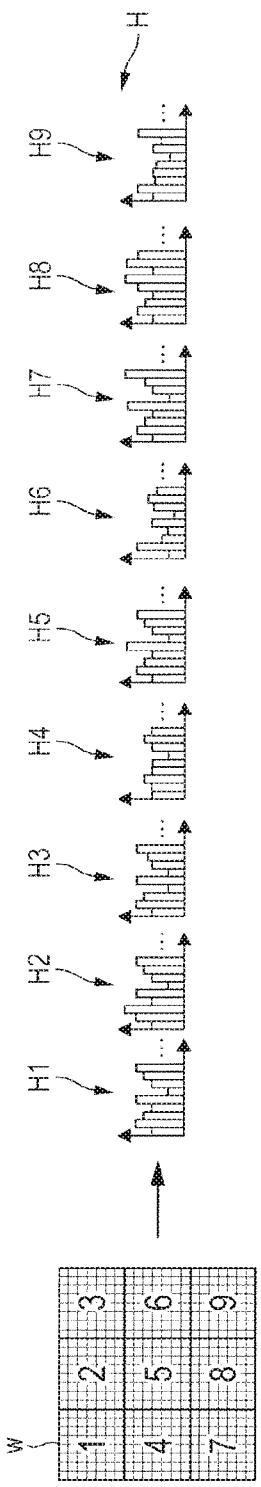

An individual histogram (H1, . . . ,H9) is generated in this way for each of the nine blocks of the iris window, as illustrated in FIG. 10B. The set of nine histograms is denoted H.

Figure 9:
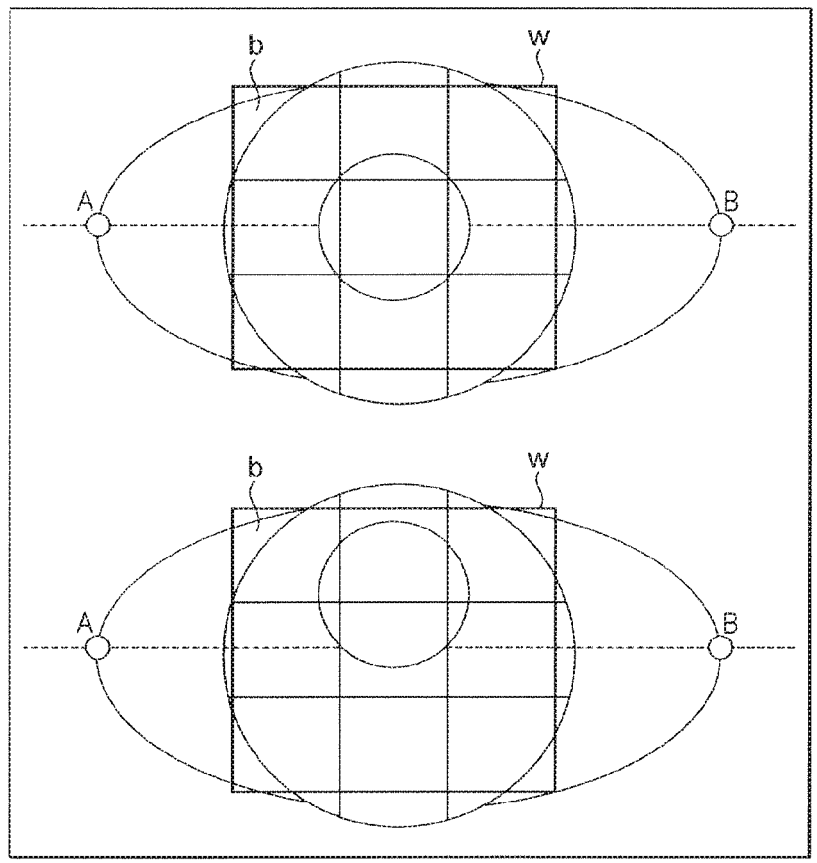

The histogram for a block b dominated by dark pixels—as occurs when pupil is in that block in the video—is measurably different from the histogram of a block b dominated by the lighter colours of the iris and/or sclera of the eye. Thus, as the eye moves between different blocks b of the window W (see FIG. 9), the histograms H change accordingly, in a predictable manner. This allows the movement to be examined without having to rely on machine learning techniques.

Whenever a movement of the element on the display 106 occurs, a change in the histograms H is expected to occur. Thus, for each movement of the display element on the display 106, the change in the histogram of the iris movement is compared with the change in the location of the display element in order to evaluate if the iris moved to the correct block i.e. as would be expected if the eye were a real human eye tracking the display element. If after a predetermined number of movements the system identified that the user didn't follow the element correctly, the user would be classified as trying to spoof the system.

FIGS. 10A and 10B illustrate a situation in which pixel values are used to generate histograms for blocks b directly. However, in a preferred technique, the blocks b are first divided into sub-blocks, and block values are assigned based on the sub-blocks.

In this preferred technique, before generating the histograms for the frame F_t, the frame F_t is converted to grayscale i.e. each pixel is converted to a single value carrying only intensity information.

Figure 13:
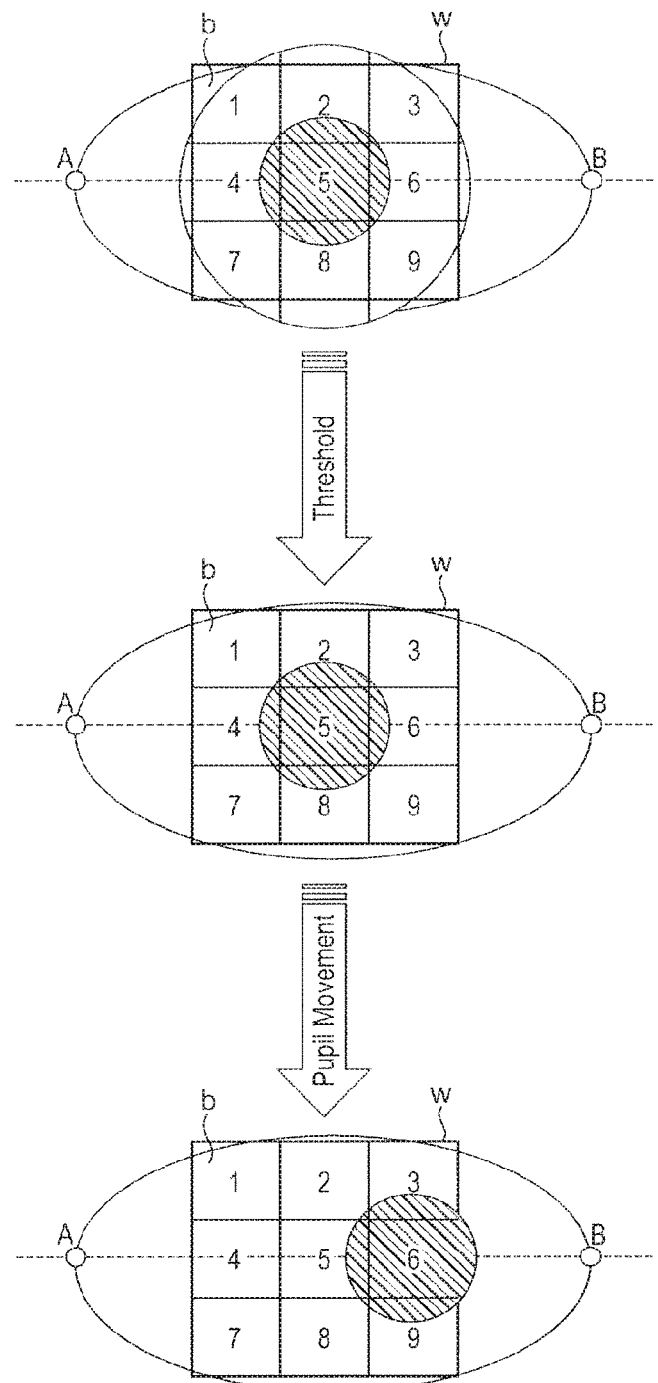
FIG. 13 illustrates how an eye movement is manifest in a sequence of grayscale video frame images.

As shown in FIG. 13, binary thresholding is applied to the grayscale image, such that if the value of a pixel is less than a predetermined threshold then its value is set equal to black (value "1"); otherwise set it equal to white (value "0"). This allows the pupil to be isolated completely. The thresholding removes the iris texture (in this example, the movement of the pupil alone is used to track eye movements)

Figures 14A, 14B:
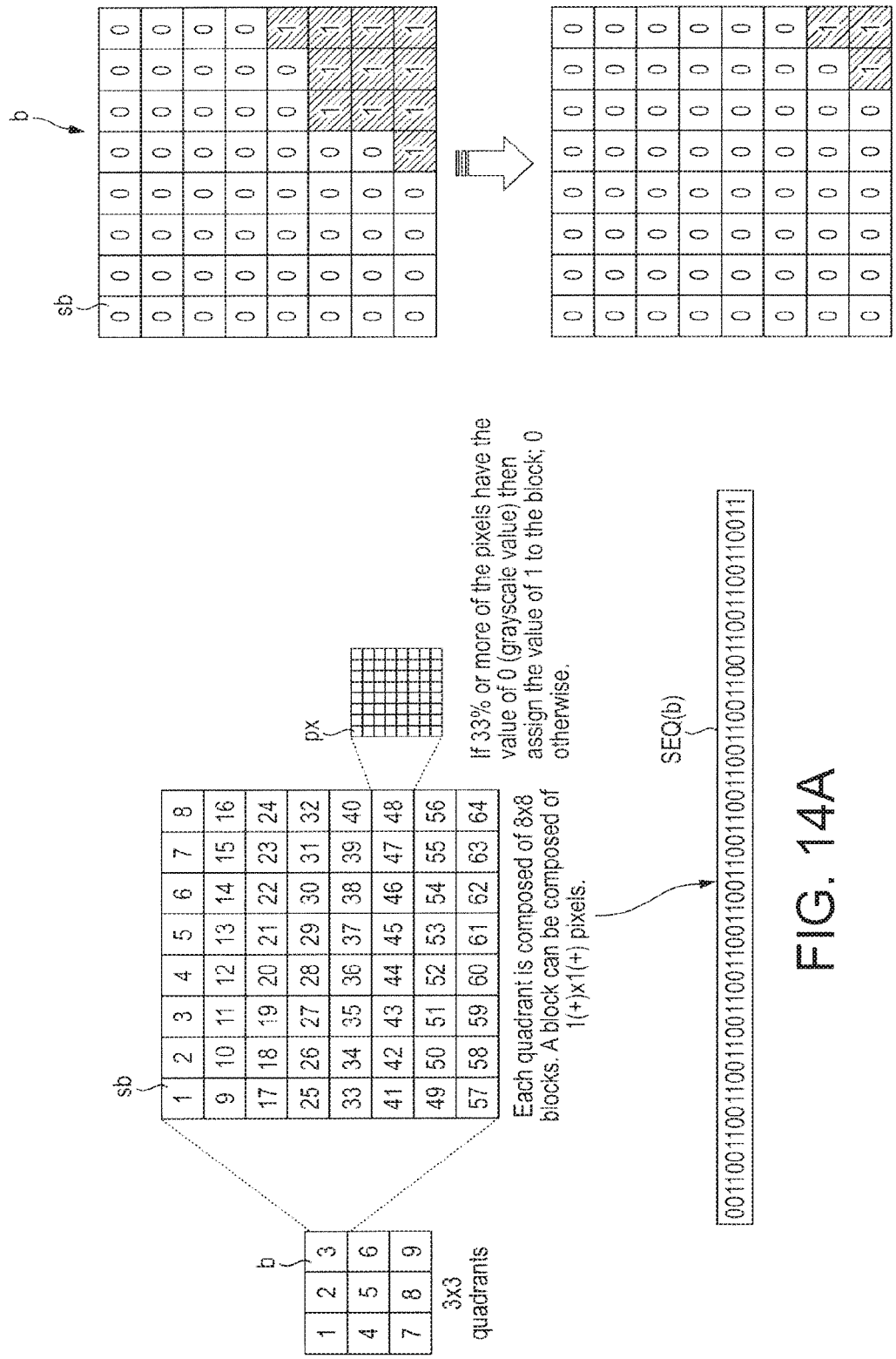
FIGS. 14A and 14B illustrate a novel motion binary pattern technique.

Blob detection of high circularity is then applied to the quantized image in order to identify and extract the pupil of the eye, as follows. The location of the pupil is determined by a novel type of Local Binary Pattern, referred to herein as a motion binary pattern (MBP). The motion binary pattern is constructed with the following process:

As shown in FIG. 14A, a region split is established, whereby each block b is divided into a predetermined number of smaller blocks "sb" ("sub-blocks") arranged as a square—8×8 sub-blocks sb per block b in this example, so M=64 sub-blocks sb per block b in total. Each sub-block sb comprises one or more pixels—multiple pixels in this example.

If a sub-block sb has a minimum of a third (about 33%) of its pixels equal to 0 then a value of "1" is assigned to the sub-block; otherwise it is assigned a value of "0". In this manner, a sequence "SEQ(b)" of M binary values is assigned to each block b (one binary value per sub-block)—one for each sub-block. In other words, each block b (e.g. each of the 3×3 blocks) has M sub-blocks and each sub-block is composed of square regions of pixels. The value 1 or 0 is assigned to each sub-block (based on the >=33% thresholding).

This allows a block to be represented by a single number ("block value") by concatenating all the binary values of its constituent sub-blocks. For 8×8 (=64) sub-blocks for each block, the single number is in the range of 0 to 2^64. The whole iris window W is represented by N such values—one for each block (where N is the number of blocks e.g. N=9).

As illustrated in FIG. 14B, a pupil movement results in a change of the value of each block within the expected number of sequences. FIG. 14B illustrates a case the change of value of a MBP block b when detecting an edge in motion (the "1" value sub-blocks in FIG. 14B correspond to the edge region of the dark pupil).

By analysing the sequences of processed eye movements based on the MBP approach and comparing them to the expected sequence of MBP values according to the pre-defined 'following elements' it is possible for the system to determine if the user is a live person. For a given set of random locations, a probability density function modelling the expected movements of the eye can be cheaply generated, again using closed-form equations (without any need for machine learning) and compared with the observed histograms.

The ordering and labelling of the bins is immaterial, provided whichever convention is adopted is applied consistently.

To further increase the level of robustness of this process, in some cases the display element is a randomly selected word. The word changes when the display element moves. The user is also required to read the word as the test progressed. The moving image is processed to identify the user's lips, and lip-reading techniques are used to determine whether the user is speaking the correct word.

A particular example of this form of test, and a context in which this test can be usefully applied, will now be described with reference to FIGS. 15A-15G.

In other embodiments, randomly selected words are displayed at the same location on the display, and lip reading alone is used for liveness detection (i.e. with no eye tracking). For this test a number of words are presented to the user 102. Each word appears on the display device at the same position and random time sequences, in the manner described above. During this test a video is recorded together with the timestamps of the first appearance and positions of every word. The purpose of this test is to verify if the user spoke the correct word that he was presented with and at the anticipated time.

Figure 15A:
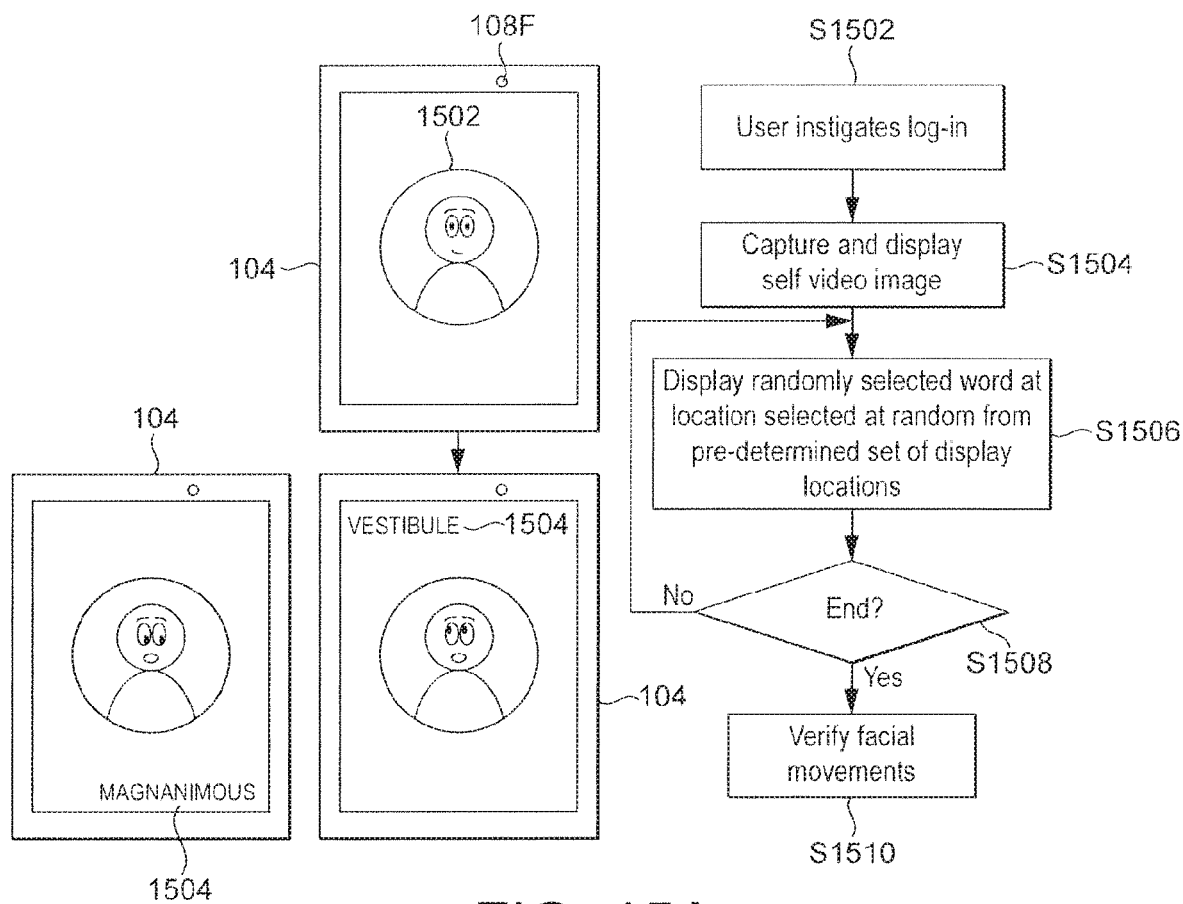
FIG. 15A shows a flow-chart for a lip-reading-based liveness detection process.

FIG. 15A shows a flowchart illustrating the steps for a log-in process incorporating an example embodiment of the present invention, in the form of randomly selected wording, by capturing a self-video image in which the user follows randomized data displayed in randomized positions on the display, which are positions selected at random from a pre-determined set of display positions.

At step S1502 the user 102 instigates a log-in at his device 104. A verification procedure may be initiated automatically in response to the user initiating log-in, or in response to other user input. At step S1504 the user device 104 captures a self-video image 1502 using a front facing camera 108F of this device 104. The image 1502 captured by the front facing camera 108F is displayed to the user as it is captured on the display 106 of user device 104. This enables the user 102 to position their face correctly within the field of view of the camera 108F so that the user's eyes and mouth are within the image as captured by the camera, as well as positioned correctly within the display area in the display 106. At step S1506 the process continues by displaying a randomly selected word 1504. As well as being selected at random, the word 1504 is displayed at a location on the display 106 selected at random from a pre-determined set of display locations (e.g. top-left, bottom-left, top-right, bottom right). As another example this may be one of a set of 9 locations in squares within a 3×3 grid pattern. This is repeated until a sufficiently long sequence of words have been shown, e.g. four to six, at which point the process ends S1508. This may be dependent on a certain number of words having been generated, a certain number of different locations having displayed the follow element, or upon the self-video image having been captured over a certain duration or amount of time. At step S1510 the recorded facial movements are verified, by verifying both that the eyes of the user 102 correctly followed the follow element and eye movement correlates to the positions on the display at which the randomly selected words are known to have been displayed, and that mouth shapes correspond to those expected to be used to say the random word out loud, and verified using a database of mouth movements corresponding to the International Phonetic Alphabet, IPA (FIG. 15C—see below). Step S1510 is performed at the server 130, using the video image itself as, preferably, information extracted from the captured video image at the user device 104 and transmitted to the server, such as a "mouth shape descriptor.

An example mouth shape descriptor is described below, which is based on relative locations of landmark points identified on the lips with respect to reference points, such as the nose tip, or the mouth edges.

In addition to the mouth shapes analysis, the lip-reading system may also exploit visual information corresponding to time sequences where there is no lip movement activity. These could be correlated with the randomly selected known time sequences the words have been displayed to the user.

Figure 15B:
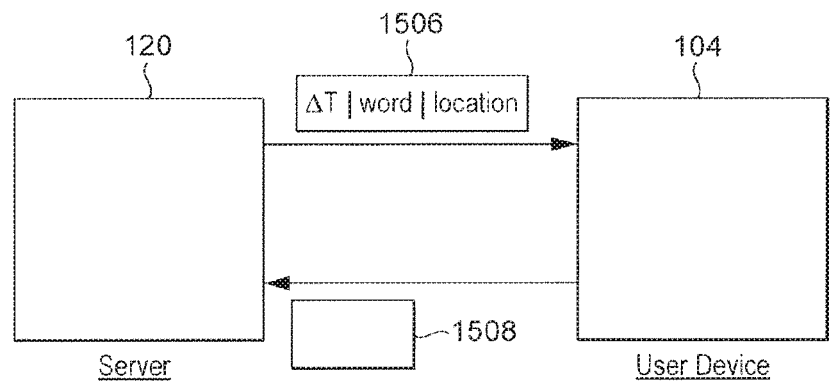
FIG. 15B shows a signalling diagram for communication between a user device and a server to implement the method of FIG. 15A.
Figure 15C:
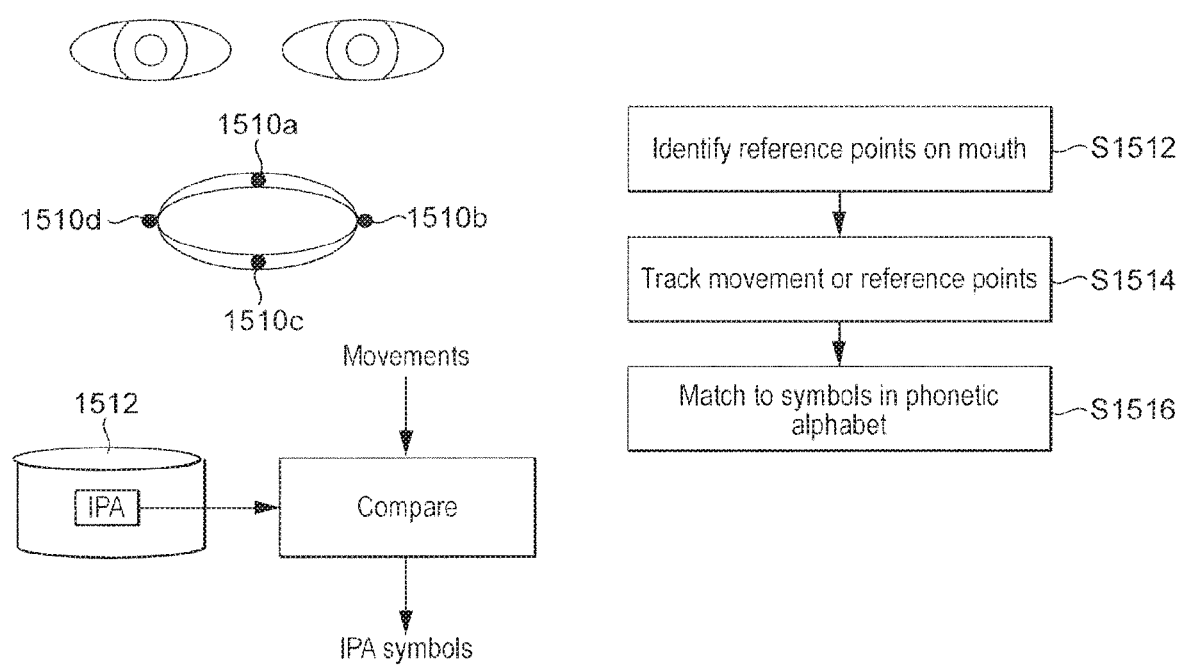
FIG. 15C shows a flowchart for a first example of a lip-reading-based liveness detection process, which uses the International Phonetic Alphabet.

FIG. 15B is a schematic diagram illustrating the interaction between server 120 and user device 104 to effect the method of FIG. 15A. Information 1506 comprising the randomly selected word to be displayed, an indication of the display location at which it is to be displayed, and an indication of a time and duration for which it is to be displayed is generated at the server 102 and supplied to the user device 104 by the server 120. This time and/or duration may also be randomly selected in some implementations. Image data 1508 of the captured self-video images 1502 corresponding to the displayed sequence of word elements and display locations are returned to the server 120 by the user device 104 for verification. The image data may comprise associated timestamps to define when the movements were captured. Note the term "image data" in this context can mean frame images of the video images itself, or information extracted from those frame images at the user device 104.

Lip Reading Based on the International Phonetic Alphabet:

FIG. 15C illustrates one example of how facial movements such as those of the mouth can be used to verify the liveness of the captured video image.

At step S1512 a set of reference points (e.g. four to six) on the mouth are identified in the received image data 1508. Feature recognition techniques can be used to detect the reference points of the mouth or lips in the frame shown in FIG. 15C and labelled "1510a", "1510b", "1510c", and "1510d". At step S1514 these points can then be used to track the movement of the user's mouth as they say out loud the randomly selected words as they are displayed. At step S1516 the tracked movement of the reference points can then be compared and matched to symbols in an electronically-stored phonetic alphabet held in a data store 1512 accessible to the server 120, so as to generate a sequence of IPA symbols corresponding to the lip movements. The server 120 then compares these with an expected sequence of IPA symbols for the words it supplied to the user device 104. As such it can be established that the user is observing the correct word, in the correct location, at the correct time, and not just any word in the correct location. As a result, the robustness of the liveness detection is increased.

The International Phonetic Alphabet is a set of phonetic symbols which constitute a standard representation of spoken sounds in any spoken language. The advantage of using the IPA is that the test can be applied for words in any language, and does not even require the language to be known.

To maximise the effectiveness of the liveness test, it is best to select words in the user's native language, as the user 102 is more likely to pronounce them correctly.

The user's language can for example, be determined from a real-world identity document, such as a passport. This is particularly convenient in the so case that the liveness detection test is performed as part of a digital identity creation process, in which a user can create an electronically stored digital identity comprising information extracted from such a document, wherein creation of the digital identity is conditional on the user 102 passing the test. A method of determining an appropriate language setting is described later.

Figure 15D:
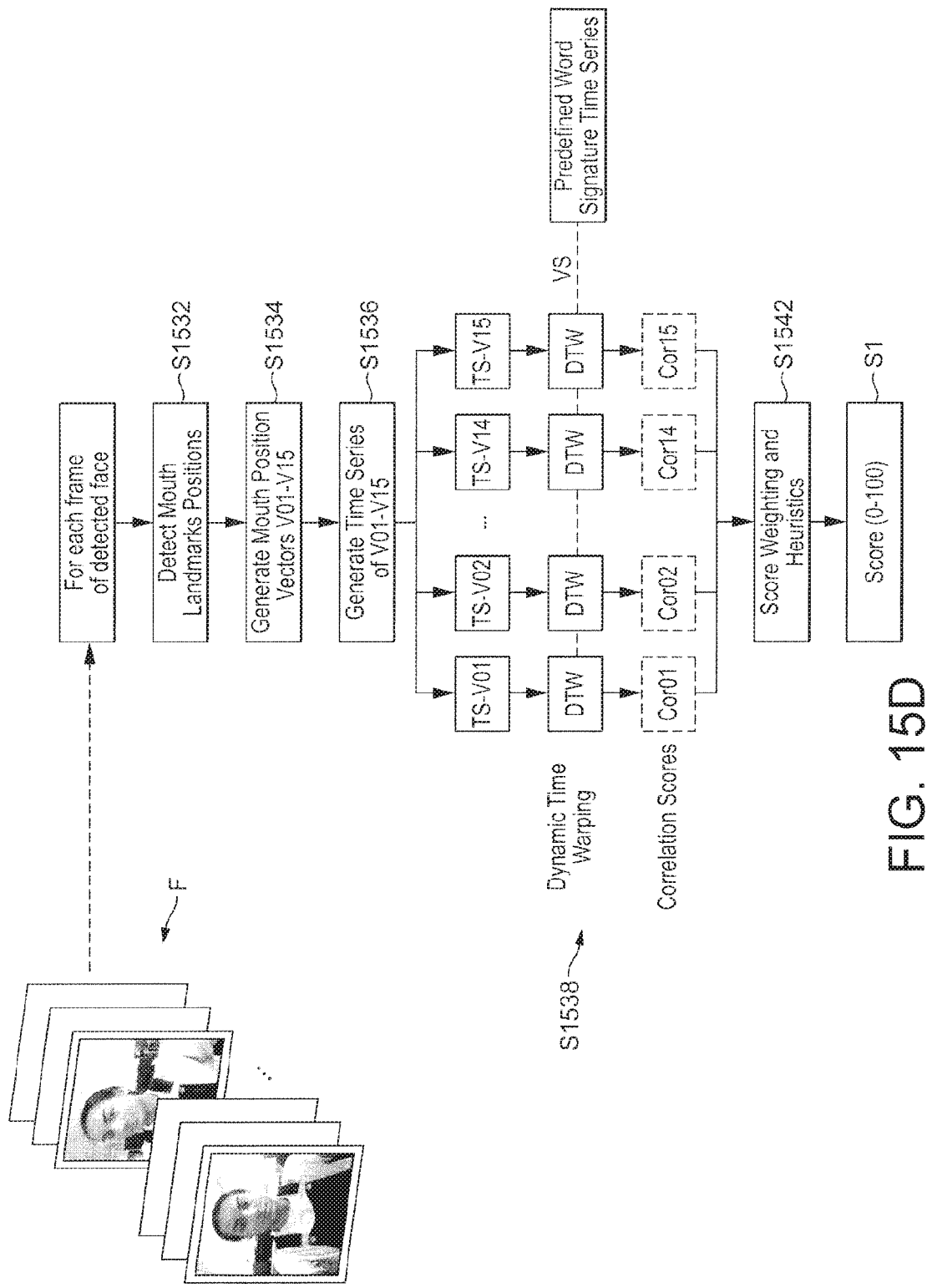
FIG. 15D shows a flow chart of a second example of a lip-reading-based liveness detection process, which is based on viseme detection.

Lip Reading Based on Visemes:

An alternative way to implement this test uses a form of automatic lip-reading based on viseme-based word matching. FIG. 15D shows a flowchart for a method of implementing the lip-reading based liveness test based on visemes.

As known in the art, a viseme is a mouth position corresponding to a particular verbal sound. Table 1 below sets out how each of fourteen visemes (V1-V14) correspond to one or more respective phonemes. As can be seen, some visemes corresponds to multiple phonemes. Scoring evaluation (S1542 in FIG. 15D—see below) is performed per series of visemes, where each displayed word is translated into a sequence of visemes according to Table 1.

The inventors have recognized that, in the context of this liveness detecting test, a quick and relatively simple word match is all that is needed, where it is sufficient to represent complex mouth positions (i.e. visemes) as simple vectors of relatively low dimension—fifteen in the examples below.

The visemes are identified based on mouth landmark positions, which are a set of sixteen predetermined reference points on the user's mouth (M1-M16) and seven additional points (S, D1-D6) defined relative to this, as described below with reference to FIG. 15E.

TABLE 1 mapping of visemes to phonemes

| Viseme | Phonemes |
| --- | --- |
| V1 | /b/ /p/ /m/ |
| V2 | /f/ /v/ |
| V3 | /t/ /d/ /s/ /z/ /th/ /dh/ |
| V4 | /w/ /r/ |
| V5 | /k/ /g/ /n/ /l/ /ng/ /hh/ /h/ /y/ |
| V6 | /ch/ /jh/ /sh/ /zh/ |
| V7 | /eh/ /ey/ /ae/ /aw/ /er/ /ea/ |
| V8 | /uh/ /uw/ |
| V9 | /iy/ /ih/ /ia/ |
| V10 | /ah/ /ax/ /ay/ |
| V11 | /ao/ /oy/ /ow/ /ua/ |
| V12 | /aa/ |
| V13 | /oh/ |
| V14 | /sil/ |

To facilitate the matching process, words having different viseme structure may be deliberately selected for the test, so as to avoid presenting to the user words that have highly correlated relative movement descriptors. That is, the words may be randomly selected taking into account the visemes of the words, so that these fifteen visemes alone can be used to match lip movements to the displayed words (notwithstanding the fact that there does not exist a one-to-one mapping between all visemes and phonemes).

Steps S1532-S1534 are performed for each of the frames F of the captured video in which a face is detected.

Figure 15E:
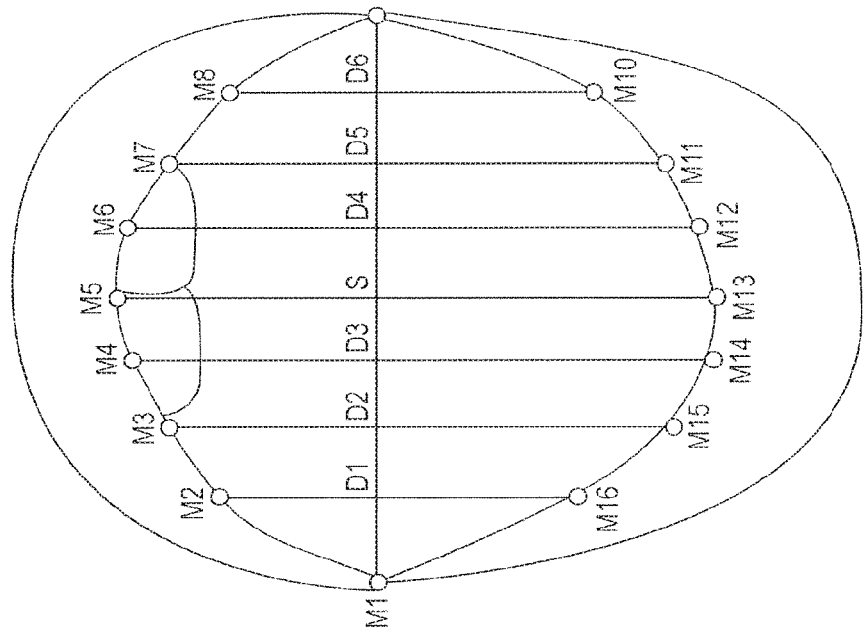
FIG. 15E shows example mouth landmarks for use in the process of FIG. 15D.
Figure 15E:
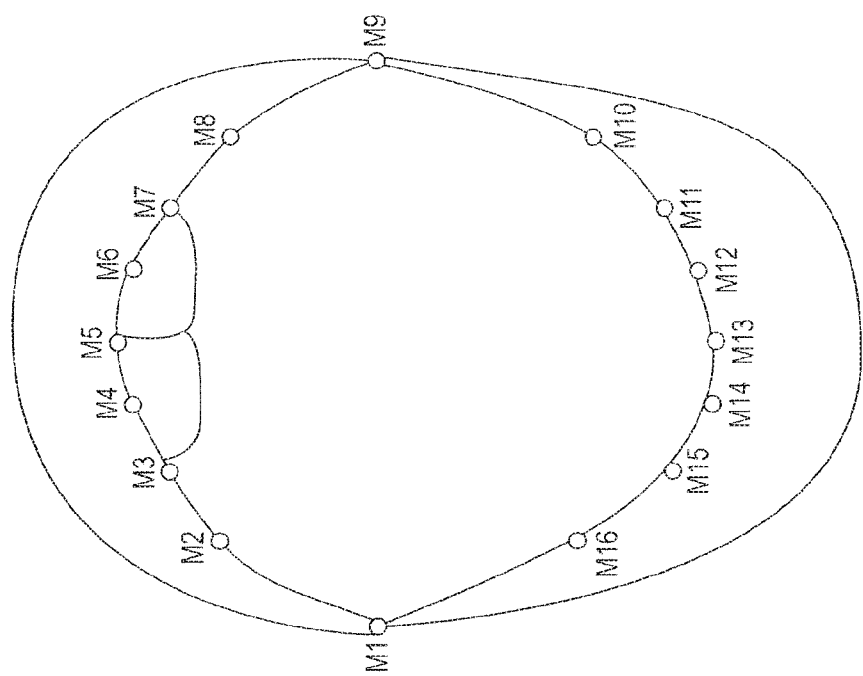

At step S1532, points M1-M16 are detected in that frame, which are points on the user's mouth distributed about its edge as shown in FIG. 15E. Points M1 and M9 are on either side of the mouth i.e. at the corners of the mouth. Points M2-M8 are on the upper lip, and points M16-M10 are on the lower lip. The points are arranged such that, when the user's head is vertically upright, points M2-M8 are vertically above points M16-M10 respectively. Points M5 and M13 are aligned horizontally with the centre of the mouth.

In addition, seven additional points are determined in that frame, which are points on the line between M1 and M9 (M1M9). These determined as t D1 is the intersection of lines M1M9 and M2M16
D2 is the intersection of lines M1M9 and M3M15
D3 is the intersection of lines M1M9 and M4M14
S is the intersection of lines M1M9 and M5M13
D4 is the intersection of lines M1M9 and M6M12
D5 is the intersection of lines M1M9 and M7M11
D6 is the intersection of lines M1M9 and M8M10

A notation is adopted below, where (P, Q) denotes the (scalar) distance between points P and Q.

The distance D=(M1,M9) corresponds to a resting position of the mouth, and is the horizontal extent of the mouth in the resting position. A set of fifteen additional distances d01-d15 are also determined, as defined in table 2 below, such are the are normalized by the horizontal distance d of the mouth at resting position. The distances D and d01-d15 are determined for that frame at step S1534 of FIG. 15D. These fifteen distance measures constitute relative movement descriptors of the mouth. A given mouth position in a video frame can be represented as a separation measure, in the form of a vector of the above distances d01-d15 (that is, having a dimension of 15) computer for that frame, i.e.:

$$V=(d01,\ldots,d15)$$

This vector V (mouth position vector) conveys enough information to determine a corresponding viseme for that mouth position, from which a corresponding phoneme(s) can be determined in turn.

TABLE 2 mouth position vector V

| Components of vector V: | Values: |
|---|---|
| d01 | (M2, D1)/D |
| d02 | (M3, D2)/D |
| d03 | (M4, D3)/D |
| d04 | (M5, S)/D |
| d05 | (M6, D4)/D |
| d06 | (M7, D5)/D |
| d07 | (M8, D6)/D |
| d08 | (M16, D1)/D |
| d09 | (M15, D2)/D |
| d10 | (M14, D3)/D |
| d11 | (M13, S)/D |
| d12 | (M12, D4)/D |
| d13 | (M11, D5)/D |
| d14 | (M10, D6)/D |
| d15 | (M1, S)/D |

Over the multiple video frames F, a time series of such vectors V is thereby determined (S5136). This results in fifteen time sequences (one for each vector component), labelled TS-V01, . . . ,TS-V15 respectively. Each of these time sequences is compared with an expected time sequence for the displayed words corresponding to that vector component (S1438). That is, fifteen independent comparisons are performed (one for each vector component), to generate fifteen respective correlation scores, denoted Cor01, . . . , Cor15, for the time series TS-V01, . . . ,TS-V15 respectively. These fifteen comparisons can be performed in any order or in parallel, as the vector components are treated independently.

For example, different "ranges" of this vector V—or more precisely, different regions of the fifteen-dimensional vector space inhabited by the vector V—can be mapped to individual visemes. To determine whether a displayed word was actually read by the user, the sequence of visemes identified from the moving image is compared for its similarity against a prototypic sequence of visemes learned for the displayed word(s).

To account for different user's having different speaking speeds, dynamic time warping (DTW) can be used. Dynamic time warping is a known methodology for comparing sequences for different speeds, and is therefore not discussed in further detail herein.

For words that are displayed at random times, the process exploits not only detected mouth deformations for visemes-based words recognition, but also exploit parts when there is no lip movement. The latter are correlated with the time intervals between successive randomized inputs (i.e. the random-length time interval between different displayed words), and beneficially provide a non-language specific source of information for liveness detection. In other words, a condition of the test can be that the user speaks not only the correct words but does so at the correct times, where the latter is checked based on the intervals without lip movement.

A microphone of the user device 104 can also be used, for example to detect times at which the user 102 starts and stops speaking the displayed words, based on the amplitude of an audio signal captured with the microphone. For example, timestamps can be generated at the user device 104 corresponding to start and stop times and transmitted to the server 120, and used to select video frames of the captured video at the server 120 for processing in accordance with the techniques described herein. Alternatively or in addition, the capturing of the video can be instigated and terminated based on the audio signal when the user starts and stops speaking the first and final words in the sequence respectively.

Sound input can be also used for liveness verification in addition to lip-reading. Similar to the viseme recognition approach described above, speech recognition can be applied in order to detect if the user spoke the displayed words. This leads to a multimodal liveness verification system.

Then at step S1542 the fifteen correlation scores Cor01, . . . ,Cor15 are combined, to generate an overall score S1, which provides a concise indication of the probability that the entity subset to the test is a living being.

Figure 15F:
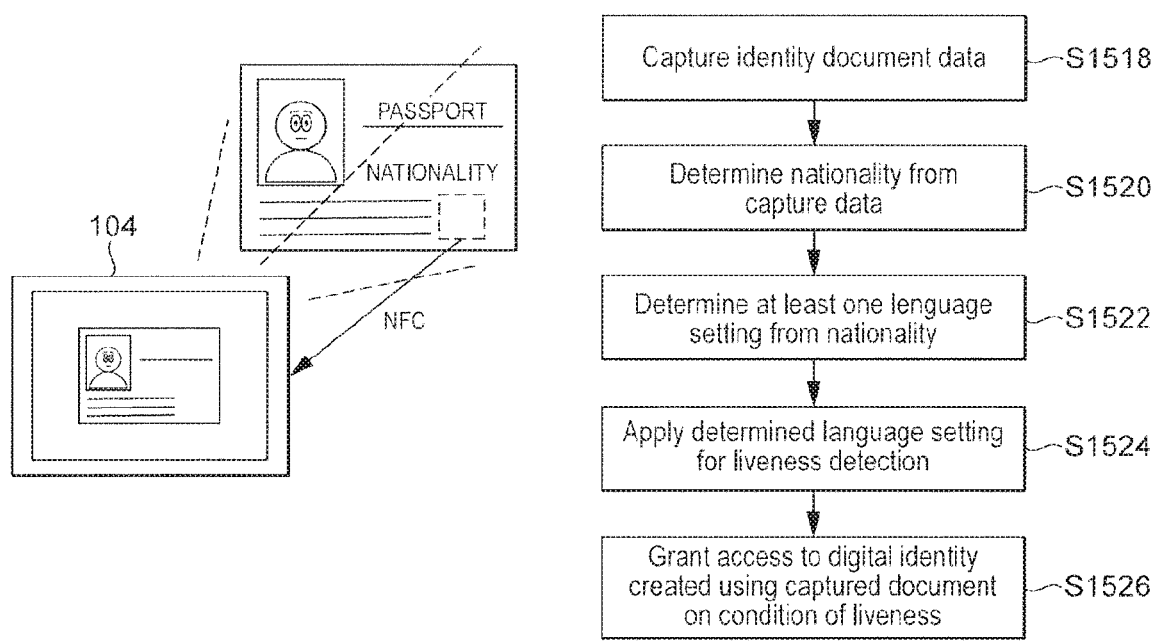
FIG. 15F shows a flowchart of a method of automatically determining an appropriate language, for use in the lip-reading-based liveness detection processes.

Language Determination:

FIG. 15F illustrates how an identity document may be captured by the user device 104. At step S1518 identity document data of an identity document of the user 102 is captured. This can be either by taking a photograph of the document, or by detecting information encoded onto a near field communication, NFC, chip or tag within the document itself, or a combination of such techniques. The user device is as such equipped with a camera suitable for capturing a high quality image of the identity document, and an NFC reader for the detecting and reading of NFC chips or tags. At step S1520 nationality is determined from the identity document data. This is either read from the image of the identity document, or determined from the received NFC data. At step S1522 at least one language setting is determined based on the determined nationality. Some nationalities may require further input data from which to determine between a plurality of possible language settings. For example ascertaining a nationality as Canadian may require further data comprising location of birth or issuing authority of the identity document in order to select between the two languages of English and French spoken in Canada. Alternatively, multiple language settings may be determined from the document, and prescribed to the user 102 for selection at the user device 104.

At step S1524 the determined language setting is applied for the process of liveness detection. In particular, the words to be displayed to the user in any of the lip-reading tests described above are randomly selected according to the determined language setting, so that the words displayed to the user 104 are in his own language. This can improve the accuracy of the test, as the user is more likely to speak words correctly in his native language.

Steps S1520-S1524 can be implemented at the user device 104, the server 120 (using the image or data extracted from the image at the user device and/or the NFC data), or the steps may be split between the user device 104 and the server 120. At step S1526 access is granted to a digital identity created in the data store 132 using the captured identity document on condition of liveness as described above, i.e. on condition that the user is determined to be a living being.

Elliptical Curve-Based Display Locations:

As another example, the randomized locations at which the display element is displayed may be selected based on the randomized data Rn and, in addition, based on at least one shared secret between the user device 6 and the remote system 130. The shared secret can for example be a user-defined shape, such as an elliptical curve. An elliptical curve requires minimal storage overhead, as it can be parameterised by a small number of parameters.

Figure 12A:
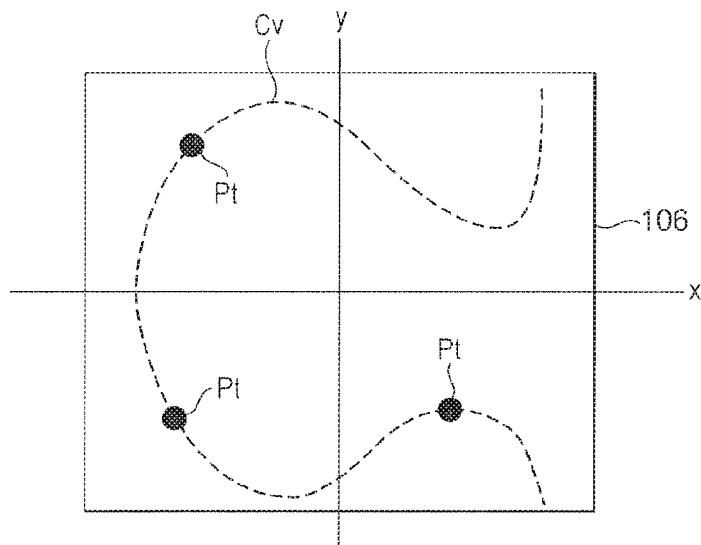
FIGS. 12A and 12B illustrate some principles of a liveness detection technique that is based in part on a shared secret between a user device and a server.

An exemplary elliptical curve Cv is shown in FIG. 12A. The user 102 defines the curve at the user device 104, for example by tracing it on the device's touchscreen or using a mouse/trackpad etc. Geometric data of the curve is both stored securely at the user device 106, encrypted based on a code (e.g. PIN) inputted by the user 102, and transmitted to the remote system 130 via a secure channel for storage thereat. Thus the geometry of the curve is stored both at the user device and the remote system 130. In order to change the curve, the user 102 must input the code to decrypt it. Every time the curve is changed, the version at the remote system 130 is updated to reflect the changes.

The ET parameter set defines the point on an ellipse in terms of one-dimensional coordinates, defining a length along the ellipse. For example, in a quantized system, each ellipse constitutes a finite set S={n|n=1, ..., N} of N points in two-dimensional space. Each randomly selected parameter can be represented by a single parameter defining an index of a point in S.

During the liveness detection process, the display element is displayed at display locations corresponding to randomly selected points Pt on the curve Cv, selected by the user device 104. The curve Cv itself is not displayed. When this technique is used, the user device 104 communicates the eye images to the remote system 130, or information about the movements of the eyes in response to the random display element derived from the eye images. The user device 106 does not transmit any other information about the points Pt that it has selected—these are conveyed to the remote system 130 only through the movements of the user's eyes.

The ET parameters Rn determine which points on the curve will selected in a deterministic manner i.e. if the ET parameters Rn and the curve Cv are known, it is always possible to know with certainty which points the user device 106 will select.

Thus, because a copy of the curve Cv is stored at the remote system 130, and because the remote system 130 has access to the randomized data Rn, the remote system can reconstruct the points Pt as selected by the user device based on its own copy of the curve.

This provides an additional layer of robustness for the following reasons: if the user device 106 uses the incorrect curve i.e. that does not match the version stored at the remote system 130, the movements of the user's eyes will not be those expected by the server. Thus, for the liveness detection technique to succeed, the user device 106 must know the shared secret in the form of the curve Cv. This prevents a device which does not have access to the securely-held shared secret from being used to access e.g. the database 132 in the remote system 130. In other words, based on its knowledge of the shared secret, the remote system knows which points on the curve Cv the user device should have selected given its own knowledge of the shared secret. Should the wrong points be selected as part of an attempted spoofing attack, the attack will fail as a consequence.

Both of the above described techniques consider movement of the pupil in response to certain stimuli. Alternatively or in addition, the changes in the pattern of the iris can be used to the same end. The diameter of the iris is constant, however the structure of the iris exhibits intricate variations (iris pattern) that are visible as colour patterns. As the eye reacts to the pulse or display element stimulus, these patterns will change. This can be measured, for example, by identifying and tracking distinct points on the iris in response to the relevant stimulus. A noise filtering algorithm may applied to the image, and the tracking based on the noise-filtered version. A set of differential equations is applied to select visible dark and/or light spots in the noise-filtered image for tracking. Again, the detected movements are compared to expected data that is generated form closed-form equations without the need for machine learning.

Figure 12B:
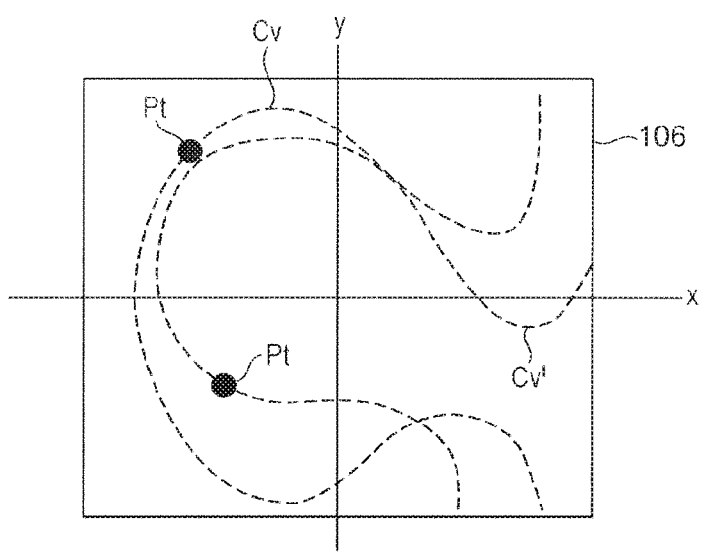

Optionally, as illustrated in FIG. 12B, the randomized data may also define a transformation of the curve e.g. a scaling and/or rotation of the curve over time, so that a second point Pt2 is a point on a transformed version Cv' of the curve relative to the version Cv used on which a first point Pt1 is selected.

As an alternative to eye tracking, the user may indicate the location of the display element as they perceive it using some other input device of their user device 104, such as a touchscreen, trackpad, mouse etc. In this case, the user selects (e.g. touches or clicks on) the point on the screen where the display element is displayed, and their inputs are compared to the expected display location(s).

In any of the above embodiments, the binary classification outputted by the system liveness detection system (e.g. 200a, 200b) may, for example, be conveyed to an access control module 214 of the server 120, so that the access control module 214 can decide whether or not to grant the user 102 access to the remote system 130 based on the classification. For example, access may be granted only if the user 102 is identified as a living being by the liveness detection system.

In either of the above embodiments, the liveness detection system 200a/200b may, instead of generating a binary classification of the user 102 as living/non-living, generate a confidence value denoting the system's confidence that the user is living or non-living e.g. a probability that the user 102 is living or a probability they are non-living. In this case, the access controller 214 receives the probability, and can perform its own classification.

Figure 11:
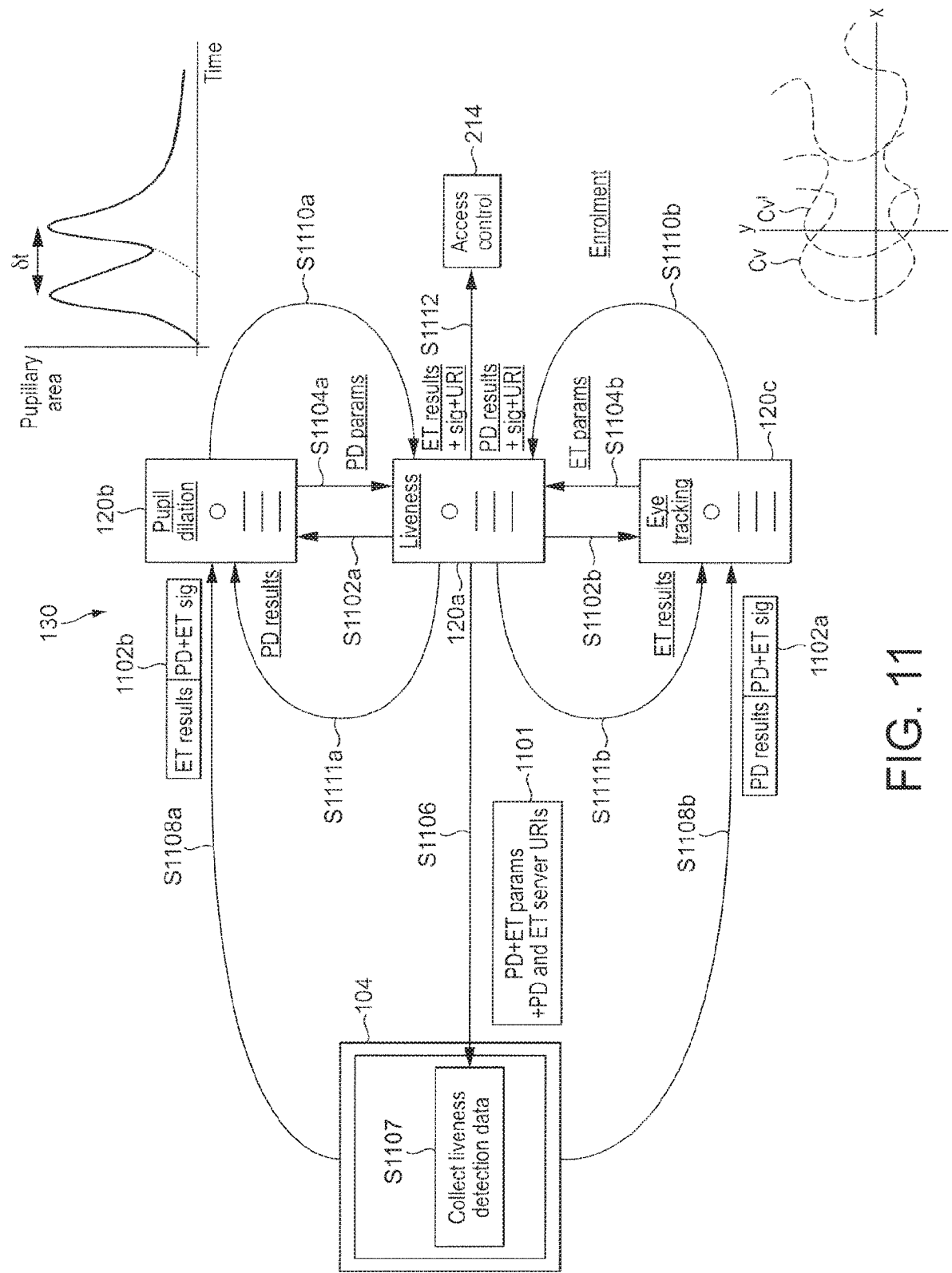
FIG. 11 shows a signalling diagram for a liveness detection technique according to a third embodiment.

FIG. 11 illustrates a liveness detection technique in a third embodiment, which combines the techniques of the first and second embodiments.

Three separate servers 120a, 120b, and 120c of the remote system 130 are shown—a liveness (control) server 120a, and two liveness processing servers: a pupil dilation server 120b, and an eye tracking server 120c.

The liveness server 120a coordinates the liveness detection technique of the third embodiment. The pupil dilation server 120b implements the liveness check of the first embodiments, based on pupil dilation. The eye tracking server 120 implements the liveness check of the second embodiment, based on eye tracking. At steps S1102a and S1102b, the liveness server 120a requests a PD parameter set and an ET parameter set from the pupil dilation server 102b and the eye tracking server 102c respectively.

The PD parameters are for implementing the process of the first embodiment, i.e. based on pupillary response to pulsing, and defines one (or more) randomly selected temporal separation between two (or more) light pulses (or one light pulse at a random time in the video). The ET parameters is of the kind used in the second embodiment, i.e. based on display elements at random display locations, and when in combination with the user-selected curve Cv defines a set of spatial points selected at random, at which the display element is displayed.

In the third embodiment, importantly, the randomness of the process is generated server-side.

After receiving the PD parameters from the pupil dilation server 120b (S1104a) and the ET parameters from the eye tracking server 120c (S1104b), the liveness server 120a transmits the PD and ET parameters to the user device 104.

At step S1107 user device 104 uses the PD and ET parameters to instigate the liveness detection processes of the first and second embodiments respectively by performing the randomized pulse test according to the PD parameters and the randomized display element test according to the ET parameters i.e. emitting light pulses at random interval(s) based on the PD set and displaying display element(s) at random locations selected on the user's curve Cv based on the ET parameter set. This may be triggered by the liveness server 120a requesting a liveness check from the user device 106, or the user device requesting a liveness detection check form the liveness server 120a. The PD and ET sets are transmitted from the liveness server 120a to the user device 104 at step S1107 in an instigation message 1101.

The instigation message also comprises a network address of the pupil dilation server 120b and a network address of the eye tracking server 120c. Each network address defines a respective network endpoint, and may for example be a URI (Uniform Resource Indicator). These network addresses are different from the source network address of the instigation message 1101 (i.e. the address of the liveness server 120a that transmits the message 1101).

The URIs used are uniquely allocated to the user device 104, and each constitutes a shared secret between the user device 104 and the remote system 130.

The two processes are linked, in that the randomized display element of the second process is displayed at the randomized locations defined by the ET set within a predetermined time interval commencing with the first light pulse of the first process. That is, the processes are coordinated so that the display element is displayed to the user at the randomized locations at a time when their eyes are still reacting to the light pulse i.e. while they are still temporarily slightly stunned by the pulse. The movements of the eye when tracking the display element are measurably different when the eye is in this stunned state (as compared with an un-stunned eye), and these differences are predictable across the population, which is exploited as part of the liveness detection procedure of the third embodiment. At least one moving image is captured over a time interval that spans both the pulsing and the displaying of the display element, which constitutes the data that forms the basis of the first and second liveness detection processes. Three points on the user's curve Cv are used, with the display element moving between these three points during the capture process.

At steps S1108a and S1108b, the user device 104 transmits information collected at step S1107 to both the pupil dilation server 120b and the eye tracking server 120c, in at least one first message 1102a and at least one second message 1102b respectively.

In some cases, no or minimal image processing is performed at the user device 104, and the moving image(s), or a minimally processed version thereof, is transmitted to the servers 120b, 120c for processing at the remote system 130 in the first and second messages 1102b respectively. In these cases, the remote system 130 performs the majority of the steps of the liveness detection process of the first embodiment, and in particular computes the changes in the pupil diameter over time; the remote system 130 also performs the majority of the steps of the liveness detection process of the second embodiment, and in particular computes the histograms representing the blocks of the iris window over time.

In other cases, the user device performs the majority of this processing. In particular, the user device computes the changes in the pupil diameter and the histograms, which it transmits to the pupil dilation server 120b and eye tracking server 120c in the first and second messages 1102a, 1102b respectively.

More generally, the processing can be distributed between the user device 104 and servers 120b, 120c in numerous different ways.

At least one secure execution environment is provided on the user device 104 in which code and data loaded inside the secure execution environment is integrity protected. To the extent that liveness detection processing is performed at the user device 104, it is performed within the secure execution environment.

The user device 104 applies a signature to both the first and second messages 1102a, 1102b. For each message 120b, 120c, the signature is generated by the user device based on both the PD and ET parameters sets.

The first and second messages 1102a, 1102b are transmitted to the URIs of the eye tracking server 120b and pupil dilation server 120b, as indicated in the instigation message 1101—not the other way round. That is the first message 1102a, containing the results of the randomized light pulse test, are transmitted to the eye tracking server 120c; likewise, the second message 1102b, containing the results of the randomized display element test, are transmitted to the pupil dilation server 120b. In other words, each message is transmitted to a server which is not its ultimate intended destination.

Note that the functionality of the serves 120a-120c need not be distributed across multiple computer devices (though that is not excluded). That is, their function may be implemented by a single device or by multiple devices, but within separate secure execution environments—for example by different processes in separate secure execution environments on the same device, or even different threads of the same program in separate secure execution environments. Regardless of how the functionality is implemented at the hardware level, a key aspect is that the three servers 120a-102c constitute three separate network endpoints of the network 118 i.e.:

the endpoint from which the instigation message 1101 is transmitted to the user device 104;

the endpoint to which the first message 1102a is transmitted, as indicated in the instigation message 1101 (which is a shared secret between the user device 104 and the remote system 130); and the endpoint to which the second message 1102b is transmitted, as also indicated in the instigation message 1101 (and which is also a shared secret between the user device 104 and the remote system 130).

In the broadest sense, what is meant by having three separate servers 120a-120c within the remote system 130 is that the remote system 130 is configured to provide at least three separate network endpoints, e.g. as defined by three different URIs or other endpoint identifiers, and comprises associated logic for each network endpoint for effecting communications with the user device 106 via that endpoint. In other words, the servers 120a-120c are entities that are logically distinct form one another, each in the form a respective set of code executed in a separate, secure environment provided by the back-end system 130. They represent separate network endpoints in the sense that the three URIs are different from one another within the URI space (even if they ultimately response to the same IP address and even the same port number of the back-end system 130, which may or may not be the case).

The contents of the first message 1102a is communicated (S1110a) from the eye tracking 120c to the liveness server 120a along with the signature of the first message 1102a and the URI at which it was received.

Similarly, the contents of the second message 1102b is communicated (S1110b) from the pupil dilation server 120b to the liveness server 120a along with the signature of the second message 1102b and the URI at which it was received.

The liveness server 120a has access to both the PD and ET parameter sets by virtue of steps S1104a and S1104b respectively. It compares both sets with each of the signatures attached to the first and second messages 1102a, 1102b (recall each signature was generated by the user device 104 using both sets).

The liveness server also has access to the URIs that it supplied to the user device 102 in the first message 1101, and compares these with the URIs that the first and second messages 1102a, 1102b were actually sent to.

If either of the URIs actually used does not match the one that should have been used, or if either of the signatures does not match the parameter sets, this is communicated to the access controller 214, thereby causing the user 102 to be refused access to the remote system 130 e.g. to the database 132. For example, this can be achieved by automatically classifying the user as non-living to the access controller 214—even though the non-matching URI(s) and/or non-matching signature(s) are not directly indicative of this.

If both signatures and both URIs do match, the liveness server 120a provides (S1111a) the PD results (i.e. the contents of the first message 1102a, as provided by the eye tracking server 120c in step S110b) to the pupil dilation server 120b and provides (S1111b) the ET results (i.e. the contents of the second message 1102b, as provided by the pupil dilation server 102b in step S1110a) to the eye tracking server 120c.

The pupil dilation server 120b performs the liveness detection technique of the first embodiment for each eye separately, as described in detail above with reference to FIGS. 2A-2D, based on a comparison of the contents of the first message 1102a with the randomly generated PD parameter set so as to generate e.g. a probability that the user 102 is alive.

Figure 6C:
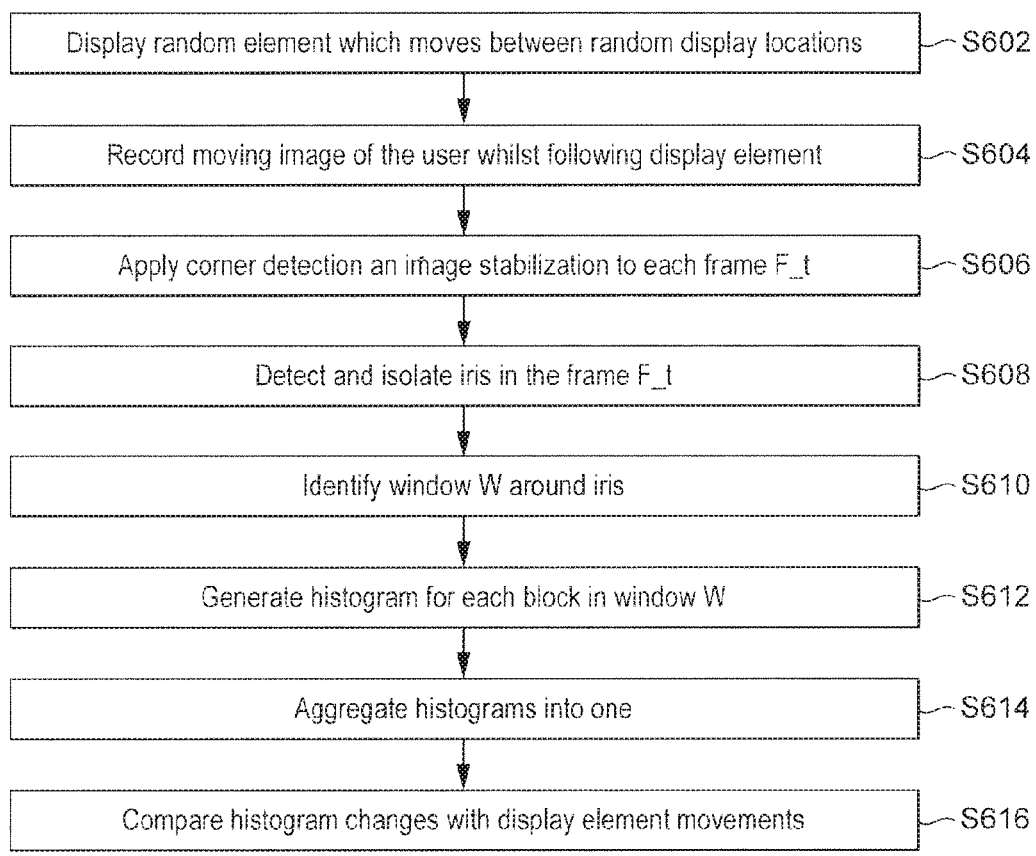
FIG. 6C shows a flow chart for a liveness detection method in the second embodiment.

Similarly, the eye tracking server 120c performs the liveness detection technique of the first process for each eye, as described in detail above with reference to FIGS. 6A-6C, based on a comparison of the contents of the second message 1102a with the randomly generated ET parameter set so as to generate e.g. a probability that the user is alive. Here, the second process detects when the movement exhibit by the eye is not consistent with the fact that the eye has recently been exposed to the medium-to-high intensity light pulse of the first embodiment (even if the movements themselves are consistent with the randomized locations in general terms). As will be apparent, this can be achieved by suitable tuning of the coefficients of the PDF used in the second process as part of normal design procedure. Where the movements are not consistent, this reduces the probability of the system that the user 102 is human (equivalently increases the probability that they are not).

The probabilities generated by the first and second processes are combined into an aggregate probability (e.g. by averaging, such as weighted averaging), which is communicated to the access controller 214 at step S112 or which is used to generate a binary classification of the user 102 as living/non-living, by comparing the aggregate probability with a threshold, that is communicated to the access controller 214 at step S112. The access controller 214 then decides whether or not to grant access to the remote system 130 e.g. to the database 132 based on this information.

The messages are "swapped" between the servers 120b, 120c (in steps S1110-S1111) via the same liveness server 120a within the confines of the back-end system 130, and the liveness server 120a only allows the swap to proceed (in step S111) if both signatures and both URIs are correct. This makes it much harder for a man-in-the-middle attack to take place.

Preferably, all communication between the user device 106 and servers 120a (liveness), 120b (pupil dilation), 120c (eye tracking) is via secure channels. This is particularly the case where the shared secrets are based in a method with well-known properties (pupil dilation/endpoints) as opposed to a "private" method. Where the particular properties are either unique or only known to a small number of actors (ellipse) this in itself can most likely provide sufficient security without the need for secure channels.

The secure channels (or non-secure channels as applicable) between the user device 104 and the different servers 120a-120c need not be via the same network (though they are in the above example).

An additional check can also be imposed by the system, which is that the time interval commencing with the transmission of the instigation message and ending with the receipt of the first and second message (whichever is received latest) is less than a predetermined time interval (e.g. 3 to 10 seconds long). If the time exceeds this, the user 102 is refused access regardless. An alternative timing window can be used, for example starting with the transmission of the initial message 1101 and ending with the liveness server 120a outputting the classification/aggregate confidence value at step S1112.

The liveness detection techniques presented herein can, for example, be used as part of an enrolment procedure for a digital identity system. For example, the Applicant's co-pending U.S. patent application Ser. Nos. 14/622,527, 14/622,709, 14/622,549, 14/622,737, 14/622,740—incorporated herein by reference—describe a digital identity system (a "uPass system" or "Original uPass system" as it is referred to in PCT/EP2016/053076), in which a user can, for example, create a profile of their digital identity (referred to therein as a "uPass") based on an identity document, such as a passport, and a self-captured image of their face ("selfie"). The liveness detection process of the third embodiments can be incorporated into the uPass enrolment procedure when the user submits their selfie. In this case, the access controller 214 is implemented by the uPass enrolment module, and a user is only permitted to enrol and thereby create a uPass profile(s) if they are determined to be a living being with sufficient confidence.

As described above, in the third embodiment, in which two separate liveness tests are performed. In the above example, both tests are randomized i.e. performed according to separate respective sets of randomly generated parameter (s)—the randomized pulse test and the randomized display elements test. More generally, two separate liveness tests of different types can be used, one of which may not be randomized. For example, one of the tests may involve monitoring movements of a mobile device 104 as recorded using one or more sensors of the user device 104 (camera, gyroscope, other accelerometer, GPS etc.). For example, when a device that is known to be a mobile device, human-induced motion is expected at certain times (for instance, when certain actions are performed by the user device) and the absence of this can be used as an indication that the device is not being used by a living being. A living being has a number of distinct characteristics arising from their ongoing biological processes, the sum total of which constitutes life. The techniques presented above are based in particular on visual characteristics that are attributable to life, such as eye movement and pupil contraction. Other characteristics attributable to life include the ability to provide a thumb or finger print, which can also be used as a basis for a liveness detection test (note in this case what is being tested is not the identity attached to the finger print i.e. a match to a known finger print pattern is not being sought—it is simply the ability of a human to provide a humanoid finger or thumb print at a certain point in them that is being used as an indicator of life).

By way of further example, additional example liveness tests will now be described with reference to FIGS. 16A-17. By performing multiple, different liveness tests which are based on different ones of these life characteristics, as in the third embodiment, a greater range of life-like characteristics is tested thereby enabling deductions to be made with greater certainty.

Movement-Based Liveness Tests

The following liveness tests are based on relative movement between the user and his device, i.e. movement of the user relative to the device, movement of the device relative to the user (preferable in some cases as explained below) or a combination of user and device movements.

In contrasts to the techniques set out above, these test do not rely on a physiological reaction to randomized outputs.

The movements can be performed by the user on request, as per instructions outputted by (e.g. displayed on) the user device 104 (active test). Alternatively, a passive form of test can be used, which relies instead on capturing video when the mobile device is exhibiting natural movements that have not been explicitly requested. Or in some cases, it may be appropriate to use a combination of requested and natural device movements.

Figure 16A:
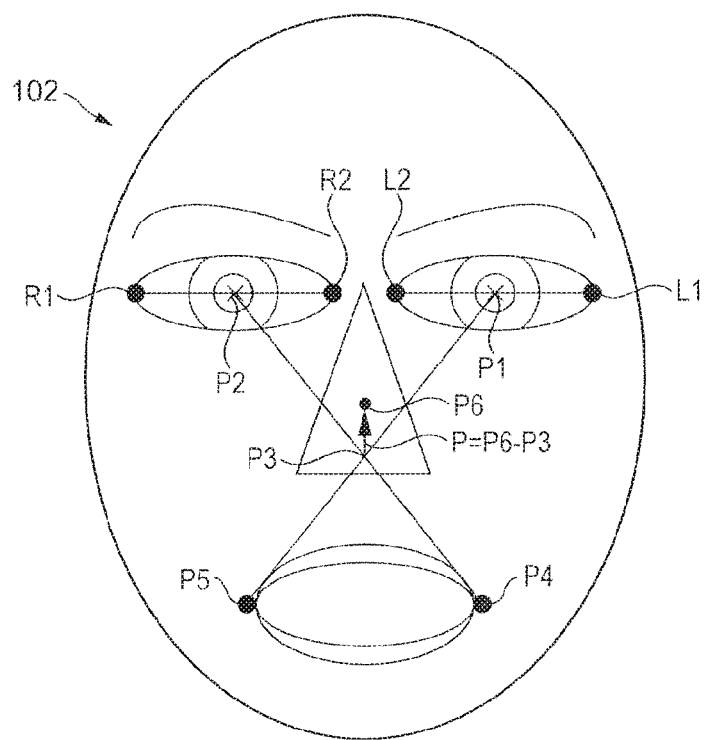
Figure 16C:
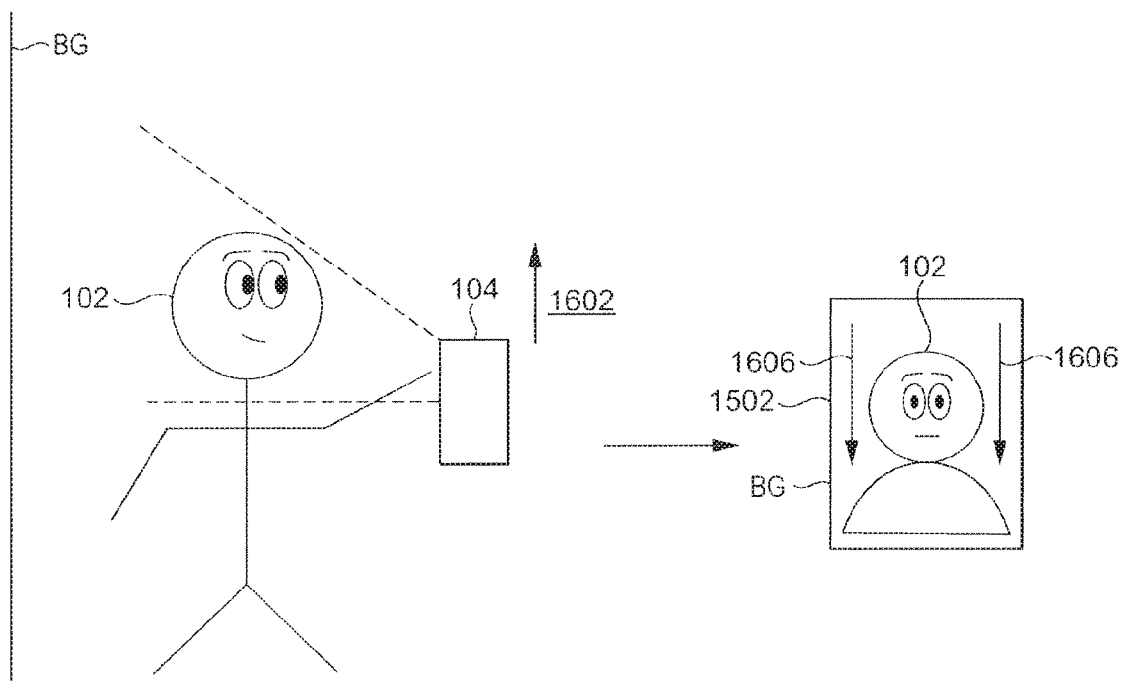
FIG. 16C shows illustrates principles of a second example of a liveness detection process based on relative motion between a user and a user device.

FIGS. 16A-B, and FIG. 16C respectively illustrate two specific examples of a type of liveness detection process based on a determined parallax exhibited by a forward reference feature relative to a rearward reference feature in a moving image captured by the forward facing camera 108F of the user device 104. Parallax is a phenomenon whereby a forward object in front of a rearward object appears to move relative to rearward object when viewed along different lines of sight in three dimensional space, corresponding to different orientations of the optical axis of the image capture device in this context. Put another way, the forward object appears to move with a greater velocity than the rearward object as the optical axis rotates. As the image capture device moves relative to the object, parallax is exhibited by objects at different depths in the moving image.

The terms "forward" and "rearward" reference features in this context mean identifiable structure in the moving image such that the forward reference feature would be expected to be in front of the reward reference feature, i.e. be separated from the image capture device by a smaller distance along its optical axis, if what has been captured in the moving image by the image capture device is a real, three-dimensional user (as opposed to a two-dimensional image of the user placed in the camera's field of view as the moving image is captured).

Access to the backend system may be regulated according to the determined parallax, and in particular may be refused if the determined parallax does not exceed a threshold, where the threshold may be zero or close to zero depending on the tolerance desired in the circumstances (as that indicates a flat surface is present in the moving image rather than an actual, three dimensional user). That is, the request may be refused is the parallax is determined to be substantially zero (zero or approximately zero).

The parallax can for example be determined by determining a relative velocity (i.e. a change in a relative separation) between the forward and rearward reference features in the moving image.

For example, the forward reference feature may be the user's nose, and the reward reference feature(s) the user's mouth and/or eye(s) (or a point or region defined relative thereto). For example, in the example of FIG. 16A, liveness detection is based on a determined parallax (in the form of a change in a difference vector D) between a point P3 on the base of the user's nose and a point defined relative to the user's eyes and mouth. This can be caused by rotation of the camera, rotation of the user's head, or a combination of both. However, in preferred embodiments, a requirement can be imposed such that, to pass the test, this effect must be caused by rotation of the camera and not the user's head, as this can prevent a certain type of replay attack (see below).

As another example, the forward reference feature may be the user himself, and the reward reference feature may be a background region against which the user is set, as in the example of FIG. 16B. This can for example be caused by rotation of the camera.

Any of the liveness detection processes disclosed herein can be used singularly or in combination with one another or existing liveness detection tests in order to regulate access to the remote system 130 in the manner described above.

The digital identity can be created at the remote system 130 in a number of ways. For example, by storing individual attributes derived from the captured identity document in the data store 132 in a secure manner such that the user 102 can present desired ones of these attributes to others as he chooses. For example, the applicant's co-pending PCT application number PCT/EP2016/053076 discloses a digital identity system (the modified uPass system) in which a digital identity can be created in this manner based on attributes, and is incorporated herein by reference. The method of FIG. 15F can, for example, be incorporated into the enrolment process described therein.

Structure Based Face Anti-Spoofing (FIGS. 16A-16B)

The term "structure based face anti-spoofing" is used herein to refer to a set of methods based on the observation that a 2-dimensional still picture of a face is the result of the projection of the 3D face on the 2D image plane. This observation enables a technique to be used where, given as few as two video frame images from different angles of the same face, it is possible to distinguish robustly between a static print attack and genuine input. Additional techniques to solve problems that arise when trying to automate frame selection from a video stream are also described below. A different method is also introduced, appropriate for different types of malicious input, such as replay attacks, to be countered.

Frame Structure Anti-Spoofing

Consider two still pictures of an individual's face where the camera is at a different angle in both frames, for example as shown in FIG. 16B. A technique, referred to herein as landmark detection, is used to robustly locate key points on the face. In this section, only the following set of points is exploited:

P1: Left eye centre
P2: Right eye centre
P3: Tip of the nose
P4: Left lip commissure (i.e. left corner of the mouth)
P5: Right lip commissure (i.e. right corner of the mouth)

An additional point P6 is defined, as the intersection between P1P5 and P2P4 (i.e. the line between points P1 to P5 and the line between points P2P4). This point P6 defines the centre of the face.

A distance metric in the form of a displacement vector P=P6P3 ("posture vector"), i.e. a vector separation between points P6 and P3, is determined. Vector P6P3 behaves very differently when drawn upon a static printed picture of a person's face.

FIG. 16A illustrates how vectors can be drawn between the various reference points previously discussed. FIG. 16B illustrates these techniques applied to an image of a real face, shown along two different lines of sight in side-by-side images. This allows a vector difference such as the posture vector P to be used to determine whether the captured movement of a face in a moving image is that of a 3-dimensional object or a flat 2-dimensional image of a face. The moving image is capturing user device camera 108.

Reference points on either side of the eyes R1, R2 (right eye) and L1, L2 (left eye) are identified and tracked as the face in the moving image exhibits motion, as are mouth reference points P4 and P5 on either side of the mouth (left and right respectively). Central eye points P1, P2 are determined for each eye as the mid-point between R1 and R2, and L1 and L2 respectively. A point P6 is then determined as the intersection of the line P1-P5 and the line P2-P4. That is, the lines from the approximately centre of each eye to the point lying approximately on the opposite corner of the mouth.

The intersection point P6 lies near to point P3, on the tip of the user's nose. A difference vector, which is the posture vector P=P6P3=P3−P6 (or P6−P3—the choice is immaterial is determined and tracked. As noted, for a moving image of a 3-dimensional human face, i.e. a real face, this vector difference P is expected to vary in a certain way as a user moves their head from side-to-side or tilts it up and down. This is because the point P6 corresponds to a point on the nose in 3-dimensional space that is forward of the point I along the user's facing direction. However, if what is captured in the moving image is itself an image of a face, i.e. a 2-dimensional representation of a face on a flat surface, any variations in the difference vector P will be measurable different from those of a 3-dimensional face. Thus, by looking in variations at the difference vector P as the user moves his head or (preferably) his device as the moving image is captured it is possible to distinguish between a real 3-dimensional face and a 2-dimensional facial image. As noted above, this can be natural movement that is not explicitly requested, or the movement may be requested by outputting suitable instructions at the user device 104.

FIG. 16B shows two static images of the same face captured from different angles, which are video frames F0 and F1 respectively. The points P1-P6 are shown in each of the images, and the changes in their relative locations due to the rotation of (in this case) the user's camera is evident.

The posture vector P in frames F0 and F1 is denoted P0 and P1 respectively.

An additional vector S=P0−P1 is determined. A vector norm of the vector S is determined as a score for the inputs. By introducing an empirically calculated threshold T, is possible to determine whether or not the input is genuine, where the entity only passes the test if norm(S)>T. The value norm(S) is a measure of a scalar difference between vectors P0 and P1.

This represents an extremely efficient anti-spoofing test, which can be implemented using as few as two video frames F0, F1 and computationally efficient image processing.

Scale and Rotation Invariance

A problem can arise where, if the face is significantly closer to the camera in one of the frames than the other, a printed static might fool the anti-spoofing detector. For this purpose, a concept of scale invariance is introduced.

To implement scale invariance, a respective distance between the centres of the eyes is determined for each of the frames F0, F1, and applied to the posture vector of that frame as a scale factor. That is, the posture vector for that frame P is scaled by that factor to generate a new vector P' for that frame that is insensitive to the distance between the subject and the camera:

$$P'=P/|P1P2|$$

So for frames F0 and F1 respectively, P0 and P1 are scaled by the distance between the eyes in that frame respectively.

Another problem that can arise is when the input is static printed picture where the subject has his head turned to the side by ~30 degrees. Then an attacker could fool the anti-spoofing system by rotating the printed picture by 90 degrees between the two frames and get a score S greater than the threshold T. To address this, rotation invariance is introduced, where an angle of the line (P1P2) relative to a horizontal direction of the image is measured and the posture vector P is rotated by that angle:

$$P'=\text{rotate}(\text{angle}(P1P2),P)$$

The points P1, P2 at the respective centres of the eyes are suitable reference points to provide both the scalar and rotational invariance because, although they may move as the user moves his head, their positions on the face are fixed (unlike, say, points P4 and P5 on the mouth corners, whose positions on the face may vary due to facial expressions). Other such points on the face (i.e. at fixed locations on the face) can also be used.

Orientation Normalisation

It might also be the case that if the angle between the two frames is too high then even a static printed input might get a score S large enough to pass the anti-spoofing test.

This problem can be solved by normalizing depending on the actual change in the orientation angle between the two frames before thresholding.

This requires an estimation of the orientation/posture of the user's face in some way, for example as described in the next section.

Frame Selection Based on 3D Face Pose Estimation

If the two frames F0, F1 are selected from a continuous input stream derived from a single camera, one of the main problems that arises is how to select the appropriate frames.

This is important since if the orientation change between the two selected frames is too small then all the inputs will be incorrectly classified as attacks instead of genuine faces. A robust pose estimation method allows an appropriate pair of frames to be selected.

3D Face Pose Estimation

To estimate the 3D face posture from a single 2D image (video frame) a generic 3D face shape model is used as a reference. Using this 3D reference shape model, a projection matrix that was used to capture the 2D image is estimated, by seeking the 2D-3D correspondences between the same landmark points in the 2D image and on the surface of the 3D face model.

The 3D to 2D projection matrix, once determined, is exploited in order to compute the Euler angles that specify the 3D face pose on every video frame in terms of its roll, pitch and yaw angles. Euler angles are a known mathematical construct, which are also used to describe the orientation of one frame of reference relative to another e.g. as a triplet of angular values (such as pitch, roll and yaw).

Having obtained the 3D face pose on every video frame, two 2D images are selected as having an orientation change significant enough to facilitate the two-frame structure antispoofing method. That is, the two frames that are selected are such that a difference between the respective orientations of the face in those frames exceeds a suitably threshold chosen to match the parameters of the test itself.

Continuity of Input

A potential attack against the anti-spoofing system might be to have two separate static photos of the same person from two different angles and substitute one for the other during video capture.

This can be prevented by introducing additional checks in the image processing, namely to make sure that the face-detection box position and landmarks are typical of a single object moving at reasonable speeds throughout the input. This means that the face can never be occluded, there can never be more than a single face at a time and it cannot "teleport" from one point to another during the input feed. To this end, a speed measure (e.g. scalar speed or velocity vector) can be determined for the face across the video frames F, and compared with a speed threshold. The entity fails the test if the speed threshold is exceeded at any time.

Extension to Replay Attacks

So far, a relatively cheap and simple attack whereby the attacker displays a video of a live subject from a device/screen in front of the camera has not been addressed.

To address this type of attack, an additional requirement can be introduced, namely that the user's head remains almost still while he is capturing his face from different view angles as he is moving the hand held camera 108. That is, the user is required to rotate the camera 108 whilst keeping his head still.

Thus it is possible to discriminate between a genuine login attempt and a replay attack by measuring a correlation between the face pose change (that is, changes in the posture vector P) in time relative to the way the device is moving in the actual world by the user. In order to estimate the device location and orientation in the real world, available inertial sensors on the user device 104 are exploited. The vast majority of modern mobile devices are equipped with such sensor (e.g. an accelerometer, gyroscope and magnetometer).

The 3D face pose is estimated on every frame by the method described above. Thus it is possible to practically transform the problem of liveness detection against replay attacks as a time series similarity measurement problem where it is determined whether the input video stream shows a genuine login attempt (live face) if the similarity score is higher than an experimentally defined threshold.

Finally, in order to ensure that the change in the face pose is caused by the displacement of the capture device 108 and not due to head movement, a variance of the respective sensor data is determined, and a requirement can be introduced that the determined variance is above a specified threshold for the entity to pass the test.

The following describes how data is collected for pose estimation using directions and graphical indications given to the user via the user interface. The user interface design thus serves to assist with the collection of data from a mobile device in order for pose estimation to be performed. The purpose of the user interface design is to guide the user to perform specific movements which are needed in order to perform the pose estimation. The user must change the orientation of the mobile device while recording his face to get different angles between the face and the mobile device. That is to say the mobile device must be moved so as to capture images with various viewing angles between the user's face and the mobile device. The changes in the angle of the mobile device relative to the user's face are determined based on the 3D face modelling described above.

Figure 21A:
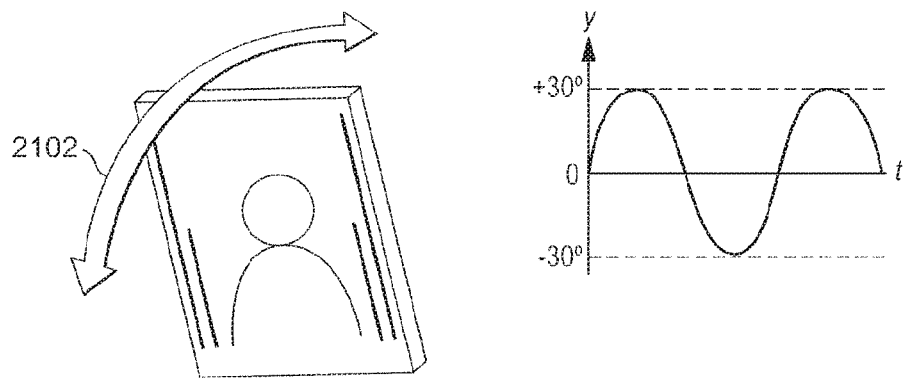
FIG. 21A shows an example of a range of motion of a mobile device moving through a Y axis.

FIG. 21A shows the mobile device Y orientation motion. That is an example of the range of motion the mobile device goes through when moving through its Y-axis. The arrow 2102 shows the direction and example of the extent of this motion. The phone is rotating about a horizontal axis so that the top and bottom edges of the mobile device move close to or further away from the user. That is to say motion in the Y orientation results in the top edge of the mobile device moving towards the user holding the mobile device and the bottom edge moving away from the user, or the bottom edge of the mobile device moving towards the user and the top edge moving away from the user.

Figure 21B:
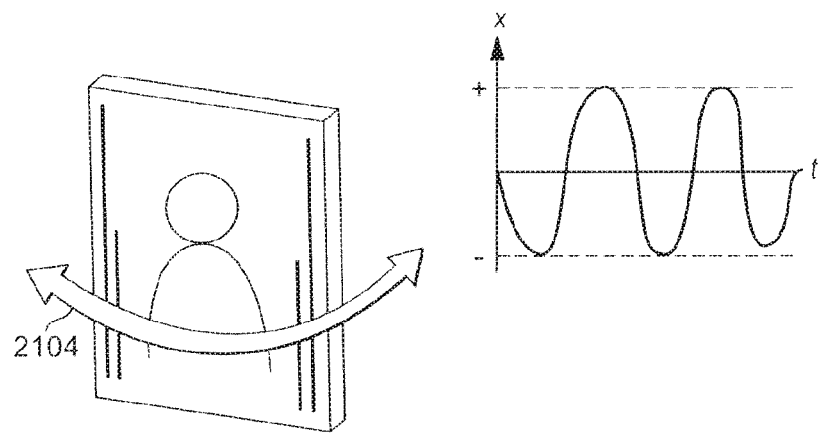
FIG. 21B shows an example of a range of motion of a mobile device moving through a X axis.

FIG. 21B shows the mobile device X orientation motion. That is an example of the range of motion the mobile device goes through when moving through its X-axis. The arrow 2104 shows the direction and example of the extent of this motion. The phone is rotating about a vertical axis so that the left and right edges of the mobile device move close to or further away from the user. That is to say motion in the X orientation results in the left-hand edge of the mobile device moving towards the user holding the mobile device and the right-hand edge moving away from the user, or the right-hand edge of the mobile device moving towards the user and the left-hand edge moving away from the user.

Figure 22:
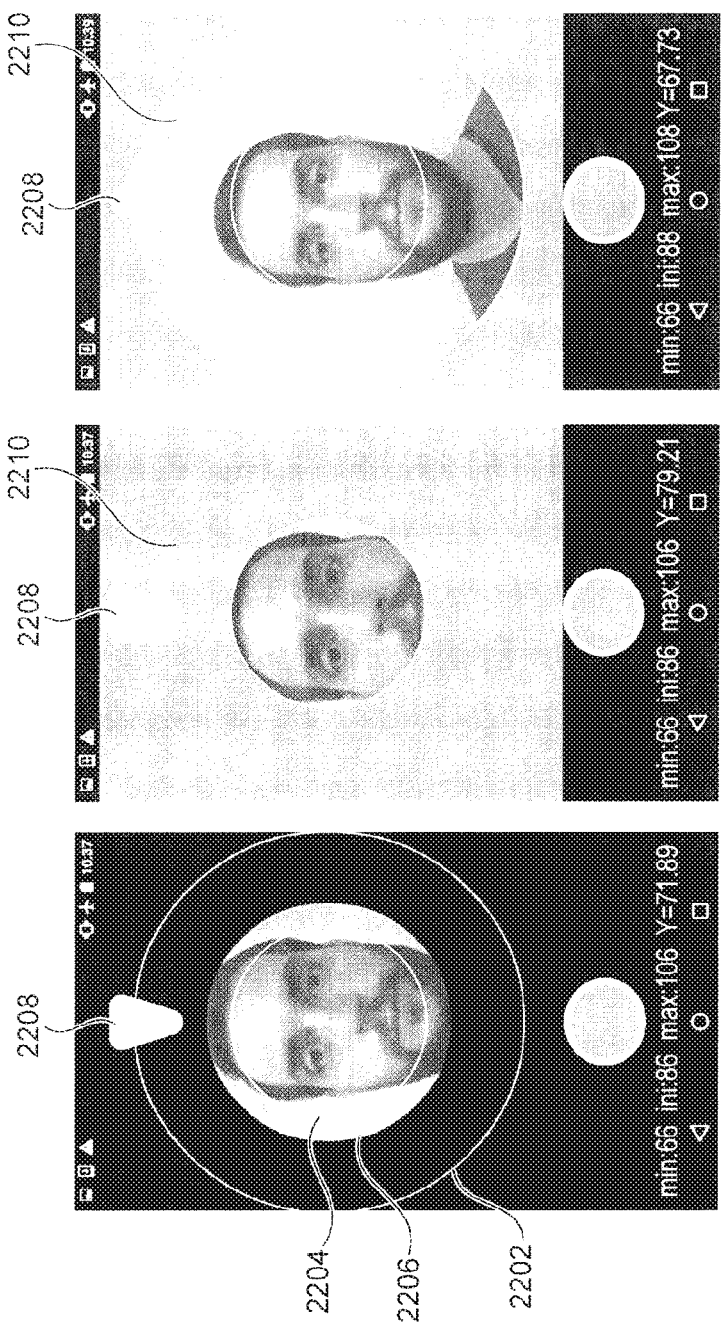
FIGS. 22-24 show example user interfaces on a mobile device.
Figure 23:
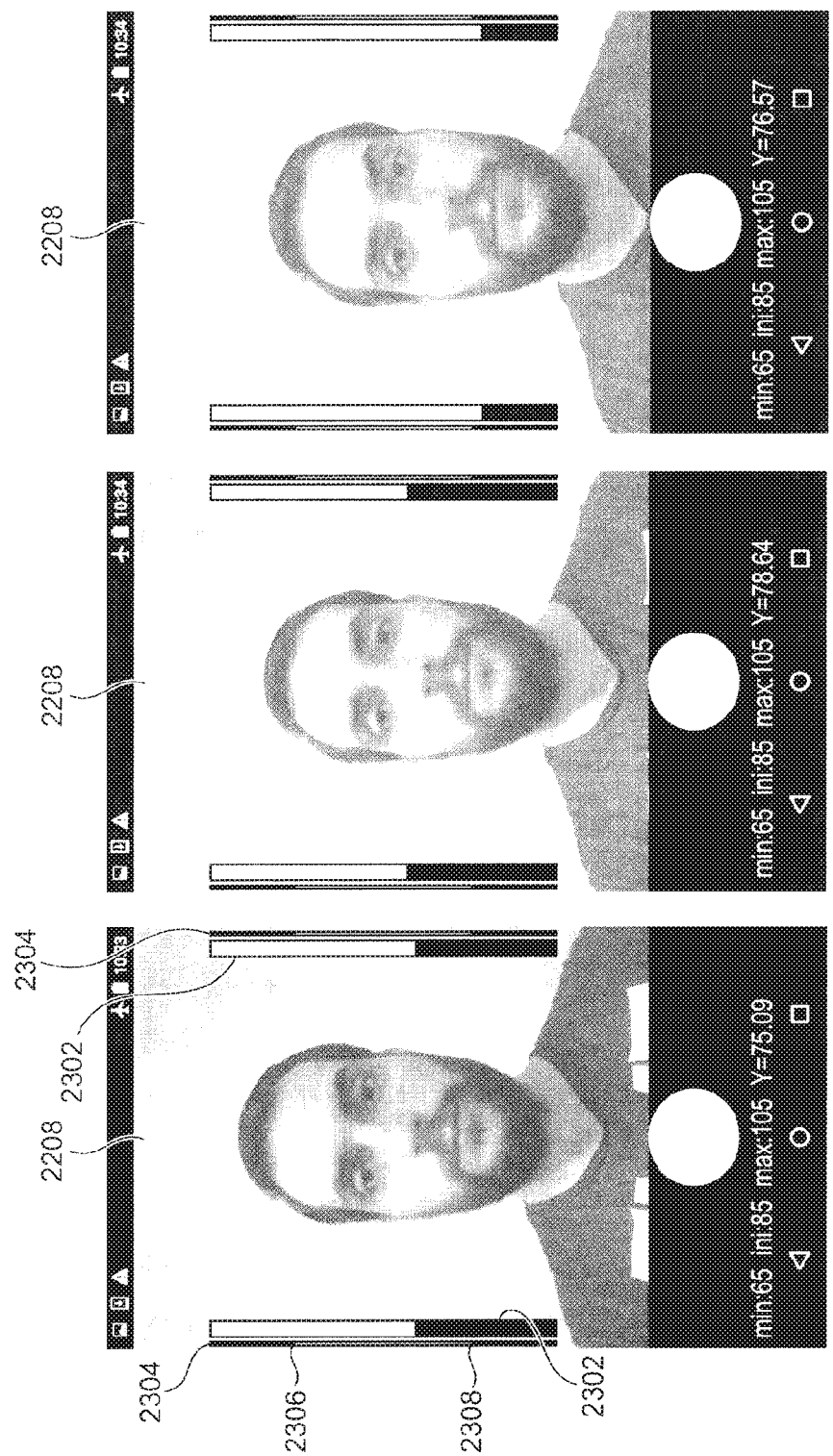
Figure 24:

FIGS. 22, 23, and 24 show the user interface as viewed by the user. The user is provided with graphical indications to assist them with the manipulation of the mobile device in order to fulfil the movement requirements.

FIG. 22 shows two concentric circles 2202 and 2204. The user is given the task of resizing the circle which contains their face 2206. The user is asked to keep the circle with their face in it 2206 to a size between the two circles shown 2202 and 2204. That is the circle displayed to the user with their face in it must have its edges moved either towards or away from the centre of all of the displayed circles, which are concentric, until the circle edge lies between the edges of the two fixed circles 2202 and 2204. The circles 2202 and 2204 may have fixed sizes for only a short amount of time. That is the circles 2202 and 2204 may have a fixed size within the display until the task is adequately carried out. The size of the circles 2202 and 2204 may then be changed on completion of the task. The task may be required to be carried out repeatedly until such a time as the necessary range of motions have been covered or until some other specified criteria has been fulfilled. The size of circle 2206 containing the users face may also change with time. That is to say that size of circle 2206 may change continuously or incrementally with time, and the user may be required to correct the size of the circle 2206 by changing the angle of the mobile device in the Y orientation so that it once again lies between the limits set by circles 2202 and 2204. Alternatively the size of circles 2202 and 2204 may change continuously or incrementally over time. In another alternative the size of circles 2202, 2204 and/or 2206 may change in any way that combines these two types of motion. That is to say in one such example the target zone between circles 2202 and 2204 may change continuously by a small amount over time, and subsequently change in size by a larger amount upon completion of the task.

The size of the circle 2206 is changed by tilting the mobile device in the Y orientation. The required direction of tilt is indicated using an arrow 2208. The target size or the displayed size of the circle 2206 changes in time and the mobile device must then be tilted to correct this variation and reposition the circle 2206 edge within the limits shown by circles 2202 and 2204. The background area outside of the circle containing the users face, that is where no image is shown, may turn red in response to the circle containing the user's face 2206 not being of the correct size to fulfil the requirement, as shown by darkened areas 2210.

FIG. 23 shows two sets of parallel bars on either side of the user interface. The inner most pair of bars 2302, or active bar(s), respond to the tilting of the mobile device in the Y orientation. The tilting as described above results in this example in the active bar or bars 2302 filling or emptying, or increasing or reducing in height. The task set for the user is to keep the height of the active bar 2302 (i.e. the top-most edge of the bar), as measured against markings on an adjacent outermost indicator bar 2304, either aligned within two boundaries 2306 or aligned with a specifically coloured section 2308. The task may be to align the active bar 2302 with the middle of the defined target area. An arrow 2208 is used to indicate orientation change needed. That is to say the arrow 2208 indicates the direction in which the user is required to tilt the mobile device to achieve the objective and fulfil the task.

FIG. 24 shows the same parallel bar arrangement as in FIG. 23. The target area of the indicator bar may change in a similar way to that described above with regard to the motion of the concentric circles defining the target area of FIG. 22. That is to say that the target area, defined by the two limits 2406, may change in size with time, i.e. by the boundaries 2406 moving closer together or further apart from each other. The target area may also move over time in its entirety up or down the length of the indicator bar 2404. The active bar 2402 may be one colour when the height or top-most edge is aligned outside of the target area on the indicator bar 2404, and change colour when aligned within the target area on the indicator bar 2404. For example the active bar 2402*b* may be blue when correctly aligned, and may turn red 2402*a* when incorrectly aligned.

The active bar and indicator bar may in embodiments be partially or fully overlapping, or displayed as a single bar where one bar appears as a bar within or over the top of the other bar. Thus either bar may be partially translucent or opaque so as to allow the necessary parts and indicators of each bar to be visible.

Asking that the user perform any of the tasks described above allows for verification that there is an actual 3D face in front of the camera of the mobile device. The user must perform the correct rotations of the mobile device relative to their face in order to be considered to have successfully completed the task. That is to say the request is only granted if the face is 3D and the rotations match what is expected.

The request for access to the remote system 130 may be refused if the user is unable to complete the required task.
Additional Liveness Tests:

FIG. 16C illustrates another example liveness test, which is based on relative motion of a user in a moving image captured relative to a background in the moving image. It is based on the realisation that, for a real user in 3-dimensional space in front of a detectable background such as a wall, movement of the user device whilst capturing the moving image is expected to cause relative motion between the user and the wall within the captured moving image.

This technique enables detection of a flat image of a face being positioned in front of the user device, opposed to a 3-dimensional face.

FIG. 16C shows how detection of movement of a background BG in relation to the user when specific movements of the user device 104 can be used to determine liveness. On the left of FIG. 16C a user 102 can be seen holding a user device 104 up to capture a self-video image. A background, BG, is subsequently visible in the same video image. As the user 102 moves the user device 104, for a real user in 3D space, objects behind the user that make up the background BG have greater parallax than the user 102 as seen from the viewpoint of the user device 104. The user 102 may maintain their image within the self-video image being captured whilst simultaneously moving the camera as shown by the arrow 1602. Doing so results in the background BG moving within the captured video image 1604 as shown on the right of FIG. 16C. The movement of the background BG from the viewpoint of the user device is observed to be in the opposite direction to which the user moves the user device, as shown by arrows 1606. For a real 3-dimensional user who is forward of a real background in 3-dimensional space, it is expected that the velocity of the background will differ from the velocity of the user as the user device is moved whilst capturing the moving image, due to the phenomenon of parallax. The term "forward" in the context means a non-zero distance between the user 102 and the background BG in a direction perpendicular to the plane of the captured moving image, i.e. in a direction parallel to an optical axis of the user devices camera when capturing the moving image.

The liveness detection techniques of FIGS. 16A to 16C are particularly efficient in terms of computational complexity as they require minimal image processing.

Figure 17:
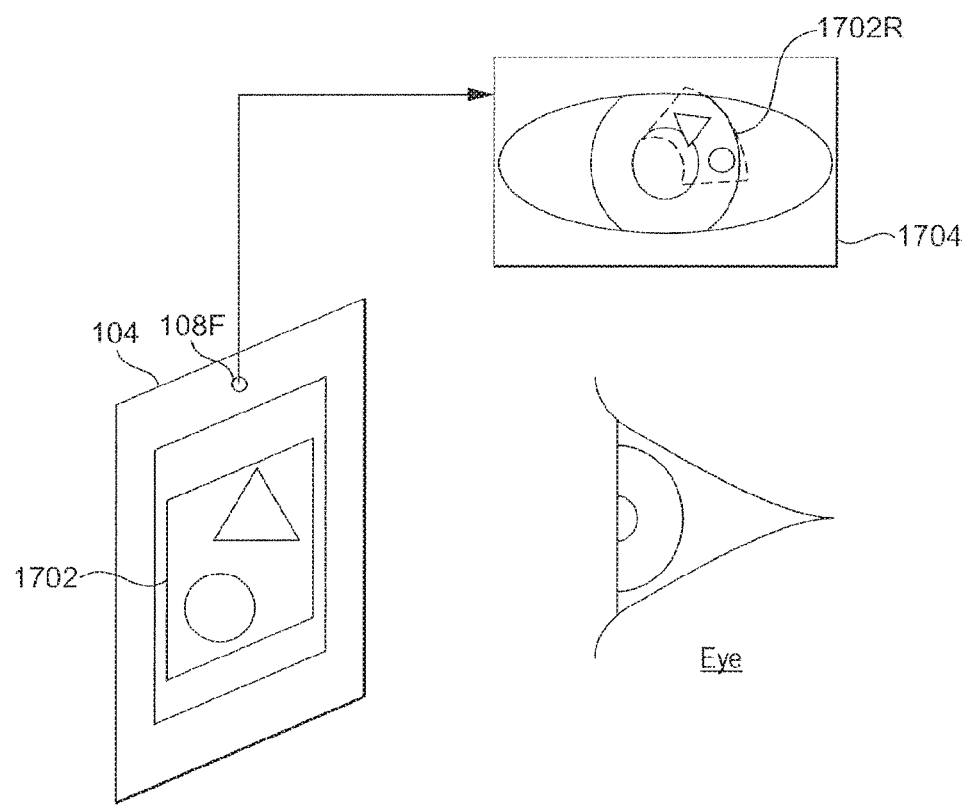
FIG. 17 illustrates a liveness detection process based on specular reflection of a displayed image in a user's eye.

FIG. 17 illustrates another example liveness test, based on specular reflection from a user's eyes. User device 104 displays an image 1702 which is preferably randomly generated, e.g. randomly selected from a list of images, generated using randomly selected image elements, or otherwise generated using randomized image data. The image is observed by the user 102 and a self-video image 1704 is captured by camera 108F of user device 104. The self-video image 1704 is captured at a high enough resolution and quality that the reflection of the observed image 1702R from the surface of the user's eye can also be captured. This allows for the determination of the image being viewed by the user at the time of capture of the self-video image. This can verify liveness by determining that the image 1702 being shown on the user device 104 at a certain time with a certain time value is the same image as observed in the specular reflection 1702R of the user's eye or eyes captured in the self-video image 1704, and having the same time value in the timestamp. In FIG. 17 the displayed image 1702 of a triangle and a circle can be seen in the specular reflection 1702R from one of the user's eyes in the captured image 1704. The reflected image is reversed as it is a reflection, and warped by the curvature of the surface of the eye.

The liveness test of FIG. 17 is not based on physiological reaction, but rather a physiological characteristic of a human eye, namely its specular reflective properties.

Further, whilst in the above example, the two liveness tests are performed by a single user device 104, the two tests could be performed by multiple, collocated devices available to the user—for instance, one test could be performed by a user's laptop and the other by their smartphone. Where signatures of the kind described above are used, both parameter sets are still sent to each device in this case, so that each device can generate the signature from both parameter sets.

Figure 20B:
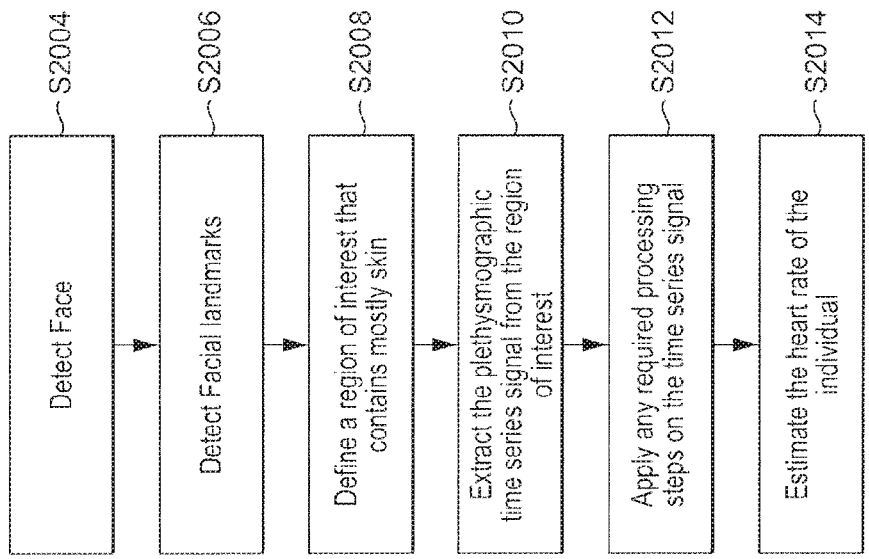
FIG. 20B shows a flowchart for a method of liveness detection based on the detection of a heartbeat in a moving image.
Figure 20A:
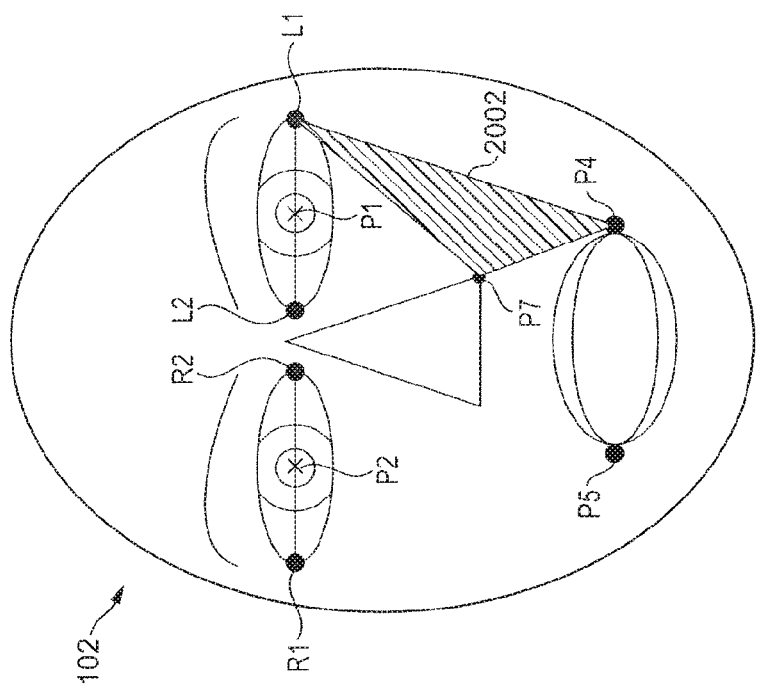
FIG. 20A demonstrates how a skin region of a user's face can be isolated for detecting a heartbeat.

Liveness Detection Based on Heartbeat Detection:

FIGS. 20A-B illustrate another liveness test, which is based on pulse detection. FIG. 20B shows a flowchart for the method and FIG. 20A demonstrates how a skin region of a user's face may be isolated for use in the method.

The pulse detection method for detecting liveness of a person 102 in front of the camera 108 comprises estimating the heart rate of the person 102 through a video stream of his or her face. This method uses optical imaging sensors to measure subtle skin-color changes, which is sometimes referred to as remote photoplethysmography. A photoplethysmogram (PPG) is an optically obtained plethysmogram, conventionally used to obtain a volumetric measurement of an organ. With each cardiac cycle the heart pumps blood to the periphery of the body. Even though the resulting pressure pulse is somewhat damped by the time it reaches the skin, it is enough to distend the arteries and arterioles in the subcutaneous tissue. The change in volume caused by the pressure pulse is detected by illuminating the skin with the light and then measuring the amount of light either transmitted or reflected. Each cardiac cycle results in a peak in the obtained photoplethysmogram or plethysmographic time series signal. Using these techniques it is thus possible to obtain a plethysmographic signal from the video stream by monitoring the variation in colour of the light reflected from the skin.

The principles of photoplethysmography is known for example in the context of medical science. Here those principles finds a novel application, namely the regulating of access to the remote system 130 via the network 118 by the user device 104, which is refused unless the method is able to detect colour changes in the user's skin that are indicative of a human heartbeat.

As will be apparent, the term "colour" is not limited to chromaticity but also covers luminance. That is, changes in luminance or chromaticity, individually or in combination, constitute colour changes.

In step S2004 of FIG. 20 the face 102 is detected through a standard face detection algorithm within the video stream. In step S2006 facial landmarks, e.g. L1, P7, and P4 (though this is purely exemplary), are computed for all frames or a selection of frames. In step S2008 facial landmark positions are then used to define a region of interest 2002 that contains mostly skin. Additionally, it is possible to select a subsequence of consecutive frames that exhibit the smallest amount of motion with respect to the position of the facial landmarks used so as to improve further processing. Similarly, image stabilisation techniques can be applied to the video stream before or after face detection to compensate for natural motion induced by the user holding the device.

In step S2010 a plethysmographic time series signal is extracted from the region of interest. This can be done using a variety methods. The most straightforward method is to form the plethysmographic signal as simply the intensity pixel values taken at the sampling frequency of the video stream within the region of interest. That is, a time series of colour values at a particular location. To relatively compensate for motion, illumination variations and noise, it is preferable to average neighbouring pixels instead of taking a single pixel. It is also generally better to rely on multiple signals extracted from the region of interest at different locations rather than only one to estimate the heart rate frequency. A possible approach is to select different locations within the region of interest to create a set of signals. That is, multiple time series at different locations. This set can then be selected from to provide a confident subset based on some criteria. For example the selection criteria may be how powerful a dominant frequency is in a given time series compared to other frequencies in an overall spectrum determined for the multiple time series. In the extreme case, one can extract all signals at all locations within the region of interest and apply various methods to select only the signals that contain the most relevant information for heart rate estimation.

As the video stream contains RGB channels, one can use only the green channel (i.e. only the green pixel values) which has been shown to contain the strongest plethysmographic signal. However all channels (R, G, and B) can also be used, either individually or in any combination. For example by computing a linear combination of those signals to extract a stronger signal. Alternatively, it is also possible to approach this problem in the context of blind source separation to derive the plethysmographic signal from a set of mixed time series signals coming from R, G and/or B channels potentially at different locations using standard principal or independent component analysis methods.

Generally, it is also favourable to apply multiple processing steps on the time series signals, as in step S2012. This can include smoothing, de-trending and/or band pass filtering within the range of the human heart rate. Smoothing will help to remove noise and can be achieved by a simple moving average filter. De-trending will help to reduce non-stationarities (inconsistencies induced due to motion of the device), and other trends in the signal so that the focus is on the periodicity of the signal. Variability in the plethysmographic signal can have various origins including sudden light changes in the particular scenario being monitored. Finally, band pass filtering allows to restrict pulse frequencies (i.e. heartbeat frequencies) that are plausible for a human being. That is, to filter-our frequencies that are too high or too low to plausibly be a human heartbeat. It is thus possible, as in step S2014, to determine whether a heartbeat is present, and estimate the heart rate of the individual if it is.

This method estimates a frequency that is related to a physiological change in the human body, which is a typical characteristic of a human being alive. Hence, it is robust to multiple attacks such as presenting a printed face picture, displaying a picture on an electric device, physical 2D/3D masks or 2D/3D computer-generated faces, since a video of those attacks will not contain any plethysmographic signals and consequently no major frequency related to the heart rate.

The specific attack of video replay can be addressed by analysing more carefully the spectrum which will exhibit differences compared to the spectrum of a genuine video due to the recapturing process. In particular this could be addressed from a machine learning perspective by classifying spectra using extracted features from a training set of normal and fraudulent spectrums. Alternatively, more powerful features could be extracted by additionally exploiting the time information such as in a time frequency analysis.

Any of the difference liveness tests disclosed herein can be implemented in combination with each other or with existing tests, or they may be implemented as stand-alone tests. Any are or more of the described tests can be implemented or part of an enrolment process to create a digital identity, for example, based on a real-world identity document (e.g. in an original uPass system or Modified uPass system.

Figure 18:
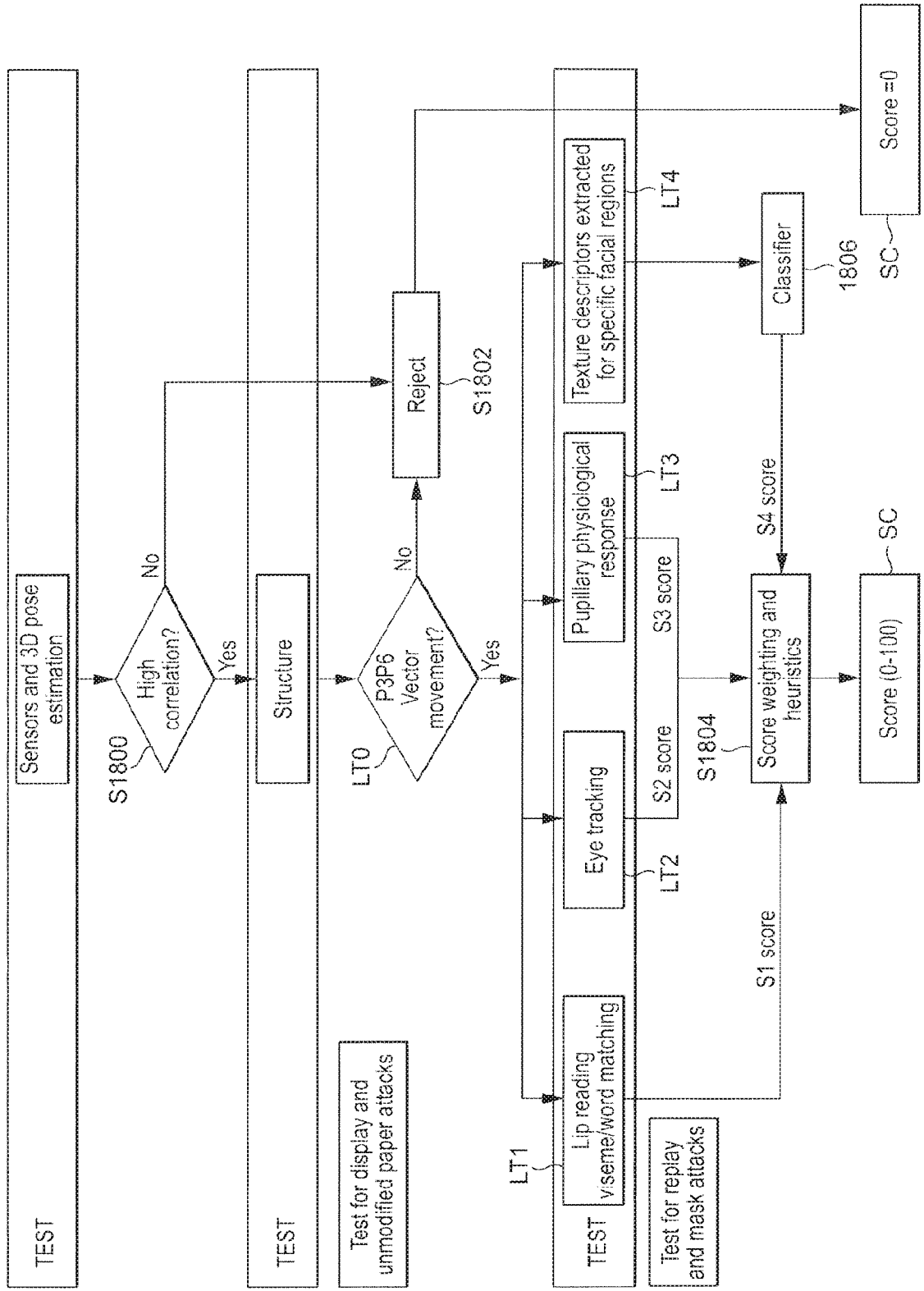
FIG. 18 shows a schematic overview demonstrating how multiple liveness detection processes can be combined to provide extremely robust liveness detection.
Figure 19:
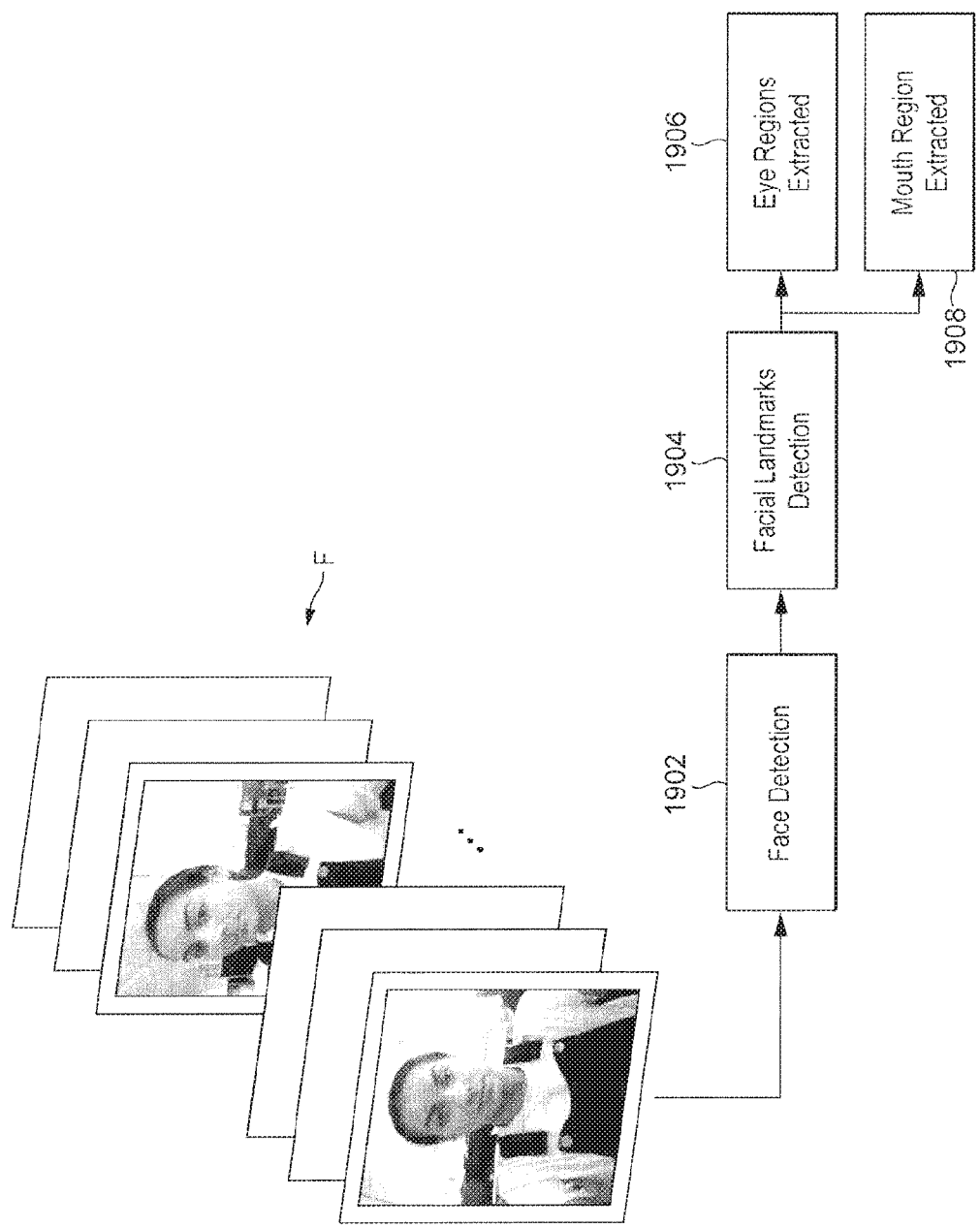
FIG. 19 shows a function block diagram, which represents video pre-processing functionality.

For example, in one implementation, five of liveness detection tests are combined. This is illustrated in FIG. 18, which is a high-level block diagram illustrating a scheme by which these five tests can be combined. The five tests are:

The structural/pose estimation test of FIG. 16A (LT0, FIG. 19)

The pupillary reflex test of FIG. 2A (LT3)

The eye tracking test of FIG. 6A (LT4)

The viseme/word matching test (i.e. lip-reading) of FIG. 15C that tries to identify whether a user has spoken the correct word(s) as requested (LT1)

A texture analysis test of specific key regions of the face that tried to identify whether specific visual effects, that usually occur in replay attacks, are present (LT4).

These five tests are combined, to generate an overall score SC in the manner described below.

An initial check can be performed (S1800) in some cases, to ensure that any changes in the pose (i.e. orientation) of the user's head correlate with inertial sensor data captured with the device. This check ensures that these movements have been caused by movement of the device relative to the user's head, and not movements of the user's head. As noted above, this counters replay attacks based on recorded video. For example, the user's pose (e.g. a pose vector, denoting an orientation of the face relative to the plane of the moving image) can be determined by comparisons with the 3D facial model, and changes in the pose compared with the sensor data. That is, based on 3D face pose tracking and correlation of the tracked pose with the mobile inertial sensors.

If the movements do not match the inertial sensor data, the entity fails the test (S1802), if they do, the method proceeds to test L0.

The pose test LT0 is performed initially as a binary pass/fail test. In the event that the P3P6 vector is determined not to exhibit the required motion characteristics (fail) in this test LT0, the entity subject to the test is rejected (step S1802), by generating a zero-valued overall score SC.

However, if the entity passes test LT0, i.e. if the P3P6 vector is determined to have exhibited the required motion characteristics, at step S1804 the remaining four liveness detection tests LT1-LT4 are performed in parallel. Each is performed independently to estimate a respective score—labelled "S1 score"-"S4 score" respectively. For test L1, score S1 is that described with reference to FIG. 15D.

For test L4 (texture analysis), a classifier 1806 generates score S4 based on an output of a texture analysis function applied to a moving image of the entity. Each of the tests can be applied to the same video, i.e. the same moving image of the entity subject to the test.

The score of every test is outputted to a heuristic score engine 1906 that combines them, by applying a score combination function to scores S1-S4, so as to evaluate a total probability that this video is an attack or not, which is denoted by the overall score SC. For example, the overall score may take values between 0 and 100 corresponding to probabilities of 0 (definitely an attack) and 1 (definitely not an attack) respectively.

FIG. 19 is a function block diagram illustrating how pre-processing can be applied to each of the frames F of a moving image, to facilitate the combined liveness tests of FIG. 18.

Face detection block 1902 represents a facial detection process to each frame, to detect the user's face therein. Face detection module 1094 has an output connected to an input of a facial landmark detection module 1904, which detects the required facial landmarks (both eye, mouth and nose landmarks for the combined tests of FIG. 19). Eye and mouth regions are then extracted (represented by blocks 1906 and 1908 respectively), for use in the relevant tests. The functional block of FIG. 19 can be implemented at the user device 104, the server 120 or be distributed between the user device 104 and the server 120.

The processing performed to implement any of liveness detection tests disclosed herein can be implemented at the server 120, the user device 204, or part of it can be performed at the server 120 and part at the user device 104 for example based on communication between the user device 104 and the server 120 via the network 118. For example, by transmitting test parameters from the server 120 to the user device 104 via the network 118 so the user device 104 can perform the necessary user device processing, and by transmitting image data (e.g. a moving image captured at the user device 104 or information extracted from the moving image at the user device 104) to the server 120 via the network 118 so that the server 120 can perform the necessary server-side processing.

Whilst the above has been described with reference to specific embodiments, these are exemplary and other variations may be apparent to the skilled person. The scope is not limited by the described embodiments but only by the following claims.

The invention claimed is:

1. A computer implemented method of regulating access to a computer system, the method comprising:
   receiving from a user device a request for access to the computer system;
   receiving a moving image of a user's face captured with an image capture device of the user device, the moving image being captured as the user's face and the image capture device exhibit motion relative to each other;
   processing the moving image to determine an orientation of the user's face in the moving image, or to identify at least one forward reference point on the user's face and at least one rearward reference point on the user's face;
   receiving sensor data generated by a motion sensor coupled to the image capture device whilst capturing the moving image;
   based on said processing of the moving image, detecting at least one of: a change, in the moving image, of the orientation of the user's face, or a movement, in the moving image, of the forward reference point relative to the rearward reference point;
   measuring a correlation between: (i) said change or said movement as detected in the moving image, and (ii) motion of the image capture device as indicated by the sensor data generated by the motion sensor whilst capturing that moving image; and
   determining whether to grant the request for access based on the measured correlation between (i) said change or said movement as detected in the moving image (ii) said motion of the image capture device, wherein the request is granted only if the measured correlation indicates the detected change in the orientation of the face or the detected movement of the references points correspond to said motion of the image capture device;

wherein detecting at least one of the change, in the moving image, of the orientation of the user's face, or the movement, in the moving image, of the forward reference point relative to the rearward reference point comprises detecting the change, in the moving image, of the orientation of the user's face, wherein the change is a change in an estimated 3D face pose vector detected based on said processing of the moving image, and wherein said measured correlation is a measured correlation between (i) a change in the 3D face pose vector and said (ii) device motion indicated by the sensor data, said orientation of the user's face being determined as said 3D face pose vector;

wherein said 3D pose vector is estimated on each frame of a sequence of frames of the moving image, thereby determining a time series of 3D face pose vectors, and wherein said correlation is measured as a similarity between (i) the time series of 3D face pose vectors and (ii) a time series of device motion values of said sensor data as generated said motion sensor; and wherein the time series of 3D face pose vectors and the time series of device motion values are compared to compute a similarity score, and the similarity score is compared with a threshold to determine whether to grant the request for access.

2. The method according to claim 1, wherein detecting at least one of the change, in the moving image, of the orientation of the user's face, or the movement, in the moving image, of the forward reference point relative to the rearward reference point comprises detecting the movement, in the moving image, of the forward reference point relative to the rearward reference point, and wherein the movement is detected by determining a change in separation between the forward and rearward reference points in the moving image.

3. The method according to claim 1, further comprising determining a speed measure for the face in the moving image, wherein the request is granted only if the speed measure does not exceed a speed threshold at any time in the moving image.

4. The method according to claim 1, wherein the orientation of the user's face is determined by comparing the moving image with a 3D facial model.

5. The method according to claim 1, wherein the motion sensor an inertial sensor.

6. A liveness detection system for regulating access to a computer system, the liveness detection system comprising:
computer storage configured to store executable instructions; and
one or more processors coupled to the computer storage for executing the instructions, the instructions being configured, when executed on the one or more processors, to implement the following:
receiving from a user device a request for access to the computer system;
receiving a moving image of a user's face captured with an image capture device of the user device, the moving image being captured as the user's face and the image capture device exhibit motion relative to each other;
processing the moving image to determine an orientation of the user's face in the moving image, or to identify at least one forward reference point on the user's face and at least one rearward reference point on the user's face;
receiving sensor data generated by a motion sensor coupled to the image capture device whilst capturing the moving image;
based on said processing of the moving image, detecting at least one of: a change, in the moving image, of the orientation of the user's face, and a movement, in the moving image, of the forward reference point relative to the rearward reference point;
measuring a correlation between: (i) said change or said movement as detected in the moving image, and (ii) motion of the image capture device as indicated by the sensor data generated by the motion sensor whilst capturing that moving image; and
determining whether to grant the request for access based on the measured correlation between (i) said change or said movement as detected in the moving image (ii) said motion of the image capture device, wherein the request is granted only if the measured correlation indicates the detected change in the orientation of the face or the detected movement of the references points correspond to said motion of the image capture device;
wherein detecting at least one of the change, in the moving image, of the orientation of the user's face, or the movement, in the moving image, of the forward reference point relative to the rearward reference point comprises detecting the change, in the moving image, of the orientation of the user's face, wherein the change is a change in an estimated 3D face pose vector detected based on said processing of the moving image, and wherein said measured correlation is a measured correlation between (i) a change in the 3D face pose vector and said (ii) device motion indicated by the sensor data, said orientation of the user's face being determined as said 3D face pose vector;
wherein said 3D pose vector is estimated on each frame of a sequence of frames of the moving image, thereby determining a time series of 3D face pose vectors, and wherein said correlation is measured as a similarity between (i) the time series of 3D face pose vectors and (ii) a time series of device motion values of said sensor data as generated said motion sensor; and
wherein the time series of 3D face pose vectors and the time series of device motion values are compared to compute a similarity score, and the similarity score is compared with a threshold to determine whether to grant the request for access.

7. The liveness detection system according to claim 6, wherein the orientation of the user's face is determined by comparing the moving image with a 3D facial model.

8. Non-transitory computer-readable storage media configured to store executable instructions for regulating access to a computer system, the instructions being configured when executed on one or more processing units of a liveness detection system to implement the following:
receiving from a user device a request for access to the computer system;
receiving a moving image of a user's face captured with an image capture device of the user device, the moving image being captured as the user's face and the image capture device exhibit motion relative to each other;
processing the moving image to determine an orientation of the user's face in the moving image, or to identify at least one forward reference point on the user's face and at least one rearward reference point on the user's face;

receiving sensor data generated by a motion sensor coupled to the image capture device whilst capturing the moving image;

based on said processing of the moving image, detecting at least one of: a change, in the moving image, of the orientation of the user's face, and a movement, in the moving image, of the forward reference point relative to the rearward reference point;

measuring a correlation between: (i) said change or said movement as detected in the moving image, and (ii) motion of the image capture device as indicated by the sensor data generated by the motion sensor whilst capturing that moving image; and determining whether to grant the request for access based on the measured correlation between (i) said change or said movement as detected in the moving image (ii) said motion of the image capture device, wherein the request is granted only if the measured correlation indicates the detected change in the orientation of the face or the detected movement of the references points correspond to said motion of the image capture device;

wherein detecting at least one of the change, in the moving image, of the orientation of the user's face, or the movement, in the moving image, of the forward reference point relative to the rearward reference point comprises detecting the change, in the moving image, of the orientation of the user's face, wherein the change is a change in an estimated 3D face pose vector detected based on said processing of the moving image, and wherein said measured correlation is a measured correlation between (i) a change in the 3D face pose vector and said (ii) device motion indicated by the sensor data, said orientation of the user's face being determined as said 3D face pose vector;

wherein said 3D pose vector is estimated on each frame of a sequence of frames of the moving image, thereby determining a time series of 3D face pose vectors, and wherein said correlation is measured as a similarity between (i) the time series of 3D face pose vectors and (ii) a time series of device motion values of said sensor data as generated said motion sensor; and wherein the time series of 3D face pose vectors and the time series of device motion values are compared to compute a similarity score, and the similarity score is compared with a threshold to determine whether to grant the request for access.

9. The method of claim 1, wherein the threshold is experimentally defined.

* * * * *